(12) United States Patent
Kurashige et al.

(10) Patent No.: US 11,530,792 B2
(45) Date of Patent: Dec. 20, 2022

(54) ILLUMINATION DEVICE AND METHOD OF MANUFACTURING THE SAME

(71) Applicant: Dai Nippon Printing Co., Ltd., Tokyo (JP)

(72) Inventors: Makio Kurashige, Tokyo (JP); Shumpei Nishio, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 92 days.

(21) Appl. No.: 17/076,087

(22) Filed: Oct. 21, 2020

(65) Prior Publication Data

US 2021/0041076 A1 Feb. 11, 2021

Related U.S. Application Data

(63) Continuation of application No. 16/346,671, filed as application No. PCT/JP2017/041219 on Nov. 16, 2017, now Pat. No. 10,845,020.

(30) Foreign Application Priority Data

Nov. 17, 2016 (JP) .............................. JP2016-224364
May 23, 2017 (JP) .............................. JP2017-101919

(51) Int. Cl.
*G03H 1/26* (2006.01)
*F21S 41/20* (2018.01)
(Continued)

(52) U.S. Cl.
CPC .......... *F21S 41/285* (2018.01); *G02B 5/0252* (2013.01); *G02B 27/30* (2013.01); *G03H 1/00* (2013.01)

(58) Field of Classification Search
CPC ..... F21S 41/285; G02B 5/0252; G02B 27/30; G02B 5/32; G03H 1/00; G03H 1/0005;
(Continued)

(56) References Cited

U.S. PATENT DOCUMENTS

2007/0053195 A1 ‡ 3/2007 Alberti ................ B60Q 1/2665
362/49
2008/0225361 A1 9/2008 Kasazumi et al.
(Continued)

FOREIGN PATENT DOCUMENTS

FR 2 785 364 A1 ‡ 5/2000
JP 2002-037185 A1 ‡ 2/2002
(Continued)

OTHER PUBLICATIONS

International Search Report and Written Opinion (Application No. PCT/JP2017/041219) dated Feb. 6, 2018.
(Continued)

*Primary Examiner* — Arnel C Lavarias
(74) *Attorney, Agent, or Firm* — Burr & Brown, PLLC

(57) ABSTRACT

To protect observer's eyes while forming a clear illumination pattern on a desired region to be illuminated. An illumination device includes a light source that emits coherent light, a collimating optical system that enlarges and collimates a beam diameter of the coherent light emitted from the light source, and a diffractive optical element that diffracts the coherent light collimated by the collimating optical system into a predetermined diffusion angle space. The diffractive optical element has a plurality of element diffractive optical portions and has a function to illuminate the region to be illuminated defined at a predetermined position and having predetermined size and shape to form the desired illumination pattern. Each of the plurality of element diffractive optical portions has a function to illuminate at least a part of the region to be illuminated, and diffractive characteristics of the element diffractive optical portions are different from each other.

12 Claims, 21 Drawing Sheets

(51) Int. Cl.
*G02B 5/02* (2006.01)
*G02B 27/30* (2006.01)
*G03H 1/00* (2006.01)

(58) Field of Classification Search
CPC ... G03H 2001/0055; G03H 2001/0094; G03H 1/02; G03H 1/04; G03H 2001/0413; G03H 2001/0439; G03H 2001/0441; G03H 1/0443; G03H 2001/045; G03H 1/08; G03H 1/0808; G03H 2001/0816; G03H 2001/0825; G03H 2001/0833; G03H 1/0866; G03H 2001/0883; G03H 1/0891; G03H 1/16; G03H 1/22; G03H 1/26; G03H 1/30
USPC .... 359/22, 1, 9, 25, 29, 32, 33, 35; 430/1, 2
See application file for complete search history.

(56) References Cited

U.S. PATENT DOCUMENTS

| | | | |
|---|---|---|---|
| 2012/0249988 A1‡ | 10/2012 | Runde | G03F 7/70191 355/67 |
| 2013/0088763 A1 | 4/2013 | Kurashige | |
| 2017/0267167 A1 | 9/2017 | Sakata et al. | |
| 2017/0334339 A1‡ | 11/2017 | Kurashige | B60Q 1/24 |
| 2017/0334341 A1 | 11/2017 | Kurashige et al. | |
| 2021/0333756 A1* | 10/2021 | Kaczorowski | G03H 1/16 |

FOREIGN PATENT DOCUMENTS

| | | |
|---|---|---|
| JP | 2009-139483 A1 ‡ | 6/2009 |
| JP | 2015-132707 A1 ‡ | 7/2015 |
| JP | 2016-110808 A1 ‡ | 6/2016 |
| JP | WO 2016/088510 A1 ‡ | 6/2016 |
| JP | 2019057433 A * | 4/2019 |
| WO | 2005/073798 A1 ‡ | 8/2005 |
| WO | 2012/032670 A1 ‡ | 3/2012 |
| WO | 2016/027314 A1 | 2/2016 |
| WO | 2016/072505 A1 ‡ | 5/2016 |
| WO | WO-2020153504 A1 * | 7/2020 |

OTHER PUBLICATIONS

English translation of International Preliminary Report on Patentability (Chapter I) (Application No. PCT/JP2017/041219) dated May 31, 2019.
Extended European Search Report (Application No. 17872503.2) dated May 14, 2020.
European Office Action (Application No. 17872503.2) dated Nov. 15, 2021.
Chinese Office Action (Application No. 201780070817.8) dated Nov. 18, 2020 (with English translation).
Chinese Office Action (Application No. 201780070817.8) dated Jul. 8, 2021 (with English translation).
European Office Action (Application No. 17 872 503.2) dated Feb. 3, 2021.
Japanese Office Action (with English translation) dated Jul. 15, 2022 (Application No. 2021-141498).

\* cited by examiner
‡ imported from a related application (a)

(b) TABLE ILLUSTRATING D00:
DESIGN ILLUMINATION INTENSITY DISTRIBUTION

| REFERENCE POINT | COORDINATES | DESIGN ILLUMINATION INTENSITY |
|---|---|---|
| Q1 | (xq1, yq1, zq1) | A11 |
| Q2 | (xq2, yq2, zq2) | A12 |
| Q3 | (xq3, yq3, zq3) | A13 |
| Q4 | (xq4, yq4, zq4) | UNDEFINED |

(c)

ILLUMINATION DEVICE AND METHOD OF MANUFACTURING THE SAME

CROSS REFERENCE TO RELATED APPLICATION

This application is a continuation of U.S. application Ser. No. 16/346,671, filed May 1, 2019, which is the National Stage entry of International Application No. PCT/JP2017/041219, filed Nov. 16, 2017, which designated the United States, the entireties of which are incorporated herein by reference.

FIELD OF THE INVENTION

The present invention relates to an illumination device that illuminates a specific region to be illuminated and a method of manufacturing the illumination device, and in particular to an illumination device suitable for use in an illumination environment where an angle made by an optical axis of illumination light and a plane to be illuminated is small and a method of manufacturing the illumination device.

BACKGROUND OF THE INVENTION

As an illumination device capable of obtaining small and high-luminance illumination light, illumination devices using a coherent light source such as a laser light source have been proposed. For example, Patent Literature 1 below discloses an illumination device that diffracts emitted light from a coherent light source with a volume hologram to perform illumination. Further, Patent Literature 2 discloses an illumination device provided with a light beam scanning device for scanning a beam of coherent light in order to suppress speckle generated by a coherent light source.

Meanwhile, recently, illumination devices mounted on a vehicle such as a car and which irradiates a road surface with illumination light from a coherent light source have been proposed. For example, Patent Literature 3 discloses an on-vehicle illumination device that irradiates a transmission-type hologram element with laser light emitted from a laser light source to form a desired illumination pattern on a road surface.

CITATION LIST

Patent Literature

Patent Literature 1: WO/2005/073798
Patent Literature 2: WO/2012/032670
Patent Literature 3: JP 2015-132707 A Since coherent light such as laser light has higher coherency than non-coherent light such as LED light, the coherent light can clearly illuminates a region to be illuminated and can form an arbitrary illumination pattern such as characters and figures on the region to be illuminated in principle. Therefore, for example, Patent Literature 3 described above discloses a technology of forming an illumination pattern composed of various characters and figures in the region to be illuminated on the road surface, using the on-vehicle illumination device.

However, to display the illumination pattern composed of characters and figures on the road surface in front of a vehicle to cause a driver of the vehicle to recognize the illumination pattern, the illumination pattern needs to be projected at a considerably distant position in front of the vehicle. As a result, an angle made by an optical axis of illumination light and a plane to be illuminated (road surface) becomes considerably small, and therefore the illumination pattern formed in the region to be illuminated becomes unclear. For example, in the case of the illumination device described in Patent Literature 3 above, the laser light generated in the single laser light source is diffracted with a single hologram element to perform illumination. Therefore, the illumination pattern formed on the road surface becomes unclear due to a beam diameter of the laser light emitted from the laser light source, and the character and figure patterns formed on the road surface look blurred from an observer.

Further, the laser light has far larger radiation intensity than the non-coherent light such as LED light and thus may damage observer's eyes. In the case of the illumination device described in Patent Literature 3, no safety measures are taken for the observer's eyes. Therefore, in a case where a pedestrian or a driver of an oncoming car directly looks at the illumination light from the illumination device, for example, the illumination light may damage the eyes.

Therefore, an object of the present invention is to provide an illumination device that can form a clear illumination pattern with suppressed blur on a desired region to be illuminated and for which safety measures for protecting observer's eyes has been taken with a simple configuration. Further, another object of the present invention is to provide a manufacturing method suitable for mass-producing such an illumination device on a commercial basis.

SUMMARY OF THE INVENTION

A first aspect of the present invention is provided with, in an illumination device,
a light source configured to emit coherent light,
a collimating optical system configured to enlarge a beam diameter of the coherent light emitted from the light source and collimate the coherent light, and
a diffractive optical element configured to diffract the coherent light collimated by the collimating optical system into a predetermined diffusion angle space, and illuminate a region to be illuminated defined at a predetermined position and having predetermined size and shape, and is configured such that
the diffractive optical element includes a plurality of element diffractive optical portions, and each of the element diffractive optical portions illuminates at least a part of the region to be illuminated.

A second aspect of the present invention is configured such that, in the illumination device according to the above-described first aspect,
the diffractive optical element includes the plurality of element diffractive optical portions arranged in a two-dimensional matrix manner on a predetermined arrangement plane.

A third aspect of the present invention is configured such that, in the illumination device according to the above-described second aspect,
diffractive characteristics of the element diffractive optical portions are different from each other.

A fourth aspect of the present invention is configured such that, in the illumination device according to the above-described second aspect,
a group of the element diffractive optical portions arranged adjacent to each other is defined as a diffractive optical group, and the diffractive optical element is configured by an aggregate of a plurality of the diffractive optical groups arranged in a two-dimensional matrix manner, and the element diffractive optical portions belonging to the same diffractive optical group have the same diffractive characteristic as each other, and the element diffractive optical portions belonging to different diffractive optical groups have different diffractive characteristics from each other.

A fifth aspect of the present invention is configured such that, in the illumination device according to the above-described first to fourth aspects, the individual element diffractive optical portions have functions to respectively illuminate predetermined partial regions to be illuminated, and a group of the partial regions to be illuminated forms the region to be illuminated defined at a predetermined position and having predetermined size and shape.

A sixth aspect of the present invention is configured such that, in the illumination device according to the above-described fifth aspect, the partial regions to be illuminated by the individual element diffractive optical portions overlap each other.

A seventh aspect of the present invention is configured such that, in the illumination device according to the above-described first to sixth aspects, a cross section of the coherent light collimated by the collimating optical system has an area containing an entire surface of the diffractive optical element, and all the element diffractive optical portions are irradiated with the coherent light.

An eighth aspect of the present invention is configured such that, in the illumination device according to the above-described first to sixth aspects, a cross section of the coherent light collimated by the collimating optical system has an area containing only a part of the diffractive optical element, and only a part of the element diffractive optical portions is irradiated with the coherent light.

A ninth aspect of the present invention is configured such that, in the illumination device according to the above-described eighth aspect, an area of the element diffractive optical portion is equal to or less than an area of the cross section of the coherent light.

A tenth aspect of the present invention is configured such that, in the illumination device according to the above-described first to ninth aspects, a hologram having a specific diffractive characteristic that causes first-order diffracted light illuminating an entire predetermined region to be illuminated or a part of the predetermined region to be illuminated is recorded in the individual element diffractive optical portions.

An eleventh aspect of the present invention is configured such that, in the illumination device according to the above-described tenth aspect, the diffractive optical element is configured by a liquid crystal display, a digital mirror device, or an optical element having LCOS, and predetermined interference fringes are formed in the optical element to form a predetermined illumination pattern as a hologram reproduction image in the region to be illuminated.

A twelfth aspect of the present invention is configured such that, in the illumination device according to the above-described first to eleventh aspects, the region to be illuminated is set on a plane, and a normal direction of an emission surface of the diffractive optical element and a normal direction of the plane are not parallel.

A thirteenth aspect of the present invention is configured such that, in the illumination device according to the above-described twelfth aspect, the region to be illuminated is set on a road surface, and an illumination pattern including information to be presented to a driver of a vehicle is displayed on the road surface.

A fourteenth aspect of the present invention is configured such that, in the illumination device according to the above-described thirteenth aspect, a mounting portion to be mounted to the vehicle is further included, and the road surface is illuminated from the vehicle.

A fifteenth aspect of the present invention is configured such that, in the illumination device according to the above-described thirteenth aspect, a mounting portion to be mounted to a structure or a building installed on the road surface or near the road surface is further included, and the road surface, a vicinity of the road surface, a floor surface, or a wall surface is illuminated from the structure or the building installed on the road surface or near the road surface.

A sixteenth aspect of the present invention is configured such that, in the illumination device according to the above-described first to fifteenth aspects, a beam area of the coherent light entering the diffractive optical element from the collimating optical system is equal to or larger than 38.5 square mm.

A seventeenth aspect of the present invention is configured such that, in the illumination device according to the above-described first to sixteenth aspects, an optical image of an illumination pattern diffracted by the diffractive optical element and illuminating the region to be illuminated is a Fraunhofer diffracted image.

An eighteenth aspect of the present invention is configured such that, in the illumination device according to the above-described first to seventeenth aspects, holograms respectively having unique diffractive characteristics are recorded in the individual element diffractive optical portions in order to diffract the coherent light entering from the collimating optical system, and each of the holograms is produced through a process including:

a first step of generating intensity angular space distribution of a first-order diffracted light emitted from the element diffractive optical portions on the basis of predetermined design illumination intensity distribution defined in the region to be illuminated;

a second step of combining random phase distribution with the angular space distribution of intensity to generate complex amplitude distribution on the diffractive optical element;

a third step of performing inverse Fourier transform for the complex amplitude distribution on the diffractive optical element to generate complex amplitude distribution on the region to be illuminated;

a fourth step of modifying intensity of the complex amplitude distribution on the region to be illuminated in accordance with the design illumination intensity distribution to generate modified complex amplitude distribution on the region to be illuminated;

a fifth step of performing Fourier transform for the modified complex amplitude distribution on the region to be illuminated to generate a modified complex amplitude distribution on the diffractive optical element;

a sixth step of replacing intensity of the modified complex amplitude distribution on the diffractive optical element with intensity exhibited in the intensity angular space distribution generated in the first step to generate replaced complex amplitude distribution on the diffractive optical element; and a seventh step of executing the third step again using the replaced complex amplitude distribution on the diffractive optical element generated in the sixth step instead of the complex amplitude distribution on the diffractive optical element to repeatedly perform the process from the third step to the sixth step by a necessary number of times and setting the finally obtained replaced complex amplitude distribution on the diffractive optical element as finally complex amplitude distribution, and the hologram is a hologram having a unique diffractive characteristic from which first-order diffracted light corresponding to the final complex amplitude distribution is emitted.

A nineteenth aspect of the present invention is configured such that, in the illumination device according to the above-described eighteenth aspect, the intensity angular space distribution is defined by data providing intensity to a plurality distribution points defined on a two-dimensional coordinate system having a vertical-direction displacement angle indicating angular displacement in a vertical direction and a horizontal-direction displacement angle indicating angular displacement in a horizontal direction with respect to a normal line set at a predetermined representative point in the element diffractive optical portions, as coordinate axes, respectively, and the complex amplitude distribution on the diffractive optical element, the modified complex amplitude distribution on the diffractive optical element, and the replaced complex amplitude distribution on the diffractive optical element are defined by data providing both of intensity and a phase to the plurality distribution points defined on the two-dimensional coordinate system.

A twentieth aspect of the present invention is configured such that, in a method of manufacturing an illumination device, for manufacturing the illumination device according to the above-described first to seventeenth aspects, in producing the individual element diffractive optical portions included in the diffractive optical element, the method performing a process including:

a first step of generating angular space distribution of intensity of first-order diffracted light emitted from the element diffractive optical portions on the basis of predetermined design illumination intensity distribution defined in the region to be illuminated;

a second step of combining random phase distribution with the angular space distribution of intensity to generate complex amplitude distribution on the diffractive optical element;

a third step of performing inverse Fourier transform for the complex amplitude distribution on the diffractive optical element to generate complex amplitude distribution on the region to be illuminated;

a fourth step of modifying intensity of the complex amplitude distribution on the region to be illuminated in accordance with the design illumination intensity distribution to generate modified complex amplitude distribution on the region to be illuminated;

a fifth step of performing Fourier transform for the modified complex amplitude distribution on the region to be illuminated to generate a modified complex amplitude distribution on the diffractive optical element;

a sixth step of replacing intensity of the modified complex amplitude distribution on the diffractive optical element with intensity exhibited in the angular space distribution of intensity generated in the first step to generate replaced complex amplitude distribution on the diffractive optical element;

a seventh step of executing the third step again using the replaced complex amplitude distribution on the diffractive optical element generated in the sixth step instead of the complex amplitude distribution on the diffractive optical element to repeatedly perform the process from the third step to the sixth step by a necessary number of times and setting the finally obtained replaced complex amplitude distribution on the diffractive optical element as finally complex amplitude distribution; and an eighth step of forming interference fringes constituting a hologram having a unique diffractive characteristic on a predetermined medium so that first-order diffracted light corresponding to the final complex amplitude distribution is emitted on the basis of the coherent light entering from the collimating optical system.

A twenty-first aspect of the present invention is configured such that, in the method of manufacturing the illumination device according to the above-described twentieth aspect, the intensity angular space distribution is defined by data providing intensity to a plurality distribution points defined on a two-dimensional coordinate system having a vertical-direction displacement angle indicating angular displacement in a vertical direction and a horizontal-direction displacement angle indicating angular displacement in a horizontal direction with respect to a normal line set at a predetermined representative point in the element diffractive optical portions, as coordinate axes, respectively, and the complex amplitude distribution on the diffractive optical element, the modified complex amplitude distribution on the diffractive optical element, and the replaced complex amplitude distribution on the diffractive optical element are defined by data providing both of intensity and a phase to the plurality distribution points defined on the two-dimensional coordinate system.

A twenty-second aspect of the present invention is configured such that the first to seventh steps in the method of manufacturing the illumination device according to the above-described twentieth to twenty-first aspects are executed by a program incorporated in a computer.

In the illumination device according to the present invention, the coherent light from the coherent light source is diffracted by the diffractive optical element after the beam diameter is enlarged by the collimating optical system, and the region to be illuminated defined at the predetermined position and having predetermined size and shape is illuminated by the diffracted light. Therefore, a desired illumination pattern can be formed on the region to be illuminated by the light with intensity reduced by the collimating optical system, the intensity of light entering observer's eyes can be reduced, and safety measures for protecting the observer's eyes can be taken.

Further, the diffractive optical element used in the illumination device according to the present invention includes the plurality of element diffractive optical portions, each of the element diffractive optical portions illuminating at least a part of the region to be illuminated. Therefore, a clear illumination pattern with suppressed blur can be formed on the region to be illuminated. In particular, diffractive characteristics of the plurality of element diffractive optical portions are made different from one another, whereby the clear illumination pattern can be formed on the region to be illuminated.

Furthermore, in the method of manufacturing the illumination device according to the present invention, the holograms to be recorded in the individual element diffractive optical portions are produced using a technique generally called "repetitive Fourier transform method". Therefore, the illumination device according to the present invention can be mass-produced on a commercial basis.

DETAILED DESCRIPTION OF THE INVENTION

Hereinafter, the present invention will be described on the basis of illustrated embodiments.

§ 1. Characteristics of On-Vehicle Illumination Device

An illumination device according to the present invention is a device having a role of illuminating a specific region to be illuminated, and is in particular suitable for applications to an on-vehicle illumination device having a function to form a desired illumination pattern on a road surface and the like. In such applications, the illumination pattern tends to be unclear because an angle made by an optical axis of illumination light and a plane to be illuminated becomes very small and safety measures for pedestrians and the like are also required. The illumination device according to the present invention can form a clear illumination pattern on a region to be illuminated and can take necessary safety measures even in such applications.

Therefore, in this § 1, characteristics of an on-vehicle illumination device for forming a desired illumination pattern on a road surface will be briefly described as a typical application of the present invention, and a basic embodiment in which the present invention is applied to an on-vehicle illumination device will be described in the following § 2 to § 4. However, as will be described as a modification in § 5, the illumination device according to the present invention is not necessarily limited to the on-vehicle illumination device.

Figure 1:
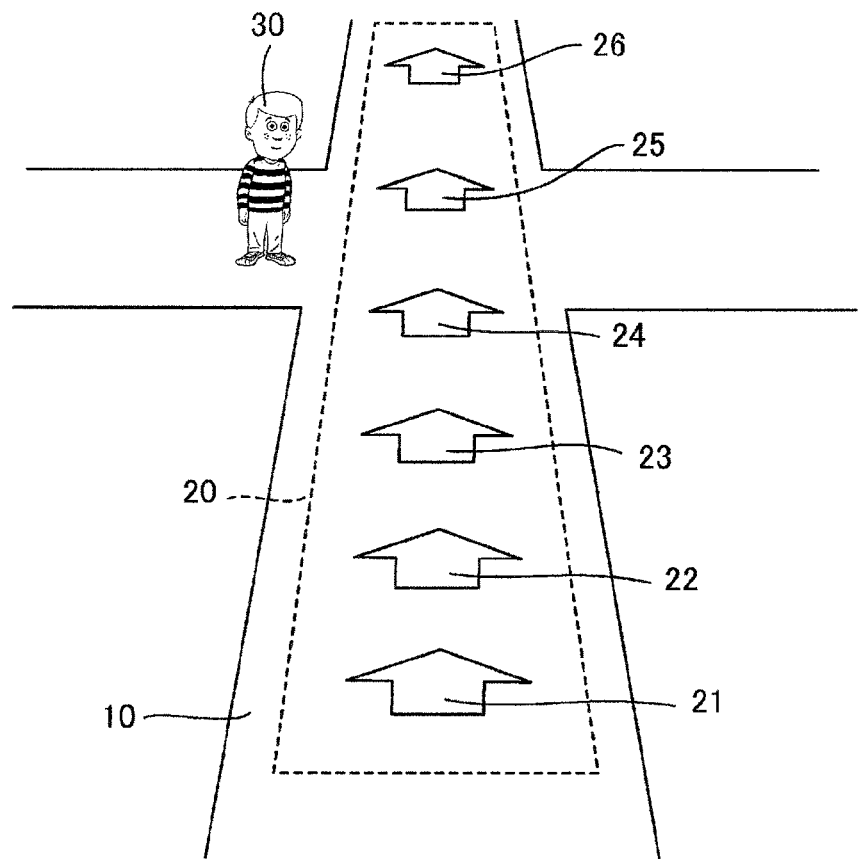
FIG. 1 is a bird's-eye view from a driver's seat, illustrating an example in which a region to be illuminated 20 is formed on a road surface 10 by illumination from an on-vehicle illumination device.

FIG. 1 is a bird's-eye view from a driver's seat, illustrating an example in which a region to be illuminated 20 is formed on a road surface 10 by illumination from an on-vehicle illumination device. FIG. 1 illustrates a state in which the road surface 10 in front of a vehicle (car) is viewed from a driver while driving, and a pedestrian 30 stands on a front left side. In the illustrated example, the region to be illuminated 20 constitutes an elongated rectangular region in a longitudinal direction that is a traveling direction of the road surface 10, and arrows 21 to 26 constituting an illumination pattern are arranged inside the rectangular region. Specifically, each of the six arrows 21 to 26 indicates a straight direction.

The illustrated example illustrates an illumination mode linked to a navigation system of the vehicle, and the illumination pattern composed of the arrows 21 to 26 functions as an auxiliary display that appears on the road surface when the navigation system guides the driver to go straight at the next intersection. In this example, insides of the arrows 21 to 26 are illuminated with high luminance, and the inside of the region to be illuminated 20 and the outside of the arrows 21 to 26 are illuminated with low luminance. Therefore, when viewed from the driver, the region to be illuminated 20 formed in a slightly elongated rectangular shape can be lightly confirmed on the road surface 10, and the six bright arrows 21 to 26 can be confirmed inside the region to be illuminated 20. The driver can recognize that he/she should go straight down the next intersection by the illumination pattern with the arrows.

Generally, the illumination pattern on the road surface 10 can be easily recognized during the night but sufficient illumination intensity needs to be secured during daylight so that the illumination pattern is displayed with high luminance in a way. As will be described below, the illumination device according to the present invention can secure the sufficient illumination intensity as using a light source that emits coherent light such as laser light. However, since the illumination light from the illumination device also enters the eyes of the pedestrian 30 and the driver of the oncoming car, the illumination intensity that may damage the eyes needs to be avoided. As will be described below, in the illumination device according to the present invention, a light beam emitted from a coherent light source is collimated after a beam diameter is enlarged by a collimating optical system. Therefore, energy density of the light beam is decreased and safety measures for protecting the observer's eyes can be taken.

Although general on-vehicle illumination devices are disclosed in Patent Literature 3 above and the like, the formed illumination pattern tends to become unclear because the angle made by the optical axis of the illumination light and the plane to be illuminated (the road surface 10 in the illustrated example) becomes very small. The illumination device according to the present invention also has a function to cope with such a problem.

Figure 2:
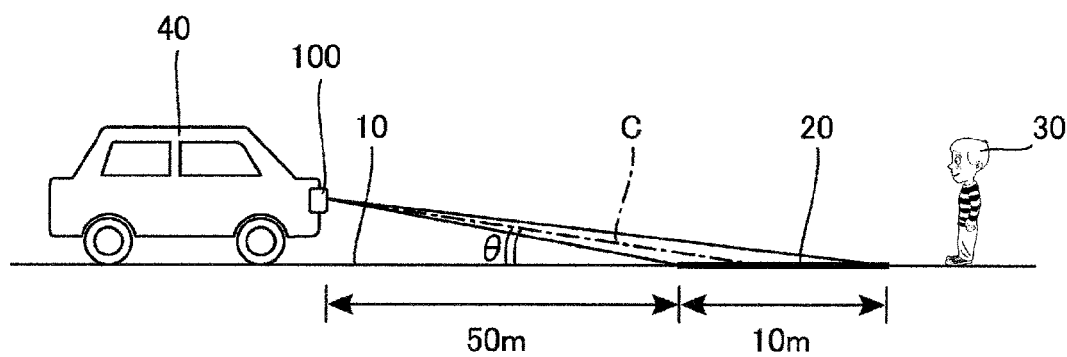
FIG. 2 is a side view illustrating an example in which the region to be illuminated 20 is formed on the road surface 10 by illumination from an on-vehicle illumination device 100.

FIG. 2 is a side view illustrating an example in which the region to be illuminated 20 (thick line portion) is formed on the road surface 10 by illumination from an on-vehicle illumination device 100. In this example, a vehicle (car) 40 travels on the road surface 10 from the left to the right in FIG. 2. As illustrated, the illumination device 100 according to the present invention is mounted to a front of the vehicle 40, and a front of the road surface 10 is illuminated along an optical axis C. The illumination device 100 in the example described here is a different device from a headlight and the like, and serves to illuminate the predetermined region to be illuminated 20 on the road surface 10 to present a predetermined illumination pattern. For example, in the case of the example in FIG. 1, the illumination pattern composed of the six arrows 21 to 26 is presented by illumination of the rectangular region to be illuminated 20. Of course, the illumination device 100 can be used as a headlight, as necessary.

As described above, the on-vehicle illumination device 100 illustrated in FIG. 2 has a function to form the region to be illuminated 20 on the road surface 10 composed of a plane, and display, on the road surface 10, the illumination pattern (the pattern projected in the region to be illuminated 20) including information to be presented to the driver of the vehicle 40.

Since the driver while driving is looking in the traveling direction of the road surface 10, the region to be illuminated 20 needs to be formed at a considerably distant position on the road surface 10 in the application of the above example. For example, FIG. 2 illustrates an example in which the region to be illuminated 20 (thick line portion) with the length of 10 m in the longitudinal direction is formed at a position 50 m ahead of the vehicle 40. To form the region to be illuminated 20 at such a position, an angle θ (a radiation angle with respect to the plane to be illuminated) made by the optical axis C and the road surface 10 is about 0.7°, where an installation height of the illumination device 100 is 75 cm. In FIG. 2, the size of θ is deformed for convenience, but in practice, the angle made by the optical axis C and the road surface 10 is extremely small.

Figure 3:
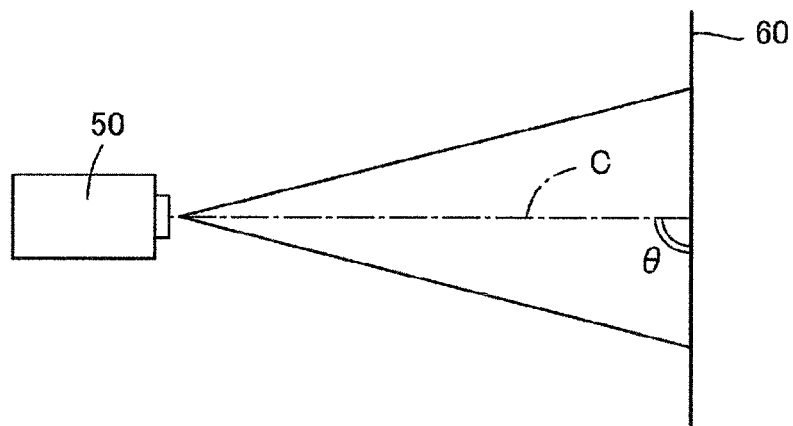
FIG. 3 is a side view illustrating a projection mode by a typical projector.

FIG. 3 is a side view illustrating a projection mode by a typical projector. A projection image is formed on a screen 60 with projection light from a projector 50. The illustrated example is an example in which the angle θ made by a projection surface (plane to be illuminated) of the screen 60 and the optical axis of the projector 50 is set to 90°. Of course, in a case where the screen 60 is shifted vertically or horizontally and arranged, the radiation angle θ becomes smaller than 90°, but a use form with a significantly small irradiation angle θ is rare. As described above, such a use mode in which the radiation angle θ becomes about 0.7° is unexpected in the typical projector. If an illumination mechanism used in the typical projector is used as it is in the on-vehicle illumination device, a clear projection image cannot be obtained on the projection surface (plane to be illuminated).

In particular, in the case of the example illustrated in FIGS. 1 and 2, the illumination pattern including the six arrows 21 to 26 is formed on the elongated rectangular region to be illuminated 20 in the longitudinal direction that is the traveling direction of the vehicle. In such an application, several tens of cm is sufficient for the lateral width of the region to be illuminated 20 but the dimension in the longitudinal direction needs to be at least about 10 m as in the illustrated example. For this reason, the distance between the front arrow 21 and the back arrow 26 is also about 10 m, and positional deviation occurs in the illumination pattern, which makes it difficult to clearly display all the arrows 21 to 26. In fact, when the illumination pattern illustrated in FIG. 1 is projected in a state where the beam diameter to enter the hologram is expanded in consideration of safety of emission light using the illumination device disclosed in Patent Literature 3, the projection image on the road surface 10 is observed to be blurred as viewed from the driver or the pedestrian 30. The illumination device 100 according to the present invention can obtain an effect of eliminating blur in the projection image because of using a diffractive optical element including a plurality element diffractive optical portions, as will be described below.

As described above, by use of the illumination device 100 according to the present invention, the clear projection image can be obtained on the road surface 10 and the safety measures can be taken for the pedestrian 30 and the like. Hereinafter, the present invention will be described on the basis of an illustrated basic embodiment.

§ 2. Basic Embodiment of Present Invention

Figure 4:
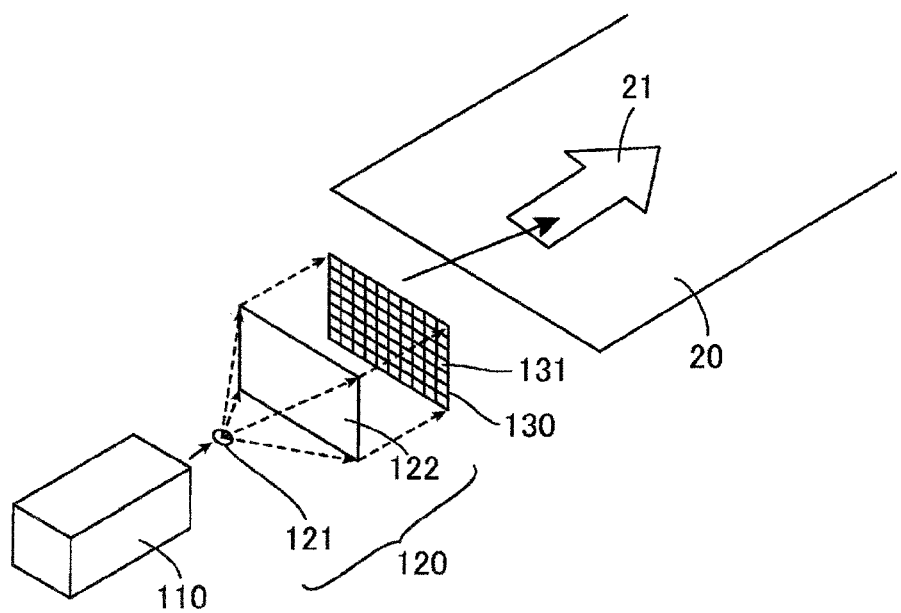
FIG. 4 is a perspective view illustrating a configuration of the illumination device 100 according to a basic embodiment of the present invention.

FIG. 4 is a perspective view illustrating a configuration of the illumination device 100 according to a basic embodiment of the present invention. The illumination device 100 is mounted to the front of the vehicle 40 and used as in the example illustrated in FIG. 2, and serves to illuminate the predetermined region to be illuminated 20 on the road surface 10 to present a predetermined illumination pattern.

The illustrated illumination device 100 is a different device from a headlight of a car or the like. However, the illumination device 100 can be used as a headlight or can be incorporated into a headlight and used. The illumination device 100 can be used as various illumination lights such as tail light and search lights of the car or can be incorporated in these various illumination lights and used, or can also be mounted to a bumper portion or the like and used.

As illustrated, the illumination device 100 includes a light source 110, a collimating optical system 120, and a diffractive optical element 130. Although not illustrated in FIG. 4, a mounting portion for being mounted to the vehicle 40 is provided in the on-vehicle illumination device 100. The illumination device 100 is mounted to the front, rear, side, or the like of the vehicle 40, thereby illuminating the road surface 10 from the vehicle 40.

The light source 110 is a light source that emits coherent light, and a laser light source that emits laser light can be used, for example. There are various types of laser light sources such as a semiconductor laser and a gas laser but any type of laser light source may be used.

The collimating optical system 120 is a component that enlarges the beam diameter of the coherent light emitted from the light source 110 and collimates the coherent light. Here, collimating refers to making the coherent light emitted from the light source 110 parallel. In the illustrated example, the collimating optical system 120 includes a first lens 121 for expanding the beam diameter of the coherent light emitted from the light source 110, and a second lens 122 for collimating the light passing through the first lens 121.

The diffractive optical element 130 serves to diffract the coherent light collimated by the collimating optical system 120 into a predetermined diffusion angle space to illuminate the region to be illuminated 20 defined at a predetermined position and having predetermined size and shape. Further, an arbitrary illumination pattern can be displayed inside the region to be illuminated 20 by the diffractive optical element 130. FIG. 4 illustrates a state in which the arrow 21 constituting a part of the illumination pattern is displayed inside the rectangular region to be illuminated 20 by diffracted light from the diffractive optical element 130.

As will be described below, a hologram is formed on the diffractive optical element 130 so that the region to be illuminated 20 is illuminated by the diffracted light. As described above, since the region to be illuminated 20 needs to be formed at a considerably distant position in the traveling direction of the vehicle 40, an image of the illumination light that is diffracted by the diffractive optical element 130 and illuminates the region to be illuminated 20 is favorably made to a Fraunhofer diffracted image.

In the illustrated example, the light beam of the coherent light expanded and collimated by the collimating optical system 120 perpendicularly enters an incident surface of the diffractive optical element 130 as parallel light. However, the angle with respect to the incident surface of the diffractive optical element 130 is not necessarily 90°, and the light may obliquely enter the incident surface. Note that incident light with respect to the diffractive optical element 130 is favorably parallel light. This is because if the incident light is not parallel light, precise alignment between the diffractive optical element and the optical system is required, and slight deviation of the installation position of the diffractive optical element causes unintended deviation of an diffraction angle, resulting in a factor of a more unclear illumination pattern than intended.

The diffractive optical element 130 used in the present invention includes a plurality of element diffractive optical portions 131. FIG. 4 illustrates the diffractive optical element 130 including seventy sets of element diffractive optical portions 131 arranged in seven rows by ten columns. In short, the diffractive optical element 130 according to the example illustrated in FIG. 4 includes the plurality of element diffractive optical portions 131 arranged in a two-dimensional matrix manner on a predetermined arrangement plane (an XY plane in this example). As will be described below, each of the element diffractive optical portions 131 has a function to illuminate at least a part of the region to be illuminated 20. Furthermore, in the case of the example described here, diffractive characteristics of the element diffractive optical portions 131 are different from one another.

In the illustrated example, planar dimensions of each of element diffractive optical portions 131 are 2 mm high and 2 mm wide, and dimensions of the diffractive optical element 130 configured by arranging such element diffractive optical portions in seven rows by ten columns are 14 mm high and 20 mm wide. Off course, the area of each element diffractive optical portion is not limited in implementing the present invention. However, to make the illumination pattern formed on the road surface 10 (plane to be illuminated) clearer, the diffractive optical element 130 is favorably divided as finely as possible to configure each of the element diffractive optical portions 131.

A hologram element can be typically used as each of the element diffractive optical portions 131. In this case, the diffractive optical element 130 can be configured by an aggregate of hologram elements respectively having unique diffractive characteristics. By use of the hologram elements as the diffractive optical element 130, the diffractive characteristics can be easily designed, and the diffractive optical element 130 that illuminates the entire region to be illuminated 20 defined at a predetermined position and having predetermined size and shape can be relatively easily designed.

As described above, the region to be illuminated 20 formed by the illumination device 100 according to the present invention becomes a region defined at a predetermined relative position to the diffractive optical element 130 and having predetermined size and shape. The position, size, and shape of the region to be illuminated 20 depend on the diffractive characteristics of the diffractive optical element 130. The position, size, and shape of the region to be illuminated 20 can be arbitrarily adjusted and the illumination pattern displayed in the region to be illuminated 20 can also be arbitrarily adjusted by adjusting the diffractive characteristics of the diffractive optical element 130.

Therefore, in designing the diffractive optical element 130, first, the position, size, and shape of the region to be illuminated 20 and the illumination pattern to be displayed in the region to be illuminated 20 are set, and the diffractive characteristics of the diffractive optical element 130 are adjusted such that the entire set region to be illuminated 20 can be illuminated according to the set illumination pattern. In the example illustrated in FIGS. 1 and 2, the rectangular region to be illuminated 20 having the size of 10 m in length and 10 cm in width is set at the position 50 m ahead of the illumination device 100, and the illumination pattern composed of the six arrows 21 to 26 is set inside the region to be illuminated 20. As will be described below, the diffractive optical element 130 (element diffractive optical portions 131) having the unique diffractive characteristics according to such setting can be designed by a computer using a technology of computer generated hologram (CGH).

Note that an optical system for forming the predetermined illumination pattern is not used in the illumination device 100 according to the basic embodiment illustrated in FIG. 4, and the region to be illuminated 20 having the predetermined illumination pattern (the arrow 21 in the illustrated example) is formed by first-order diffracted light diffracted by the diffractive optical element 130. That is, diffracted light at each point on the diffractive optical element 130 travels within a predetermined diffusion angle range and illuminates the inside of the region to be illuminated 20 to present the predetermined illumination pattern.

Of course, a configuration in which an imaging system optical element (such as a lens) is arranged on an emission side of the diffracted light of the diffractive optical element 130 and the predetermined illumination pattern is formed on the road surface 10 can be adopted. In the typical projector 50 illustrated in FIG. 3, an imaging system optical element is usually used to form a clear projection image on the screen 60. However, the radiation angle θ with respect to the screen 60 is set to a value close to 90° in the typical projector 50 whereas the radiation angle θ is about 0.7° in the illumination device 100 illustrated in FIG. 2. Therefore, even with the imaging system optical element, it is difficult to effectively eliminate blur in the illumination pattern formed on the road surface 10.

Therefore, in the illumination device according to the present invention, it does not make much sense to adopt the configuration to form the illumination pattern by the imaging system optical element. However, as will be described in the modification in § 5-1, a non-imaging system optical element (for example, a 4f optical system) may be arranged as needed.

A first characteristic of the illumination device 100 according to the embodiment illustrated in FIG. 4 is that the beam diameter of the coherent light emitted from the coherent light source 110 is enlarged by the collimating optical system 120. Generally, the light beam of the coherent light emitted from the coherent light source 110 such as a laser light source has very high energy density in cross section, and in a case of diffracting such a light beam as is to form the illumination pattern on the road surface, the light beam may damage the eyes of the pedestrian or the driver of an oncoming car.

In the present invention, the beam diameter of the coherent light emitted from the coherent light source 110 is expanded, so the energy density of the light beam is reduced. For this reason, the safety measures to protect the eyes of an observer who directly looks at the illumination light are taken. In short, necessary radiation luminance or luminance on the diffractive optical element 130 to obtain a predesigned amount of light as the illumination pattern to be displayed in the region to be illuminated 20 is reduced by further expanding an incident area on the diffractive optical element 130, of the coherent light entering the diffractive optical element 130 from the collimating optical system 120.

Then, a second characteristic of the illumination device 100 according to the embodiment illustrated in FIG. 4 is that the diffractive optical element 130 includes the plurality of element diffractive optical portions 131, and the diffractive characteristics of the element diffractive optical portions 131 are set to be different from one another. In the illumination device described in Patent Literature 3 described above, the laser light is diffracted by the single hologram element to perform illumination. Therefore, the illumination pattern formed on the road surface 10 is unclear and a blurred projection image is observed by the observer's eyes. In contrast, in the illumination device according to the present invention, the individual element diffractive optical portions 131 serve to respectively diffract predetermined diffraction angles to form desired illumination patterns on the desired plane to be illuminated (road surface 10) independently of one another. Therefore, blur in a projection image can be prevented and a clear illumination pattern can be formed.

To further improve the safety measures for handling the coherent light in the illumination device 100 according to the present invention illustrated in FIG. 4, it is favorable to devise the following scheme in practice.

First, it is necessary to prevent human eyes from being damaged when a human directly looks at emission light from the diffractive optical element 130. As described above, the illumination device 100 is provided with the collimating optical system 120 between the light source 110 and the diffractive optical element 130, thereby weakening the intensity of the coherent light emitted from the light source 110 to intensity to less likely to damage the human eyes. The collimating optical system 120 enlarges the beam diameter of the coherent light from the light source 110 with the first lens 121 and collimates the coherent light after passing through the first lens 121 with the second lens 122. The collimating means is not limited to the above-described method, and a concave lens may be used or a single lens may be used. Further, a group of three or more lenses may be used.

To improve the safety measures, it is favorable that the beam diameter of the coherent light entering the diffractive optical element 130 through the second lens 122 becomes larger than a pupil area of the human. That is, since the diameter of the pupil of the human eye is about 7 mm at the maximum, the area of the pupil is about 38.5 square mm at the maximum. Therefore, it is desirable to design the first lens 121 and the second lens 122 in the collimating optical system 120 such that a beam area of the coherent light entering the diffractive optical element 130 becomes 38.5 square mm or more. As a result, the amount of light entering the pupil of the observer is limited to a part of the emission light emitted from the diffractive optical element 130. Therefore, the amount of the coherent light entering the pupil of the observer can be reduced.

In addition, by use of the diffractive optical element 130 as a directional diffusion plate, the coherent light can be prevented from being concentrated at one point on a retina, and the safety for eyes is further improved. Furthermore, the diffractive optical element 130 produced as a phase-type Fourier transform hologram is configured by tiling the plurality of element diffractive optical portions 131, 132, and the like, whereby the area of the diffractive optical element 130 can be made large. As a result, radiation illuminance distribution on the diffractive optical element 130 can be averaged and weakened.

§ 3. Diffractive Characteristic of Element Diffractive Optical Portion

Figure 5:
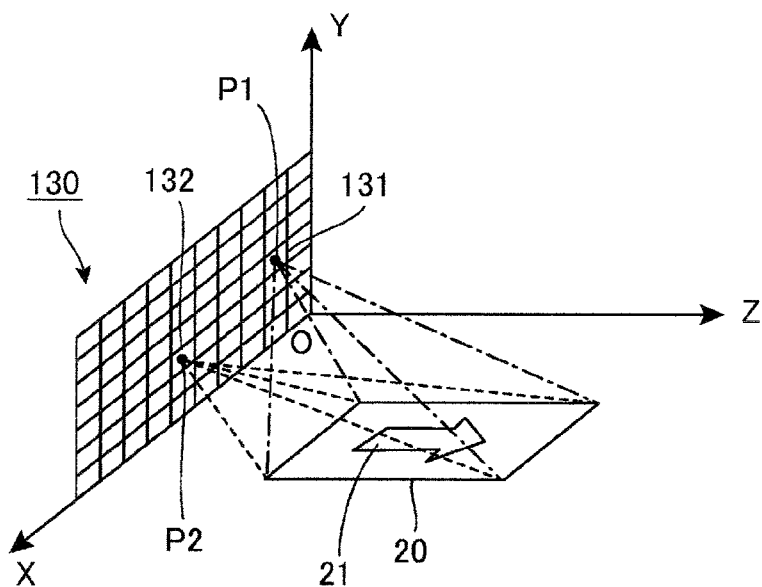
FIG. 5 is a perspective view illustrating diffractive characteristics of a diffractive optical element 130 illustrated in FIG. 4.

Next, diffractive characteristics of the individual element diffractive optical portions included in the diffractive optical element 130 in the illumination device 100 illustrated in FIG. 4 will be described. FIG. 5 is a perspective view of the diffractive optical element 130 and the region to be illuminated 20, for illustrating the diffractive characteristics. Here, an XYZ three-dimensional orthogonal coordinate system as illustrated is defined for convenience of description, and description will be given for the illumination device 100 (having the configuration illustrated in FIG. 4) mounted on a vehicle having a positive direction on an Z axis in FIG. 5 as the traveling direction on the assumption that a diffractive surface of the diffractive optical element 130 is located on an XY plane. Since the illustrated coordinate system has the positive direction on the Z axis as the traveling direction of the vehicle, the direction of the Z axis is opposite to a general XYZ three-dimensional orthogonal coordinate system.

In the case of the projector 50 illustrated in FIG. 3, it is typical to install the projector 50 such that a normal direction of an emission surface of a built-in diffractive optical element and a normal direction of the region to be illuminated on the screen 60 becomes parallel or nearly parallel. In contrast, the illumination device 100 according to the present invention is suitable for the application of being mounted on the vehicle and illuminating the front of the road surface 10, as illustrated in FIG. 2. In this case, a normal direction (a Z-axis direction in the example in FIG. 5) of an emission surface of the diffractive optical element 130 and a normal direction (a Y-axis direction in the example in FIG. 5) of the region to be illuminated 20 set on the plane are not parallel. In particular, in the case of the example illustrated in FIG. 2, an angle made by two normal lines is close to 90°. In such a use environment, as described above, the illumination pattern displayed on the region to be illuminated 20 tends to be unclear. This problem can be reduced by configuring the diffractive optical element 130 with the plurality of element diffractive optical portions.

As described in § 2, the diffractive optical element 130 includes the seventy sets of element diffractive optical portions arranged in seven rows by ten columns. Here, the diffractive characteristics of the first element diffractive optical portion 131 and the second element diffractive optical portion 132, which are illustrated, from among the element diffractive optical portions, will be described as representatives. Further, here, it is assumed that the light beam collimated by the collimating optical system 120 perpendicularly enters the incident surface of the diffractive optical element 130 as parallel light, as in the example illustrated in FIG. 4. Therefore, in FIG. 5, the collimated parallel light perpendicularly enters a back surface of the diffractive optical element 130 from a negative direction on the Z axis, and first-order diffracted light is emitted with a predetermined diffraction angle toward the positive direction on the Z axis.

As described above, the first-order diffracted light from the diffractive optical element 130 forms the region to be illuminated 20 including the predetermined illumination pattern (the arrow 21 in the illustrated example). In other words, the element diffractive optical portions 131 constituting the diffractive optical element 130 have the diffractive characteristics of forming the region to be illuminated 20 having the predetermined size and the predetermined shape at the predetermined position and diffracting the incident parallel light so that the predetermined illumination pattern is displayed in the region to be illuminated 20. Here, it is assumed that the region to be illuminated 20 is designed to be formed on the XZ plane for convenience of description. Therefore, the illustrated arrow 21 is also an illumination pattern formed on the XZ plane.

As illustrated by the one-dot chain lines in FIG. 5, the first-order diffracted light from the first element diffractive optical portion 131 illuminates the region to be illuminated 20 on the XZ plane to display the illumination pattern including the arrow 21 inside the region to be illuminated 20. Similarly, as illustrated by the broken lines in FIG. 5, the first-order diffracted light from the second element diffractive optical portion 132 illuminates the region to be illuminated 20 on the XZ plane to display the illumination pattern including the arrow 21 inside the region to be illuminated 20.

Note that FIG. 5 illustrates an image in which a representative point P1 is set at a center position of the first element diffractive optical portion 131 and a representative point P2 is set at a center position of the second element diffractive optical portion 132, and the first-order diffracted light is emitted from the representative points P1 and P2, for convenience. However, in practice, the first-order diffracted light is caused by interference fringes formed on the entire element diffractive optical portion 131 or 132 and is not emitted from only the representative point P1 or P2.

Further, FIG. 5 illustrates only the first-order diffracted light from the two element diffractive optical portions 131 and 132. However, in practice, the first-order diffracted light is emitted from all the seventy sets of element diffractive optical portions constituting the diffractive optical element 130 and illuminates the region to be illuminated 20 on the XZ plane to display the illumination pattern including the arrow 21 inside the region to be illuminated 20. As described above, the element diffractive optical portions form the same region to be illuminated 20 on the XZ plane but the positions are different on the coordinate space and thus angles to view the region to be illuminated 20 are different. Therefore, the diffractive characteristics of the element diffractive optical portions are also different from one another.

As described above, the diffractive optical element 130 used in the present invention has a function to diffract the coherent light collimated by the collimating optical system 120 into the predetermined diffusion angle space to illuminate the region to be illuminated 20 defined at a predetermined position and having predetermined size and shape. Furthermore, the diffractive optical element 130 includes the plurality of element diffractive optical portions 131, 132, and the like, and each of the element diffractive optical portions illuminates at least a part of the region to be illuminated 20. Further, in the case of the example described here, the diffractive characteristics of the element diffractive optical portions are different from one another.

With such a configuration, a clear illumination pattern with suppressed blur can be formed on the desired region to be illuminated 20. For the theoretical reason that the above effect can be obtained by configuring the diffractive optical element 130 by the plurality of element diffractive optical portions 131, 132, and the like, the inventors of the present application consider that it is because the region to be illuminated 20 is formed by the group of the independent individual illumination patterns respectively obtained by the diffracted light from the plurality of element diffractive optical portions 131, 132, and the like, and furthermore, the independent individual illumination patterns are obtained by the diffractive characteristics that are different from one another, whereby positional deviation of the individual illumination patterns is suppressed, and as a result, a clear projection image is formed. That is, the inventors consider that it is because the element diffractive optical portions respectively have the individual diffractive characteristics that minimize blur in the illumination pattern with respect to the region to be illuminated 20 in a predetermined three-dimensional space, and the diffraction angles from the individual element diffractive optical portions are respectively corrected to appropriate values.

Figure 6:
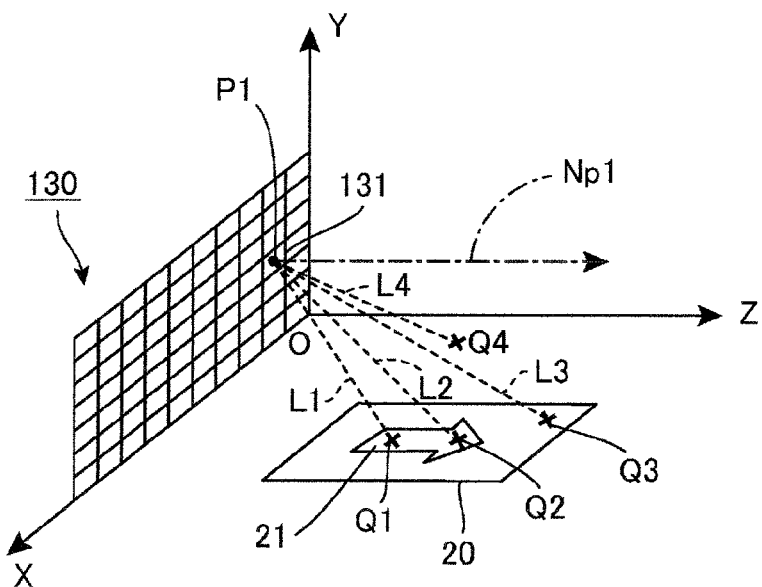
FIG. 6 is a perspective view illustrating first-order diffracted light L1 to L4 (broken lines) headed from a first element diffractive optical portion 131 illustrated in FIG. 5 to reference points Q1 to Q4 defined on an XZ plane.

FIG. 6 is a perspective view illustrating first-order diffracted light L1 to L4 headed from the first element diffractive optical portion 131 to reference points Q1 to Q4 defined on the XZ plane. As described above, FIG. 6 illustrates an image in which the first-order diffracted light L1 to L4 illustrated by the broken lines is emitted from the representative point P1 for convenience. However, in practice, the first-order diffracted light is caused by the interference fringes formed on the entire element diffractive optical portion 131.

Here, it is assumed that the inside of the arrow 21 is illuminated with high luminance and the outside of the arrow 21 is illuminated with low luminance inside the region to be illuminated 20, and the outside of the region to be illuminated 20 is not illuminated. Therefore, when an observer observes the XZ plane, he/she can recognize the bright arrow 21 inside the slightly bright rectangular region to be illuminated 20. To display such an illumination pattern on the XZ plane as the plane to be illuminated, the intensity of the first-order diffracted light L1 to L4 needs to be adjusted according to the illumination pattern. Specifically, the intensities of the diffracted lights L1 and L2 illuminating the reference points Q1 and Q2 in the bright arrow 21 are made strong, the intensity of the diffracted light L3 illuminating the reference point Q3 in the slightly bright region to be illuminated 20 is made weak, and the intensity of the diffracted light L4 illuminating the reference point Q4 outside the region to be illuminated 20 is set to zero (that is, no diffracted light L4 exists).

As described above, the intensity of the diffracted light L1 to L4 headed to the four reference points Q1 to Q4 on the XZ plane has been described. In practice, the diffractive characteristics with predetermined intensity are set to the diffracted light headed to countless numbers of points existing on the XZ plane. That is, a unique diffractive characteristic that the first-order diffracted light having strong intensity is headed in a direction of illuminating the inside of the bright arrow 21, and the first-order diffracted light having weak intensity is headed in a direction illuminating the slightly bright region to be illuminated 20, and no light is diffracted into the other directions is set to the element diffractive optical portion 131. Then, a hologram with which the first-order diffracted light according to the unique diffractive characteristic can be obtained is formed in the element diffractive optical portion 131. As for the other element diffractive optical portions, the diffractive characteristics are set by a similar method, and holograms according to the diffractive characteristics are formed. In practice, each element diffractive optical portion functions as a hologram having a predetermined diffractive characteristic by recording predetermined interference fringes.

As described above, the diffractive characteristic unique to each element diffractive optical portion can be defined as a combination of a diffracting direction and the intensity of the first-order diffracted light. Here, in the example described here, the diffracting direction of the first-order diffracted light is expressed by two sets of angles of a vertical-direction displacement angle θV and a horizontal-direction displacement angle θH. Here, the vertical-direction displacement angle θV indicates a displacement angle in a vertical direction (the Y-axis direction in the illustrated coordinate system) with respect to a normal line set at the representative point P of the element diffractive optical portion, and the horizontal-direction displacement angle θH indicates a displacement angle in a horizontal direction (an X-axis direction in the illustrated coordinate system) with respect to the normal line. For example, FIG. 6 illustrates a normal line Np1 as the normal line set at the representative point P1 of the element diffractive optical portion 131, and the diffracting direction of each of the diffracted light L1 to L4 is expressed by the vertical-direction displacement angle θV indicating displacement in the vertical direction and the horizontal-direction displacement angle θH indicating displacement in the horizontal direction with respect to the normal line Np1.

Figure 7:
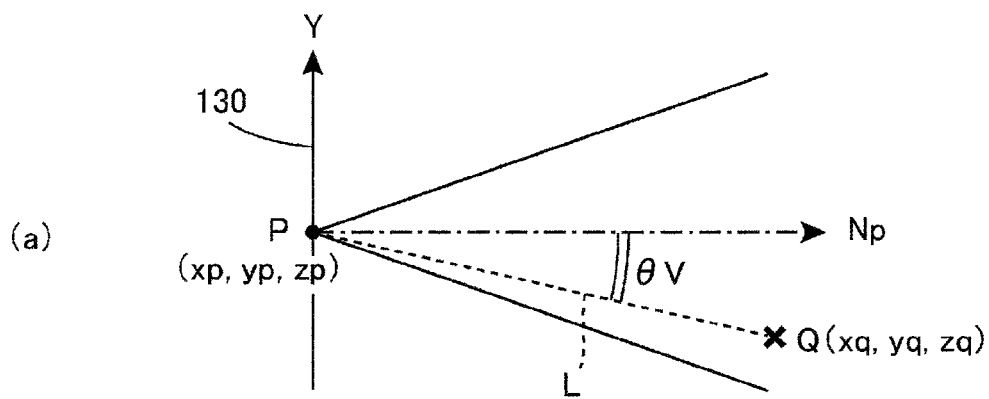
FIG. 7 is graphs illustrating a method of expressing angular space distribution of first-order diffracted light intensity using displacement angles θV and θH.
Figure 7:
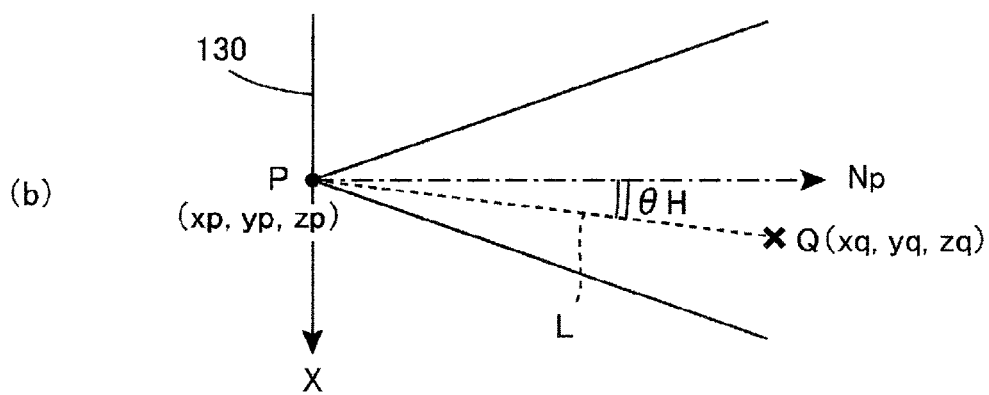
Figure 7:
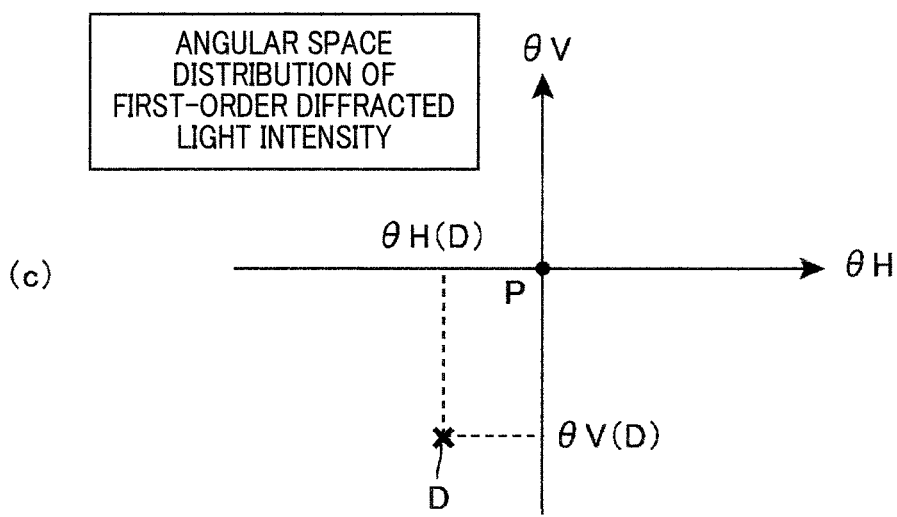

FIG. 7 is graphs illustrating a method of expressing angular space distribution of the first-order diffracted light intensity using such displacement angles θV and θH. FIG. 7(a) is a side view of the XYZ three-dimensional orthogonal coordinate system illustrated in FIG. 6, corresponding to a view in which an optical path (broken line) of the first-order diffracted light L is projected on the YZ plane, and an up direction in FIG. 7(a) is the positive direction on the Y axis and a right direction is the positive direction on the Z axis. FIG. 7(a) illustrates a state in which the first-order diffracted light L (broken line) emitted from the representative point P (xp, yp, zp) of the element diffractive optical portion constituting the diffractive optical element 130 arranged on the XY plane is headed to a reference point Q (xq, yq, zq) on the region to be illuminated. In the illustrated example, the first-order diffracted light L is emitted in a direction forming the vertical-direction displacement angle θV with respect to a normal line Np (parallel to the Z axis) set at the reference point P. An angle range sandwiched by the solid lines in FIG. 7(a) indicates the diffusion angle space to which the first-order diffracted light is headed from the representative point P, and the first-order diffracted light travels in the optical path in the diffusion angle space and forms the predetermined region to be illuminated 20 on the plane to be illuminated.

Meanwhile, FIG. 7(b) is a top view of the XYZ three-dimensional orthogonal coordinate system illustrated in FIG. 6, corresponding to a view in which the optical path (broken line) of the first-order diffracted light L is projected on the XZ plane, and a down direction in FIG. 7(b) is the positive direction on the X axis and a right direction is the positive direction on the Z axis. FIG. 7(b) illustrates a state in which the first-order diffracted light L (broken line) emitted from the representative point P (xp, yp, zp) of the element diffractive optical portion constituting the diffractive optical element 130 arranged on the XY plane is headed to the reference point Q (xq, yq, zq) on the region to be illuminated. In the illustrated example, the first-order diffracted light L is emitted in a direction forming the horizontal-direction displacement angle θH with respect to the normal line Np (parallel to the Z axis) set at the reference point P. Even in FIG. 7(b), an angle range sandwiched by the solid lines indicates the diffusion angle space to which the first-order diffracted light is headed from the representative point P, and the first-order diffracted light travels in the optical path in the diffusion angle space and forms the predetermined region to be illuminated 20 on the plane to be illuminated.

Even FIGS. 7(a) and 7(b) illustrate images in which all the first-order diffracted light is emitted from only the representative point P for convenience of illustration. However, in practice, the first-order diffracted light is caused by the interference fringes formed on the entire surface of one element diffractive optical portion and is not emitted from only the representative point P. However, for convenience, if the first-order diffracted light emitted from the same element diffractive optical portion is treated as light emitted from the representative point P (for example, a central point) in the element diffractive optical portion, the traveling direction (diffracting direction) can be expressed by the two sets of angles: the vertical-direction displacement angle θV and the horizontal-direction displacement angle θH. For example, the direction of the diffracted light from the representative point P (xp, yp, zp) to the reference point Q (xq, yq, zq) can be expressed by two sets of angles (θV, θH).

As described above, since the direction of the first-order diffracted light traveling from the representative point P to various directions can be expressed by the two sets of angles of (θV, θH), the direction of the first-order diffracted light emitted from a certain element diffractive optical portion can be indicated by position coordinates of a distribution point D on the angular space distribution expressed by a two-dimensional orthogonal coordinate system θH-θN, as illustrated in FIG. 7(c). Therefore, distribution points D with predetermined intensity on the two-dimensional orthogonal coordinate system θH-θV are information indicating the angular space distribution of the first-order diffracted light intensity emitted from the element diffractive optical portion and are nothing less than information indicating the diffractive characteristic of the element diffractive optical portion.

For example, in the graph illustrated in FIG. 7(c), in a case where intensity A(D) is defined for the distribution point D, this case indicates a diffractive characteristic in which the intensity of the first-order diffracted light emitted from the representative point P to the direction forming the vertical-direction displacement angle θV(D) and the horizontal-direction displacement angle θH(D) is A(D). When the angular space distribution (diffractive characteristic) of the first-order diffracted light intensity is defined for a specific element diffractive optical portion in this manner, a hologram (interference fringes) with which the defined diffractive characteristic can be obtained is formed for the element diffractive optical portion. The light entering the element diffractive optical portion is parallel light collimated by the collimating optical system 120 illustrated in FIG. 4. Therefore, a hologram having a function to diffract such parallel light according to the defined diffractive characteristic is formed.

Figure 8:
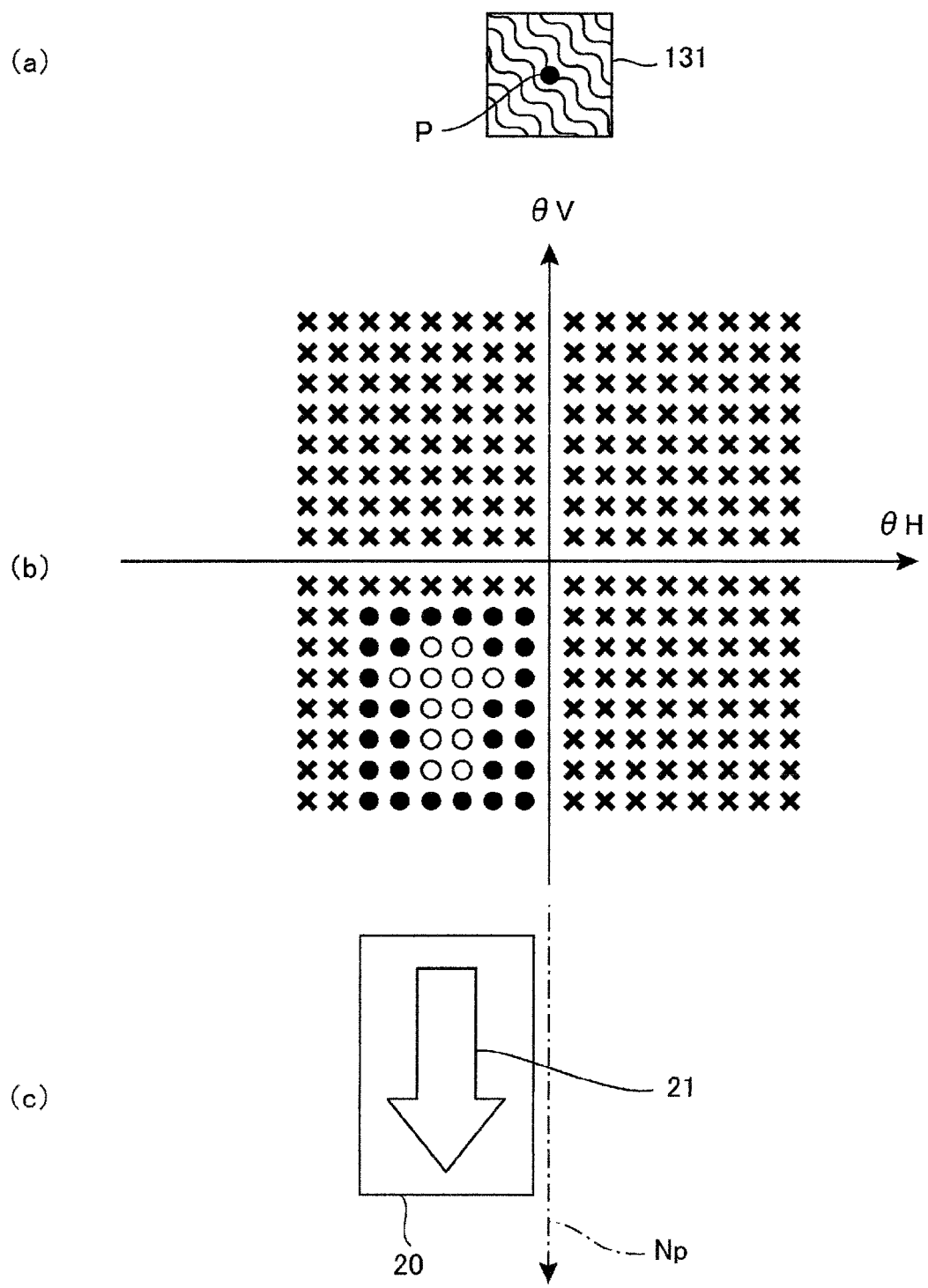
FIG. 8 is diagrams illustrating interference fringes formed in the element diffractive optical portion 131 illustrated in FIG. 6 and diffractive characteristics of the interference fringes.

FIG. 8 is diagrams illustrating the interference fringes formed in the element diffractive optical portion 131 illustrated in FIG. 6 and the diffractive characteristic of the interference fringes. Specifically, FIG. 8(a) is a plan view of the element diffractive optical portion 131, and the representative point P is defined at the center position of the element diffractive optical portion 131. Here, the waveform pattern drawn inside the element diffractive optical portion 131 indicates that interference fringes having a specific diffractive characteristic are recorded. As described above, the interference fringes having a specific diffractive characteristic, which causes the first-order diffracted light illuminating the entire or part of the predetermined region to be illuminated 20 is recorded in the element diffractive optical portion 131.

FIG. 8(b) is a graph (a graph on the two-dimensional orthogonal coordinate system θH-θV) illustrating the angular space distribution of the first-order diffracted light intensity exhibiting the specific diffractive characteristic determined by the interference fringes. Here, each of the x marks, black circles, and white circles arrayed in a grid manner is a distribution point indicating a predetermined diffracting direction expressed by two sets of angles (θV, θH), and each distribution point is associated with predetermined intensity A. Specifically, a white circle represents high intensity A(high), a black circle represents low intensity A(low), and an x mark represents zero intensity. The zero intensity means that no diffracted light exists in the direction. In other words, no first-order diffracted light is headed from the element diffractive optical portion 131 to the directions indicated by the distribution points with the x marks.

The reason why the distribution points located in the first, second, and fourth quadrants are all x marks (zero intensity) in the graph in FIG. 8(b) is that the first-order diffracted light diffracted left downward (the diffracted light corresponding to the distribution point located in the third quadrant) as viewing the element diffractive optical portion 131 from the front is sufficient to illuminate the region to be illuminated 20, as illustrated in FIG. 6. Therefore, no first-order diffracted light headed upward or right downward is generated from the element diffractive optical portion 131.

FIG. 8(c) is a top view illustrating the region to be illuminated 20 illustrated in FIG. 6, and Np is a normal line set at the representative point P. The angular space distribution illustrated in FIG. 8(b) corresponds to the distribution of the element diffractive optical portion 131 arranged on the XY plane in FIG. 6 as viewed from the front (the positive direction on the Z axis), and the region to be illuminated 20 illustrated in FIG. 8(c) is a region illuminated by the diffracted light having the diffractive characteristic according to the angular space distribution illustrated in FIG. 8(b). Therefore, the intensity of the distribution points illustrated in FIG. 8(b) matches the illumination pattern (arrow 21) in the region to be illuminated 20 illustrated in FIG. 8(c).

Specifically, the diffracted light with high intensity headed in the directions indicated by the white circles in FIG. 8(b) forms the arrow 21 displayed with high luminance on the XZ plane (plane to be illuminated), and the diffracted light with low intensity headed in the directions indicated by the black circles in FIG. 8(b) forms the region to be illuminated 20 (except the inside of the arrow 21) displayed with low luminance on the XZ plane. Further, since no first-order diffracted light exists in the directions indicated by the x marks in FIG. 8(b), the region outside the region to be illuminated 20 on the XZ plane is not illuminated.

After all, to form the region to be illuminated 20 with the illumination pattern as illustrated in FIG. 8(c) on the plane to be illuminated, the element diffractive optical portion 131 as illustrated in FIG. 8(a) is prepared by defining the angular space distribution of the first-order diffracted light intensity as illustrated in FIG. 8(b) according to the illumination pattern and recording the hologram having the diffractive characteristic according to the angular space distribution on a medium as the interference fringes. By recording a hologram having a predetermined diffractive characteristic in each of a large number of element diffractive optical portions by the above method, the diffractive optical element 130 to be used in the present invention can be produced.

Note that the example described so far is an example of illuminating the common region to be illuminated 20 by each of the element diffractive optical portions as illustrated in FIG. 5, and a hologram having a diffractive characteristic for illuminating the same entire region to be illuminated 20 is recorded in each of the element diffractive optical portions. However, all of the plurality of element diffractive optical portions used in the present invention do not necessarily have the function to illuminate the same entire region to be illuminated 20, and it is sufficient that each of the element diffractive optical portions has a function to illuminate at least a part of the region to be illuminated.

Figure 9:
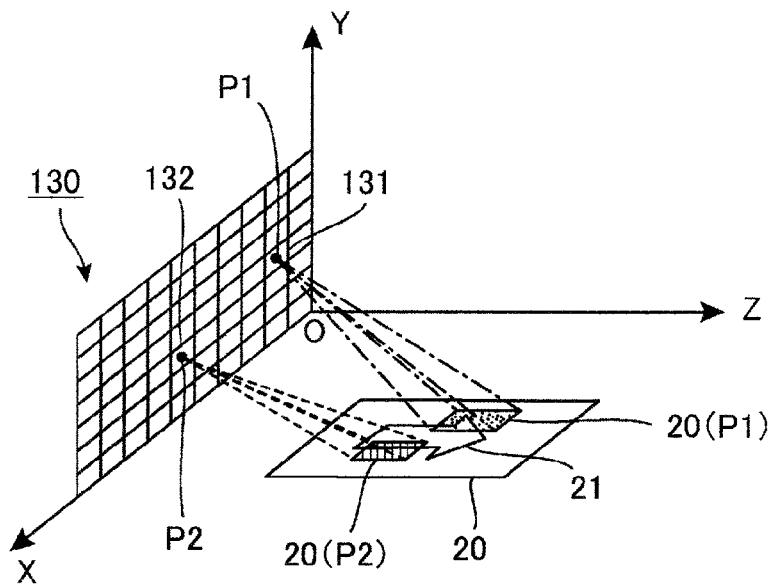
FIG. 9 is a perspective view illustrating an example in which individual element diffractive optical portions illuminate only parts of the region to be illuminated 20, respectively.

FIG. 9 is a perspective view illustrating an example in which individual element diffractive optical portions illuminate only parts of the region to be illuminated 20, respectively. FIG. 9 illustrates an example in which the first element diffractive optical portion 131 illuminates the partial region to be illuminated 20(P1) and the second element diffractive optical portion 132 illuminates the partial region to be illuminated 20(P2). Other element diffractive optical portions similarly have the function to illuminate a partial region to be illuminated, and the rectangular region to be illuminated 20 is illuminated by the diffractive optical element 130 including the plurality of element diffractive optical portions as a whole.

Here, the partial region to be illuminated 20(P1) is a rectangular region hatched with dots in FIG. 9, and a hologram having a diffractive characteristic for causing the first-order diffracted light to be headed into the partial region to be illuminated 20(P1) is recorded in the first element diffractive optical portion 131 having the representative point P1. Similarly, the partial region to be illuminated 20(P2) is a rectangular region hatched with slant lines in FIG. 9, and a hologram having a diffractive characteristic for causing the first-order diffracted light to be headed into the partial region to be illuminated 20(P2) is recorded in the second element diffractive optical portion 132 having the rectangular region P2. Similarly, holograms having diffractive characteristics for causing the first-order diffracted light to be headed into predetermined partial region to be illuminated are respectively recorded in the other element diffractive optical portions.

After all, in the case of the example illustrated in FIG. 9, the individual element diffractive optical portions are responsible for parts of the region to be illuminated 20 and serve to illuminate only the responsible regions. Therefore, the angular space distribution of the first-order diffracted light for each of the element diffractive optical portions is further narrowed and it is not necessary to diffract the incident light in an unreasonable direction. In short, in the example illustrated in FIG. 9, the individual element diffractive optical portions have functions to illuminate predetermined partial regions to be illuminated, respectively, and the region to be illuminated defined at a predetermined position and having predetermined size and shape is formed by the aggregate of the partial regions to be illuminated.

Note that, in the example illustrated in FIG. 9, the partial region to be illuminated 20(P1) taken care of by the first element diffractive optical portion 131 and the partial region to be illuminated 20(P2) taken care of by the second element diffractive optical portion 132 are separated from each other but the regions may partially overlap each other. In short, the partial regions to be illuminated illuminated by the individual element diffractive optical portions may overlap each other.

Figure 10:
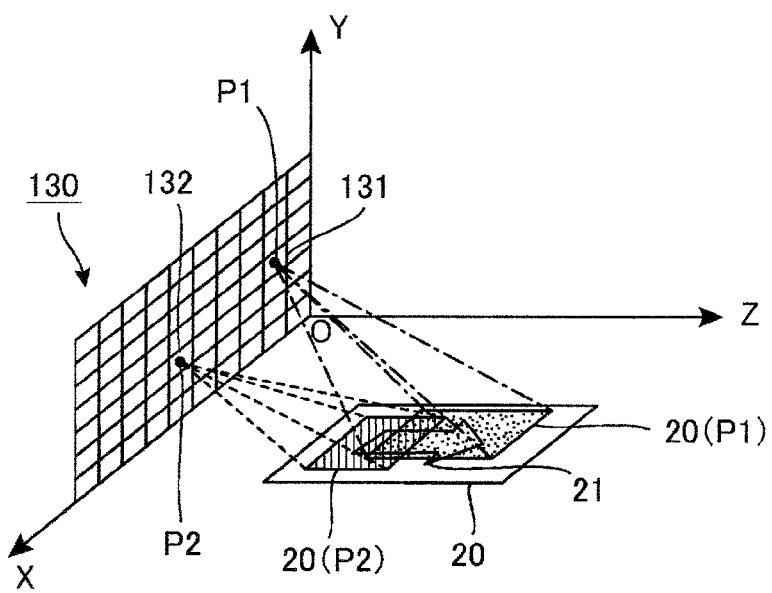
FIG. 10 is a perspective view illustrating another example in which individual element diffractive optical portions illuminate only parts of the region to be illuminated 20, respectively.

FIG. 10 is a perspective view illustrating an example in which such overlap has occurred. The partial region to be illuminated 20(P1) is illuminated by the first element diffractive optical portion 131 and the partial region to be illuminated 20(P2) is illuminated by the second element diffractive optical portion 132, similarly to the example illustrated in FIG. 9, but the partial region to be illuminated 20(P1) hatched with dots in FIG. 10 and the partial region to be illuminated 20(P2) hatched with slant lines in FIG. 10 partially overlap each other. In this way, the partial regions to be illuminated handled by the individual element diffractive optical portions may overlap each other. Even in this example illustrated in FIG. 10, the diffractive optical element 130 including the plurality of element diffractive optical portions as a whole illuminates the rectangular region to be illuminated 20.

Note that, in the case of adopting the implementation in which the individual element diffractive optical portions 131, 132, and the like have the functions to respectively illuminate the partial regions to be illuminated 20(P1), 20(P2), and the like that are different from one another, and the group of the partial regions to be illuminated forms the region to be illuminated 20, as in the example illustrated in FIGS. 9 and 10, it is favorable to adjust the intensity of the first-order diffracted light emitted from the individual element diffractive optical portions 131, 132, and the like so that luminance unevenness does not occur in the portions of the illumination pattern formed on the region to be illuminated 20. In particular, in the case where a portion with overlap and a portion without overlap co-exist in the partial regions to be illuminated, as in the example illustrated in FIG. 10, it is favorable to set the intensity of the first-order diffracted light illuminating the portion with overlap to be low so as not to cause a difference in luminance from the portion without overlap.

As described above, in the illumination device 100 according to the basic embodiment of the present invention, the diffractive characteristics of the diffractive optical element 130 are designed to illuminate the region to be illuminated 20 having predetermined size and shape at a predetermined position with respect to the diffractive optical element 130, and the coherent light diffracted by the diffractive optical element 130 directly illuminates the region to be illuminated 20. Therefore, the region to be illuminated 20 provided in an arbitrary angular space can be clearly illuminated. Further, in this embodiment, since a lens is not provided on a rear side of the optical axis of the diffractive optical element 130, it is not necessary to arrange the region to be illuminated 20 on a focal plane of the lens in parallel to the diffractive optical element 130, and restrictions on the position, size, and shape of the region to be illuminated 20 are relaxed.

Further, in this embodiment, since the coherent light emitted from the light source 110 is brought to enter the diffractive optical element 130 after the beam diameter of the coherent light is expanded by the collimating optical system 120, the light intensity of the coherent light on the incident surface of the diffractive optical element 130 can be reduced, and the risk of damaging human eyes is absent even if a human directly looks at the diffractive optical element 130 and the safety of handling the coherent light can be improved.

Furthermore, in this embodiment, since the plurality of element diffractive optical portions 131, 132, and the like obtained by dividing the diffractive optical element 130 into the plurality of portions is provided, the amount of blur in the region to be illuminated 20 can be reduced.

§ 4. Method of Producing Hologram to be Formed on Element Diffractive Optical Portion In the element diffractive optical portion 131 constituting the diffractive optical element 130 used in the illumination device 100 according to the present invention, a hologram causing the first-order diffracted light that illuminates the entire or part of the predetermined region to be illuminated 20 is recorded, as illustrated in FIG. 8(a). This hologram has a function to cause the parallel light radiated from the collimating optical system 120 to cause a diffraction phenomenon based on the specific diffractive characteristic according to the angular space distribution of the first-order diffracted light intensity illustrated in FIG. 8(b). In other words, the individual element diffractive optical portions included in the diffractive optical element 130 constitute independent holograms respectively causing diffraction phenomena based on specific diffractive characteristics.

Therefore, to manufacture the diffractive optical element 130 to be used in the present invention, the specific diffractive characteristics are respectively defined and the holograms causing the diffraction phenomena based on the diffractive characteristics need to be formed for the individual element diffractive optical portions serving as components of the diffractive optical element 130. Such a hologram can usually be produced on a photosensitive master plate by an optical method or can be produced using a computer using a technique of computer generated hologram (CGH).

For example, to form the image (region to be illuminated 20) composed of the illumination pattern having the arrow 21 at a predetermined position on the XZ plane, as in the example illustrated in FIG. 6, a hologram having a function to reproduce such an image is recorded in the element diffractive optical portion 131.

To produce such a hologram by an optical method, a processes of arranging the photosensitive master plate at the position of the element diffractive optical portion 131 illustrated in FIG. 6, displaying the illumination pattern with the arrow 21 on the region to be illuminated 20 as an original in some fashion, irradiating the photosensitive master plate with light from the illumination pattern as object light, irradiating the photosensitive master plate with the parallel illumination light from the collimating optical system 120 as reference light, recording the interference fringes caused by an interference between the object light and the reference light on the photosensitive master plate, and using the photosensitive master plate on which the interference fringes are recorded as the element diffractive optical portion 131 are performed. Meanwhile, to produce such a hologram by a typical CGH technique, the interference fringes to be recorded in the element diffractive optical portion 131 is obtained by simulating the above-described optical phenomenon on a computer.

However, it is difficult to produce the hologram used as the diffractive optical element 130 of the on-vehicle illumination device 100 as illustrated in FIG. 2 on a commercial basis even using the optical technique or the typical CGH technique (the simulation of the optical phenomenon). That is, to produce the hologram used as the diffractive optical element 130 using the optical technique, an optical system in which a space of 60 m or more in length is secured is required, and thus it is difficult to form the interference fringes with high precision on the photosensitive master plate, as illustrated in FIG. 2. Meanwhile, to simulate the optical phenomenon caused in the space of 60 m or more in length by the typical CGH technique, calculation based on a huge amount of data is required and production of the hologram on a commercial basis is difficult.

Therefore, the inventors of the present application has arrived at use of a technique generally called "repetitive Fourier transform method" as a method of producing holograms to be recorded in the individual element diffractive optical portions constituting the diffractive optical element 130 of the illumination device 100 according to the present invention. Therefore, hereinafter, a specific procedure of producing holograms to be recorded in the individual element diffractive optical portions using the "repetitive Fourier transform method" will be described. This procedure is a procedure of creating a hologram using a computer and falls within the scope of the CGH technology, but this procedure is completely different from the typical CGH procedure of simulating the optical phenomenon where the interference fringes are formed by the interference between the object light and the reference light. Therefore, this procedure does not produce an object wave by combining wavefronts generated from the respective points in the region to be illuminated 20.

Figure 11:
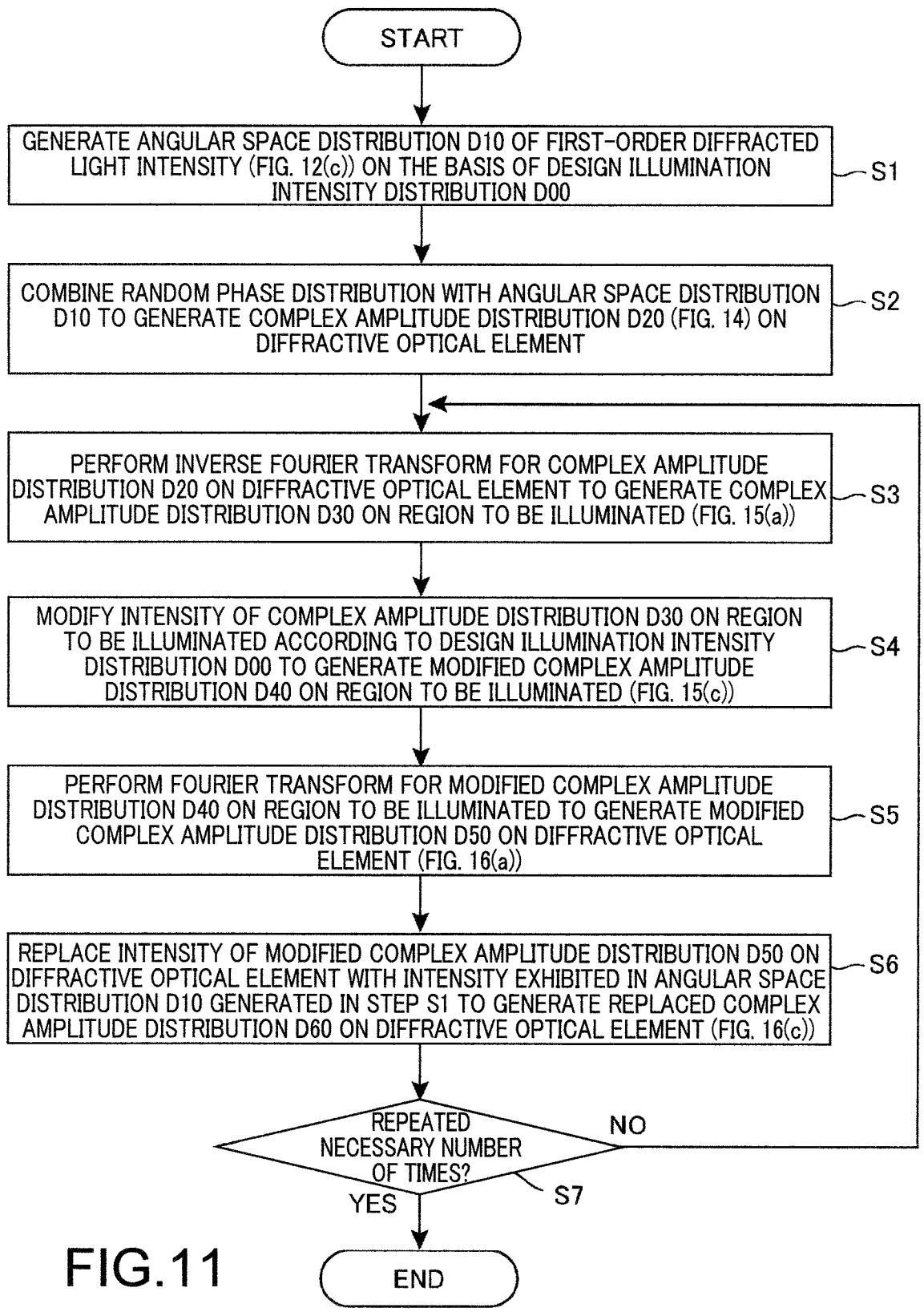
FIG. 11 is a flowchart illustrating a specific procedure of determining unique diffractive characteristics, for a hologram (interference fringes) to be recorded in the element diffractive optical portion 131 illustrated in FIG. 8(a).

FIG. 11 is a flowchart illustrating a specific procedure of determining unique diffractive characteristics of a hologram (interference fringes) to be recorded in the element diffractive optical portion 131 illustrated in FIG. 8(a). This procedure uses the above-described "repetitive Fourier transform method" and is executed as calculation processing using a computer in practice. Hereinafter, a specific procedure of creating a hologram to be recorded in an individual element diffractive optical portion will be described with reference to this flowchart. Note that the processing in steps S1 to S7 illustrated in FIG. 11 is actually executed by a computer in which a predetermined program is incorporated.

The procedure illustrated in FIG. 11 is processing based on the premise that the region to be illuminated 20 is located distant from the diffractive optical element 130, and a diffracted image on the region to be illuminated 20 is a Fraunhofer diffracted image. Therefore, even if the normal direction of the region to be illuminated 20 is not parallel to the normal direction of the emission surface of the diffractive optical element 130, the illumination intensity can be made uniform over the entire region to be illuminated 20, and blur in the region to be illuminated 20 can be suppressed.

First, in step S1, processing of generating the angular space distribution D10 of the intensity of the first-order diffracted light emitted from the element diffractive optical portion 131 is performed on the basis of predetermined design illumination intensity distribution D00 defined in the region to be illuminated 20. Here, the design illumination intensity distribution D00 is luminance distribution of an illumination pattern to be displayed in the region to be illuminated 20 to be illuminated by the illumination device 100, and is two-dimensional illumination intensity distribution predetermined by a designer.

Figure 12:
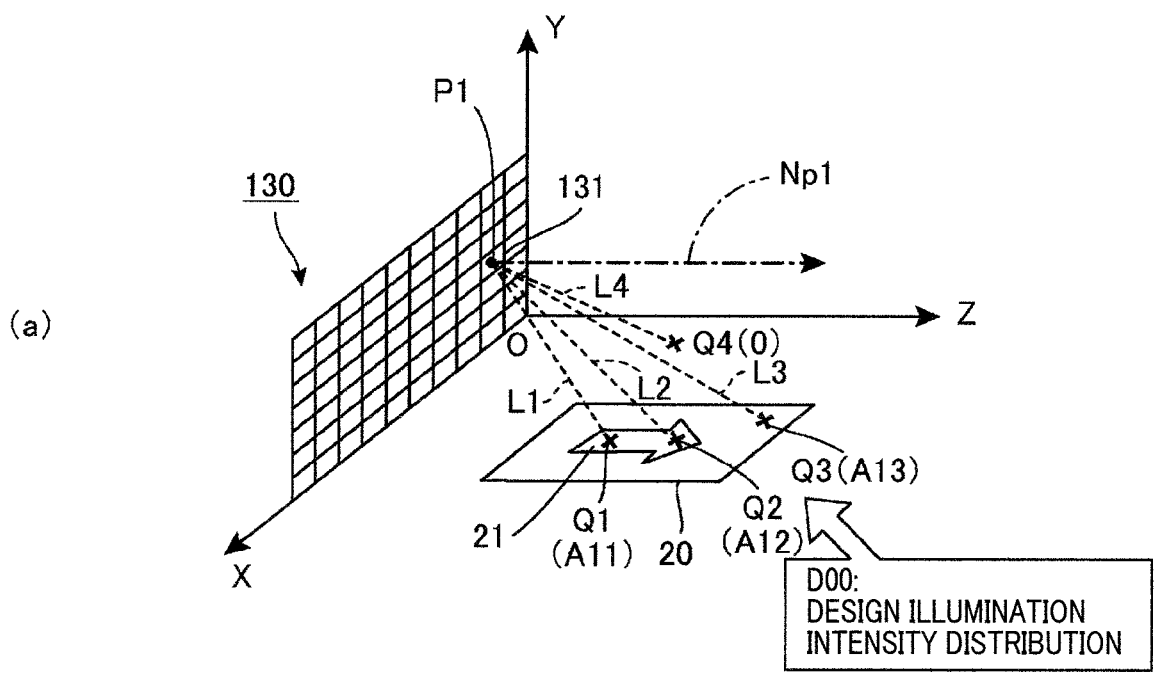
FIG. 12 is diagrams illustrating a specific example of a process of generating angular space distribution D10 of intensity in step S1 in the flowchart illustrated in FIG. 11.
Figure 12:
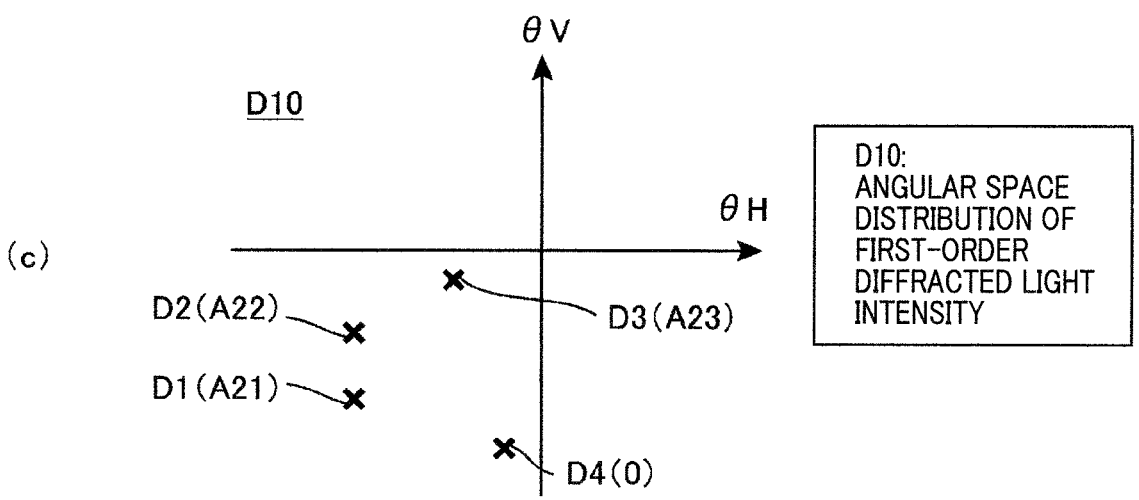

FIG. 12 is diagrams illustrating a specific example of a process of generating angular space distribution D10 of intensity in step S1. Here, the processing performed in step S1 will be specifically described on the basis of the example illustrated in FIG. 12.

First, FIG. 12(a) is a perspective view illustrating a state in which the first-order diffracted light from the element diffractive optical portion 131 arranged on the XY plane is headed to the XZ plane that serves as the plane to be illuminated, similarly to FIG. 6. The diffractive optical element 130 serves to diffract the incident coherent light into a predetermined diffusion angle space to illuminate the region to be illuminated 20 defined at a predetermined position and having predetermined size and shape. In this example, the region to be illuminated 20 formed in a rectangular shape is defined at a predetermined position on the XZ plane that serves as the plane to be illuminated, and the first-order diffracted light (L1 to L3, for example) from the element diffractive optical portion 131 is headed to the region to be illuminated 20.

Note that the first-order diffracted light L4 headed to the outside of the region to be illuminated 20 is illustrated in FIG. 12(a) for convenience. However, as described above, the first-order diffracted light L4 does not exist in practice, and no diffraction phenomenon occurs in the direction toward the reference point Q4. In other words, the element diffractive optical portion 131 diffracts the incident coherent light only in the diffusion angle space headed into the rectangular region to be illuminated 20. As a result, only the inside of the region to be illuminated 20 is illuminated, and if the road surface 10 is located on the XZ plane, the illustrated illumination pattern (the pattern with the arrow 21 drawn in the rectangular region to be illuminated 20) is displayed on the road surface 10.

Such an illumination pattern is a pattern arbitrarily designed by the designer, and the designer can define an illumination pattern including arbitrary figures and characters. Of course, the luminance distribution of each portion constituting the pattern can also be arbitrarily set. In the present application, the luminance distribution of the illumination pattern arbitrarily set by the designer in this manner is called design illumination intensity distribution D00. Here, the following description will be given on the assumption that design to set the design luminance of the inside of the arrow 21 (the positions of the reference points Q1 and Q2, for example) to be high luminance, and the design luminance of the inside of the region to be illuminated 20 and the outside of the arrow 21 (the position of the reference point Q3, for example) to be low luminance is made. Note that the position of the reference point Q4 is out of the target of illumination in design, and the design luminance is 0.

The design illumination intensity distribution D00 indicates distribution of design luminance on the XZ plane that serves as the plane to be illuminated, and in the above example, three levels of luminance: high luminance, low luminance, and zero luminance are set according to positions. The design illumination intensity distribution D00 can be defined as, for example, a table as illustrated in FIG. 12(b). The illustrated table contains, for convenience of description, data indicating the coordinates and the design illumination intensity for the four reference points Q1 to Q4 located on the XZ plan. However, an actual table contains similar data for a large number of reference points defined on the XZ plane.

In the illustrated example, a design illumination intensity A11 is defined at the reference point Q1 (xq1, yq1, zq1), and a design illumination intensity A12 is defined at the reference point Q2 (xq2, yq2, zq2), a design illumination intensity A13 is defined at the reference point Q3 (xq3, yq3, zq3), and no design illumination intensity is defined at the reference point Q4 (xq4, yq4, zq4). Here, A11 and A12 are data indicating high luminance (for example, luminance value of 100%), and A12 is data indicating low luminance (for example, luminance value of 30%). The reference point Q4 for which the design illumination intensity is undefined may be treated on the assumption that the luminance value of 0% is defined.

In FIG. 12(a), the reference symbols A11, A12, A13, and 0 illustrated in parentheses adjacent to the reference symbols Q1 to Q4 indicate the design illumination intensity contained in the table of FIG. 12(b).

Of course, the data format of the design illumination intensity distribution D00 is not limited to the table format in which predetermined luminance values are defined for a large number of reference points, as illustrated in FIG. 12(b), and any data format may be adopted as long as luminance distribution of an illumination pattern to be displayed in the region to be illuminated 20 can be indicated. For example, a rectangle or a figure of the arrow 21 constituting the region to be illuminated 20 may be expressed by vector data indicating its outline, and the design illumination intensity distribution D00 may be configured by data indicating that the inside of the arrow 21 has a luminance value of 100%, and the outside of the arrow 21 and the inside of the region to be illuminated 20 have a luminance value of 30%, and the further outside has a luminance value of 0%.

The above-described illumination pattern is a pattern having three levels of variations of the luminance values of 0%, 30%, and 100%, but if variations in luminance values are increased to enable richer gradation expression, an illumination pattern with gradation can be designed. In this case, the design illumination intensity distribution D00 can be prepared as image data of a gradation image having the luminance values as pixel values.

In step S1, the angular space distribution D10 of the intensity of the first-order diffracted light emitted from the element diffractive optical portion 131 is generated on the basis of predetermined design illumination intensity distribution D00 defined as described above. In the example illustrated here, as illustrated in FIG. 12(a), the normal line Np1 is set at the predetermined representative point P1 (for example, the central point) in the element diffractive optical portion 131, and the two-dimensional orthogonal coordinate system θH-θV having the vertical-direction displacement angle θV indicating angular displacement in the vertical direction (Y-axis direction) with respect to the normal line Np1 and the horizontal-direction displacement angle θH indicating angular displacement in the horizontal direction (X-axis direction) with respect to the normal line Np1 as coordinate axes is defined. As already described with reference to FIG. 7(c) in § 3, the angular space distribution of the first-order diffracted light intensity can be illustrated using such a coordinate system.

FIG. 12(c) is an example in which the angular space distribution D10 of intensity is defined using this two-dimensional orthogonal coordinate system θH-θV, and the distribution points D1 to D4 corresponding to the four lines of first-order diffracted light L1 to L4 illustrated in FIG. 12(a) (no first-order diffracted light L4 exists in practice, as described above) are illustrated by the x marks. As illustrated in FIG. 7(c), the position of an arbitrary distribution point D on the coordinate system θH-θV indicates a specific vertical-direction displacement angle θV(D) and horizontal-direction displacement angle θH(D), and indicates the direction of the first-order diffracted light emitted from the representative point P. Therefore, the positions of the distribution points D1 to D4 illustrated by the x marks in FIG. 12(c) indicate the directions of the first-order diffracted light L1 to L4, respectively.

The angular space distribution D10 of the first-order diffracted intensity generated in step S1 is obtained by giving predetermined intensity (first-order diffracted light intensity) to these distribution points D1 to D4, respectively. The example illustrated in FIG. 12(c) is given the intensity corresponding to the table illustrated in FIG. 12(b) (a table D00 illustrating the design illumination intensity distribution), and the reference symbols A21, A22, A23, and 0 illustrated in parentheses adjacent to the reference symbols D1 to D4 of the distribution points correspond to the design illumination intensity A11, A12, A13, and 0 contained in the table in FIG. 12(b).

For example, the intensity of A21 is given to the distribution point D1 illustrated in FIG. 12(c), and this intensity can be defined by the following method. First, the vertical-direction displacement angle $\theta V(D1)$ and the horizontal-direction displacement angle $\theta H(D1)$ are determined on the basis of the coordinate values of the distribution point D1 on the coordinate system $\theta H$-$\theta V$, and the direction of the first-order diffracted light L1 emitted from the representative point P1 is determined on the basis of the displacement angles. Then, the reference point Q1 existing at the intersection of the first-order diffracted light L1 and the XY plane (the plane to be illuminated where the design illumination intensity distribution D00 is defined) is determined, and the design illumination intensity A11 given to the reference point Q1 is obtained by reference to the design illumination intensity distribution D00. The intensity A21 to be given to the distribution point D1 illustrated in FIG. 12(c) can be defined on the basis of the design illumination intensity A11 given to the reference point Q1.

Note that the value of the intensity A21 to be given to the distribution point D1 may be the same value as the design illumination intensity A11 given to the reference point Q1, but if necessary, a value obtained by multiplying the value of the design illumination intensity A11 by a predetermined coefficient may be defined as the first-order diffracted light intensity A21. For example, in the example illustrated in FIG. 12(a), an optical path length of the first-order diffracted light L2 is slightly longer than an optical path length of the first-order diffracted light L1. Generally, the intensity is attenuated in a propagation path of light as the optical path length becomes longer. Therefore, in the illustrated example, the luminance of the reference point Q2 becomes slightly lower than the luminance of the reference point Q1 if the intensities of the first-order diffracted lights L1 and L2 are equally set. The decrease in luminance based on such an optical path length is usually negligible, but when it is necessary to form a clear illumination pattern without unevenness in luminance, operation to set the value obtained by multiplying the value of the design illumination intensity A11 by a correction coefficient in consideration of the optical path length as the first-order diffracted light intensity A21 is performed.

Alternatively, in the case where a portion with overlap and a portion without overlap co-exist in the partial regions to be illuminated, as in the example illustrated in FIG. 10, necessity to set the intensity of the first-order diffracted light illuminating the portion with overlap to be low so as not to cause a difference in luminance from the portion without overlap may arise. In such a case, the operation to set a value obtained by multiplying the value of the design illumination intensity A11 by a predetermined correction coefficient as the first-order diffracted light intensity A21 according to presence or absence of overlap of the partial regions to be illuminated is performed.

The intensity A22, A23, and 0 is defined by a similar method for the other distribution points D2 to D4 illustrated in FIG. 12(c). Of course, in practice, not only the distribution points D1 to D4 illustrated in FIG. 12(c) but also a large number of distribution points illustrated in FIG. 8(b) is defined on the coordinate system $\theta H$-$\theta V$, for example (the density of the distribution points is set to an appropriate value in consideration of resolution and calculation load of the designed illumination pattern), and the predetermined intensity is defined for each of the individual distribution points. After all, the angular space distribution D10 of the first-order diffracted light intensity generated in step S1 is information defining the intensity of various types of first-order diffracted light emitted from the element diffractive optical portion 131 in the directions.

However, to form the hologram that functions as the diffractive optical element 130, not only the intensity (amplitude) of the first-order diffracted light but also information on phase is required. This is because light is an electromagnetic wave having both the intensity (amplitude) and the phase, and the angular space distribution D10 of intensity alone is not sufficient to grasp a behavior of the light, and the behavior needs to be grasped as complex amplitude distribution of an electric field exhibiting both the intensity and the phase.

Figure 13:
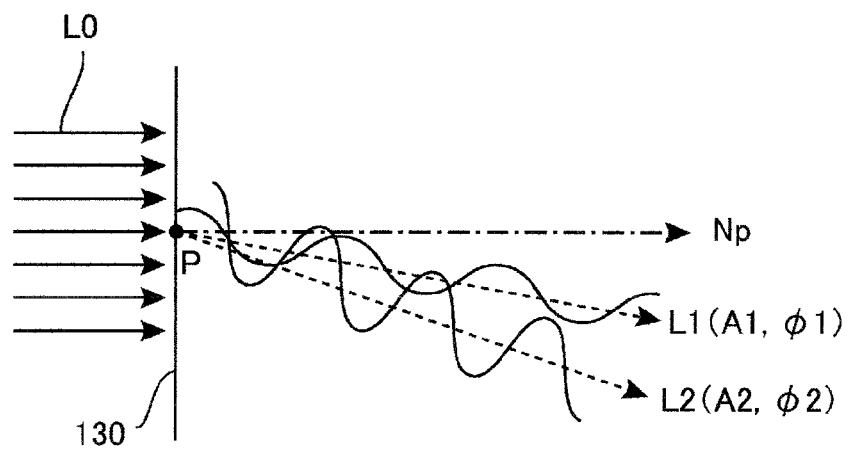
FIG. 13 is a side view conceptually illustrating waveforms of the first-order diffracted lights L1 and L2 emitted from one point P on the diffractive optical element 130.

FIG. 13 is a side view conceptually illustrating waveforms of the first-order diffracted lights L1 and L2 emitted from one point P on the diffractive optical element 130. The illustrated example illustrates a state in which collimated parallel illumination light L0 is emitted from a left side of the diffractive optical element 130, and the first-order diffracted lights L1 and L2 are emitted from a right side of the diffractive optical element 130 (in practice, the first-order diffracted light is generated by the interference fringes formed near the point P and is not emitted from only one point P, as described above). Here, the first-order diffracted lights L1 and L2 are lights emitted in directions respectively forming predetermined vertical-direction displacement angles @V with respect to the normal line Np set on the diffractive surface of the diffractive optical element 130, and have predetermined intensities and phases, respectively. Specifically, the first-order diffracted light L1 is light emitted with the intensity A1 and a phase $\varphi 1$, and the first-order diffracted light L2 is light emitted with the intensity A2 and a phase $\varphi 2$.

The processing in step S2 illustrated in FIG. 11 is processing of generating complex amplitude distribution D20 on the diffractive optical element by combining random phase distribution with the angular space distribution D10 of the first-order diffracted light intensity created in step S1. The angular space distribution D10 of the first-order diffracted light intensity illustrated in FIG. 12(c) is obtained by giving the predetermined intensity A to the individual distribution points D, but no phase $\varphi$ is defined for the individual distribution points D. For this reason, the angular space distribution D10 is insufficient as information for defining the diffractive characteristics of the hologram functioning as the element diffractive optical portion 131. Note that the design illumination intensity distribution D00 includes the information of the design illumination intensity and does not include phase information.

Therefore, in step S2, complex amplitude distribution is generated by giving random phases to the individual distribution points D included in the angular space distribution D10 of the first-order diffracted light intensity illustrated in FIG. 12(c). In the present application, the complex amplitude distribution generated in step S2 is called "complex amplitude distribution D20 on the diffractive optical element" to be distinguished from complex amplitude distribution generated in step S3.

Figure 14:
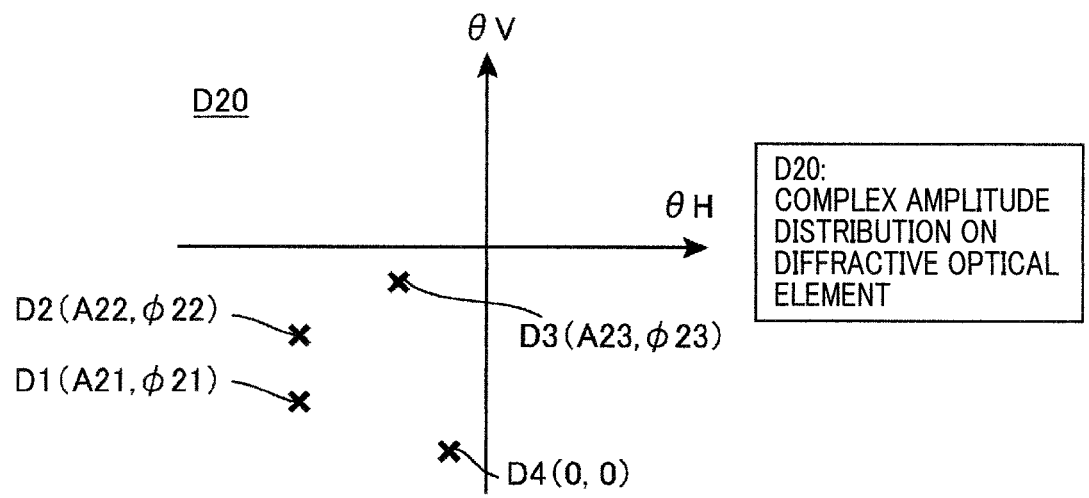
FIG. 14 is a diagram illustrating complex amplitude distribution D20 on the diffractive optical element generated on the basis of the angular space distribution D10 of the first-order diffracted light intensity illustrated in FIG. 12(c).

FIG. 14 is a diagram illustrating the complex amplitude distribution D20 on the diffractive optical element generated on the basis of the angular space distribution D10 of the first-order diffracted light intensity illustrated in FIG. 12(c). The predetermined intensities A21, A22, A23, and 0 are respectively given to the distribution points D1, D2, D3, and D4 in the angular space distribution D10 of the first-order diffracted light intensity illustrated in FIG. 12(c), whereas (A21, φ21), (A22, φ22), (A23, φ23), and (0, 0) are given as combinations of the predetermined intensity and the phase in the complex amplitude distribution D20 on the diffractive optical element illustrated in FIG. 14. Note that, the first-order diffracted light L4 does not exist, neither the intensity nor the phase needs to be defined for the distribution point D4 in practice (here, notation of (0, 0) is provided as the combination of the intensity and the phase for convenience).

Here, completely random values between 0 and 2π may be selected as the phases φ21, φ22, and φ23. In actual computer processing, random values generated using random numbers may be given to the distribution points. Of course, at this stage, since the phase φ is a random value, the complex amplitude distribution D20 on the diffractive optical element generated in step S2 does not exhibit original correct complex amplitude distribution. The complex amplitude distribution D20 on the diffractive optical element thus generated is defined by the data that gives both the intensity and the phase to each of a plurality of distribution points defined on the two-dimensional coordinate system, similarly to the angular space distribution D10 of the first-order diffracted light intensity.

Figure 15:
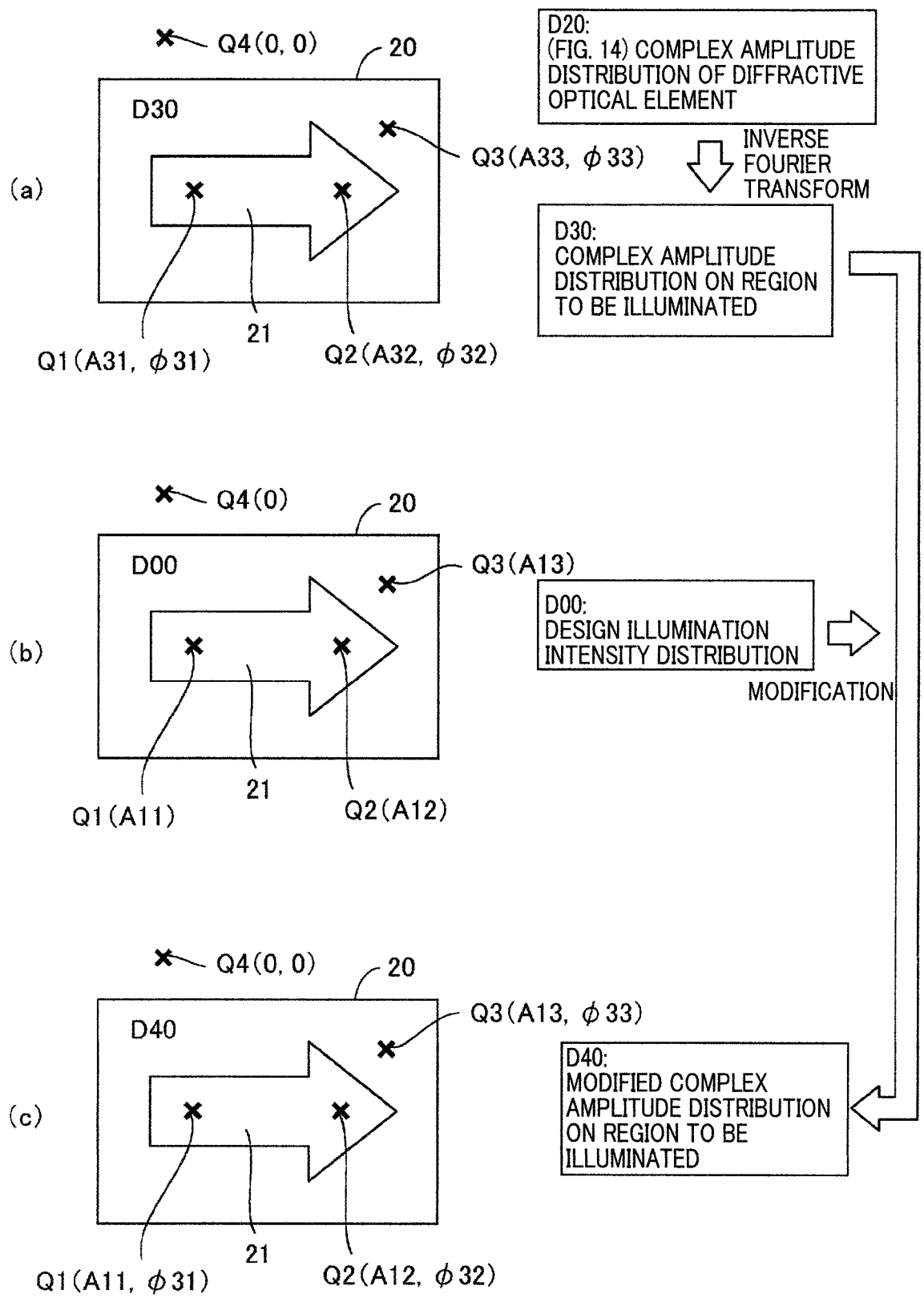
FIG. 15 is a diagram specifically illustrating a processing procedure of steps S3 and S4 in the flowchart illustrated in FIG. 11.

FIG. 15 is a diagram specifically illustrating a processing procedure of steps S3 and S4 in the flowchart illustrated in FIG. 11. First, in step S3, as illustrated on the right of FIG. 15(a), processing of performing inverse Fourier transform for the complex amplitude distribution D20 (see FIG. 14) on the diffractive optical element generated in step S2 to generate complex amplitude distribution D30 on the region to be illuminated is performed. A conceptual diagram of the complex amplitude distribution D30 on the region to be illuminated generated in step S3 is illustrated on the left of FIG. 15(a).

The complex amplitude distribution D20 on the diffractive optical element illustrated in FIG. 14 exhibits the intensity A and the phase φ of the first-order diffracted light diffused from the element diffractive optical portion 131 into directions, whereas the processing of the inverse Fourier transform is processing of obtaining the intensity A and the phase φ at a position on the XZ plane on the basis of each first-order diffracted light having reached the XZ plane (plane to be illuminated).

After all, the complex amplitude distribution D30 on the region to be illuminated illustrated on the left of FIG. 15(a) is information defining the intensity A and the phase φ of the electric field for each position on the XZ plane. In the illustrated example, the intensity A and the phase φ illustrated in parentheses at the reference symbols Q1 to Q4 of the reference points are defined. That is, an intensity A31 and a phase φ31 are defined at the reference point Q1, an intensity A32 and a phase φ32 are defined at the reference point Q2, and an intensity A33 and a phase φ33 are defined at the reference point Q3. Since the first-order diffracted light does not reach the reference point Q4, the intensity and the phase are not defined (display of (0, 0) is provided in FIG. 15(a) for convenience). Of course, in practice, the intensity A and the phase φ are defined for each of a large number of reference points in the region to be illuminated 20.

Although the illumination pattern in the region to be illuminated 20 including the arrow 21 is drawn in FIG. 15(a) for convenience, this illumination pattern is not a pattern according to the design illumination intensity distribution D00 illustrated in FIG. 12(a) at this stage. This is because random distribution phases are given to the distribution points in step S2.

A plan view of the design illumination intensity distribution D00 illustrated in FIG. 12(a) is illustrated on the left of FIG. 15(b). Both the illumination pattern illustrated by the complex amplitude distribution D30 on the region to be illuminated in FIG. 15(a) and the illumination pattern illustrated by the design illumination intensity distribution D00 in FIG. 15(b) are patterns with the arrow 21 in the rectangular region to be illuminated 20, but the intensities in respective portions of both the patterns are different. That is, the intensities A31, A32, and A33 defined at the reference points Q1, Q2 and Q3 illustrated in FIG. 15(a) are different from the intensities A11, A12, and A13 defined at the reference points Q1, Q2, and Q3 illustrated in FIG. 15(b). This is because the complex amplitude distribution D20 on the diffractive optical element generated in step S2 is incomplete distribution including random phases.

Therefore, in step S4, processing of modifying the intensity of the complex amplitude distribution D30 (FIG. 15(a)) on the region to be illuminated generated in step S3 in accordance with the design illumination intensity distribution D00 (FIG. 15(b)) to generate modified complex amplitude distribution D40 (FIG. 15(c)) on the region to be illuminated is performed. This processing is processing of modifying the intensity A defined at each reference point Q in the complex amplitude distribution D30 on the region to be illuminated illustrated in FIG. 15(a) to the intensity A defined at each reference point Q in the design illumination intensity distribution D00 illustrated in FIG. 15(b). By such modification processing, the modified complex amplitude distribution D40 on the region to be illuminated as illustrated in FIG. 15(c) is generated. As illustrated on the left of FIG. 15(c), the intensity A for the reference points Q1, Q2, and Q3 is modified from A31, A32, and A33 illustrated in FIG. 15(a) to A11, A12, and A13 illustrated in FIG. 15(b). Note that the phases φ31, φ32, and φ33 remain unchanged.

Figure 16:
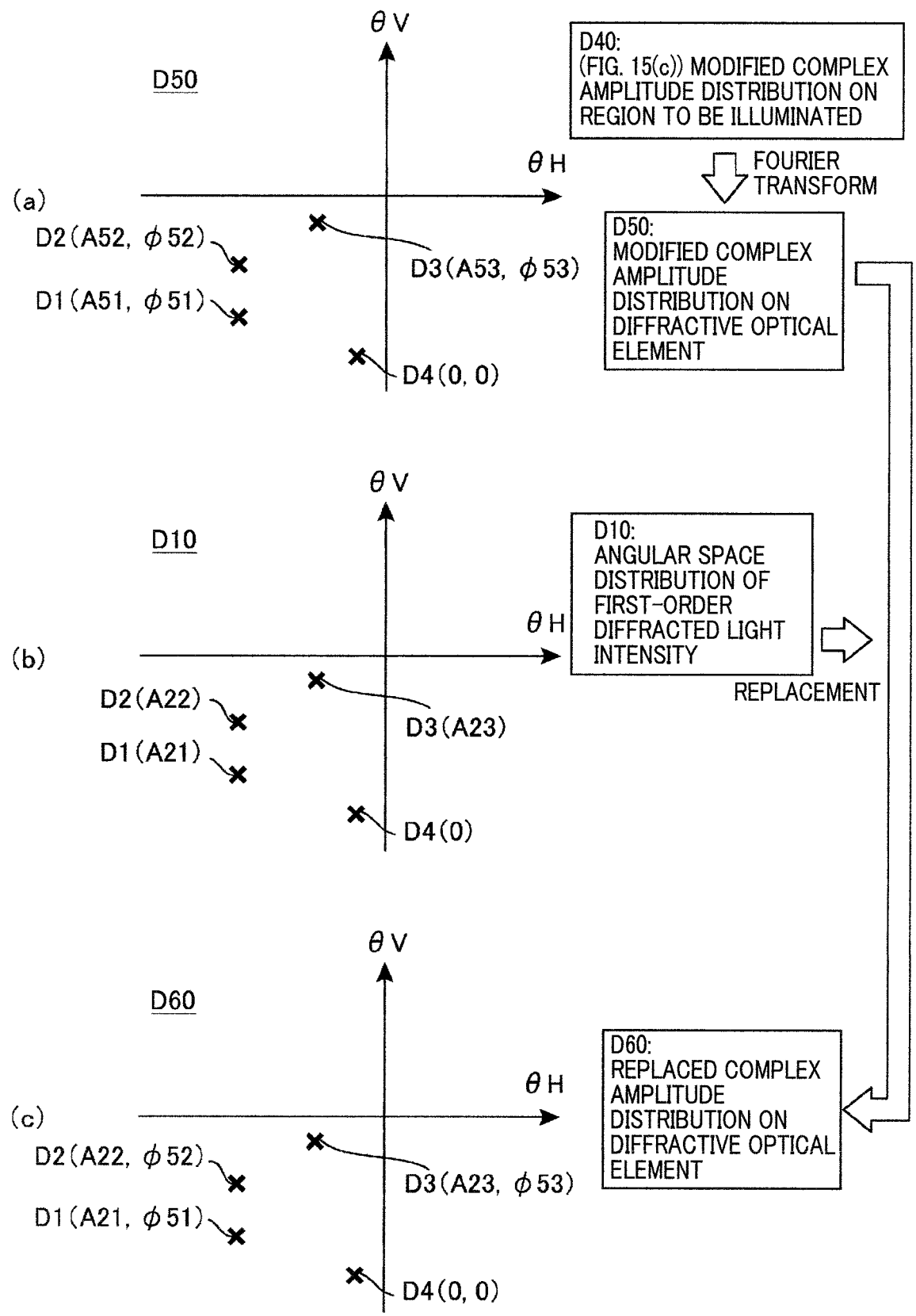
FIG. 16 is a diagram specifically illustrating a processing procedure of steps S5 and S6 in the flowchart illustrated in FIG. 11.

FIG. 16 is a diagram specifically illustrating a processing procedure of steps S5 and S6 in the flowchart illustrated in FIG. 11. First, in step S5, as illustrated on the right of FIG. 16(a), processing of performing Fourier transform for the modified complex amplitude distribution D40 (see FIG. 15(c)) on the region to be illuminated generated in step S4 to generate modified complex amplitude distribution D50 on the diffractive optical element is performed. A conceptual diagram of the modified complex amplitude distribution D50 on the diffractive optical element generated in step S5 is illustrated on the left of FIG. 16(a).

The modified complex amplitude distribution D40 on the region to be illuminated illustrated in FIG. 15(c) exhibits the intensity A and the phase φ of the diffracted light at a position on the XZ plane (plane to be illuminated), whereas the processing of Fourier transform is processing of obtaining the intensity A and the phase φ of the first-order diffracted light diffused from the element diffractive optical portion 131 into the directions.

After all, the modified complex amplitude distribution D50 on the diffractive optical element illustrated on the left of FIG. 16(a) is information defining the intensity A and phase φ of the first-order diffracted light diffused from the representative point P of the element diffractive optical portion 131 into the directions. In the illustrated example, the intensity A and the phase φ illustrated in parentheses in the reference symbols D1 to D4 of the distribution points are defined. That is, an intensity A51 and a phase φ51 are defined at the distribution point D1, an intensity A52 and a phase φ52 are defined at the distribution point D2, and an intensity A53 and a phase φ53 are defined at the distribution point D3. Since the first-order diffracted light does not exist in the direction corresponding to the distribution point D4, the intensity and the phase are not defined (display of (0, 0) is provided in FIG. 16(a) for convenience). Of course, in practice, the intensity A and the phase φ are defined for each of a large number of distribution points on the coordinate system θH-θV.

Here, the intensities A51, A52, A53, and the like defined on the modified complex amplitude distribution D50 on the diffractive optical element illustrated on the left of FIG. 16(a) are not accurate intensities at this stage for forming the design illumination intensity distribution D00 on the XZ plane (plane to be illuminated) as illustrated in FIG. 12(a). This is because random distribution phases are given to the distribution points in step S2, and the processing in steps S3, S4, and S5 is performed using the random phases.

The angular space distribution D10 (generated in step S1) of the first-order diffracted light intensity illustrated in FIG. 12(c) is illustrated on the left of FIG. 16(b). Both the intensity distribution illustrated by the modified complex amplitude distribution D50 on the diffractive optical element in FIG. 16(a) and the intensity distribution illustrated by the angular space distribution D10 of the first-order diffracted light intensity in FIG. 16(b) indicate intensities of the large number of distribution points on the coordinate system θH-θV, but the intensities at the respective distribution points of both the distributions are different. That is, the intensities A51, A52, and A53 defined at the distribution points D1, D2, and D3 illustrated in FIG. 16(a) are different from the intensities A21, A22, and A23 defined at the distribution points D1, D2, and D3 illustrated in FIG. 16(b). This is because the complex amplitude distribution D20 including the random phases is generated on the diffractive optical element in step S2.

Therefore, in step S6, processing of replacing the intensity of the modified complex amplitude distribution D50 on the diffractive optical element generated in step S5 with the intensity illustrated in the angular space distribution D10 of the first-order diffracted light intensity generated in step S1 to generate replaced complex amplitude distribution D60 on the diffractive optical element is performed. This processing is processing of replacing the intensity A defined at each distribution point D in the modified complex amplitude distribution D50 on the diffractive optical element illustrated in FIG. 16(a) with the intensity A defined at each distribution point D in the angular space distribution D10 of the first-order diffracted light intensity illustrated in FIG. 16(b). By such replacement processing, the replaced complex amplitude distribution D60 on the diffractive optical element as illustrated in FIG. 16(c) is generated.

As illustrated on the left of FIG. 16(c), the intensity A for the distribution points D1, D2, and D3 is replaced with A21, A22, and A23 illustrated in FIG. 16(b) from A51, A52, and A53 illustrated in FIG. 16(a). Note that the phases φ51, φ52, and φ53 remain unchanged. Since both the modified complex amplitude distribution D50 on the diffractive optical element generated in step S5 and the replaced complex amplitude distribution D60 on the diffractive optical element generated in step S6 are defined by data that gives both the intensity and the phase to each of the plurality distribution points defined on the two-dimensional coordinate system, similarly to the angular space distribution D10 of the first-order diffracted light intensity, the above-described replacement can be easily performed.

The procedure of steps S1 to S6 in the flowchart illustrated in FIG. 11 has been described above with the specific examples. When the procedure of step S6 is completed, processing to return to step S3 is performed through step S7. That is, the processing in steps S3 to S6 is repeatedly executed a necessary number of times. More specifically, step S3 is executed again using the replaced complex amplitude distribution D60 on the diffractive optical element generated in step S6 instead of the complex amplitude distribution D20 (including the random phase distribution) on the diffractive optical element generated in step S2. Thus, in step S7, the processes from step S3 to step S6 are repeated a necessary number of times, and processing of setting the replaced complex amplitude distribution D60 on the diffractive optical element finally obtained in step S6 as final complex amplitude distribution is performed.

As described above, although the complex amplitude distribution D20 on the diffractive optical element generated in step S2 is incomplete distribution including random phases, the phases included in the replaced complex amplitude distribution D60 on the diffractive optical element obtained by repeating the processes from step S3 to step S6 gradually converge to appropriate values. The necessary number of times in step S7 may be set to a reasonable number of times in which the phases can be determined to have reached the appropriate values. Specifically, a prescribed number of times such as "10 times" may be set in advance, or a condition that "until the difference between the intensity values to be replaced in step S6 becomes a predetermined allowable value or less" may be set.

The replaced complex amplitude distribution D60 on the diffractive optical element thus generated in last-executed step S6 is set as the final complex amplitude distribution, and the unique diffractive characteristic with which the first-order diffracted light corresponding to the final complex amplitude distribution is emitted is the diffractive characteristic necessary for the element diffractive optical portion 131. Therefore, to diffract the coherent light entering from the collimating optical system 120, a hologram having the necessary diffractive characteristic is recorded in the element diffractive optical portion 131.

To that end, after completion of step S7 in the flowchart illustrated in FIG. 11, step S8 (not illustrated) of forming the interference fringes constituting the hologram having the unique diffractive characteristic on a predetermined medium so that the first-order diffracted light corresponding to the final complex amplitude distribution can be emitted on the basis of the coherent light entering from the collimating optical system 120 is executed to produce the element diffractive optical portion 131. The same applies to the other element diffractive optical portion 132, and the like. The diffractive optical element 130 according to the present invention can be produced by such a procedure.

Note that a specific method of obtaining an interference fringe pattern for constituting the hologram having the specific diffractive characteristic (the diffractive characteristic defined as the replaced complex amplitude distribution D60 on the diffractive optical element as illustrated in FIG. 16(c)) is known as a CGH technique, and therefore description of specific procedures is omitted here. Further, as a method of forming the specific interference fringe pattern on a predetermined medium, various methods such as a method of constituting the interference fringes as an uneven structure and a method of constituting the interference fringes as a gradation pattern are known and any formation method can be adopted.

Further, the method of forming the interference fringes on the recording medium to be the diffractive optical element 130 is not limited to a method of forming the interference fringes as a permanent fixed structure, and a method of temporarily forming the desired interference fringes can be adopted. For example, a device including a liquid crystal display and a drive device for displaying an image on the liquid crystal display may be used as the diffractive optical element 130. In this case, by displaying the predetermined interference fringes on the liquid crystal display as an image, the predetermined illumination pattern can be formed in the region to be illuminated 20 as a hologram reproduction image. Note that an optical element such as a digital mirror device (DMD) or liquid crystal on silicon (LCOS) can be used instead of the liquid crystal display. It is favorable that pixel pitch is as narrow as possible so that high-definition interference fringes can be formed in either case.

§ 5. Modifications of Present Invention

The basic embodiment in which the present invention is used as an on-vehicle illumination device has been described so far. Here, some modifications of the present invention will be described.

5.1 Modification Provided with 4f Optical System

The illumination device 100 according to the basic embodiment illustrated in FIG. 4 is characterized in that no lens is provided between the diffractive optical element 130 and the region to be illuminated 20. In a case where a lens is located on a rear side of the optical axis of the diffractive optical element 130, even if the coherent light having entered the diffractive optical element 130 from the collimating optical system 120 is large in beam cross section and is thus blurred, a desired diffracted image can be formed on a focal plane without being affected by the blur and a clear image can be obtained. That is, a diffracted image obtained by reducing the diffracted image formed in the distance can be obtained on the focal plane of the lens.

However, in a place out of the focal plane of the lens, the diffracted image is blurred under the influence of the irradiation area of the coherent light having entered the diffractive optical element 130. In particular, in the case where the normal direction of the emission surface of the diffractive optical element 130 is not parallel to the normal direction of the road surface 10 where the region to be illuminated 20 is defined, as in the example illustrated in FIG. 2, an arrangement direction of the focal plane of the lens does not coincide with an arrangement direction of the region to be illuminated 20, and thus the region to be illuminated 20 is more likely to be blurred.

Under such circumstances, the illumination device 100 according to the basic embodiment illustrated in FIG. 4 adopts the method of directly illuminating the region to be illuminated 20 by the coherent light diffracted by the diffractive optical element 130 and emitted from the illumination device 100. Here, "directly" means that an optical member that controls the traveling direction of the coherent light emitted from the illumination device 100 to form an optical image on a specific plane between the illumination device 100 and the region to be illuminated 20 does not exist between the illumination device 100 and the region to be illuminated 20.

Therefore, there is no problem even if an optical member such as a cover glass that does not control the traveling direction of the coherent light is provided between the illumination device 100 and the region to be illuminated 20, for example, in the configuration illustrated in FIG. 4. Further, a relay optical system for changing the traveling direction of the diffracted light of the diffractive optical element 130 in the illumination device 100, for example, a 4f optical system may be provided. When such a 4f optical system is provided, an intermediate image is generated when removing high-order light or the like. However, such an intermediate image is an image formed in the illumination device 100, and there is no change in directly illuminating the region to be illuminated 20 by the coherent light emitted from the illumination device 100.

Figure 17:
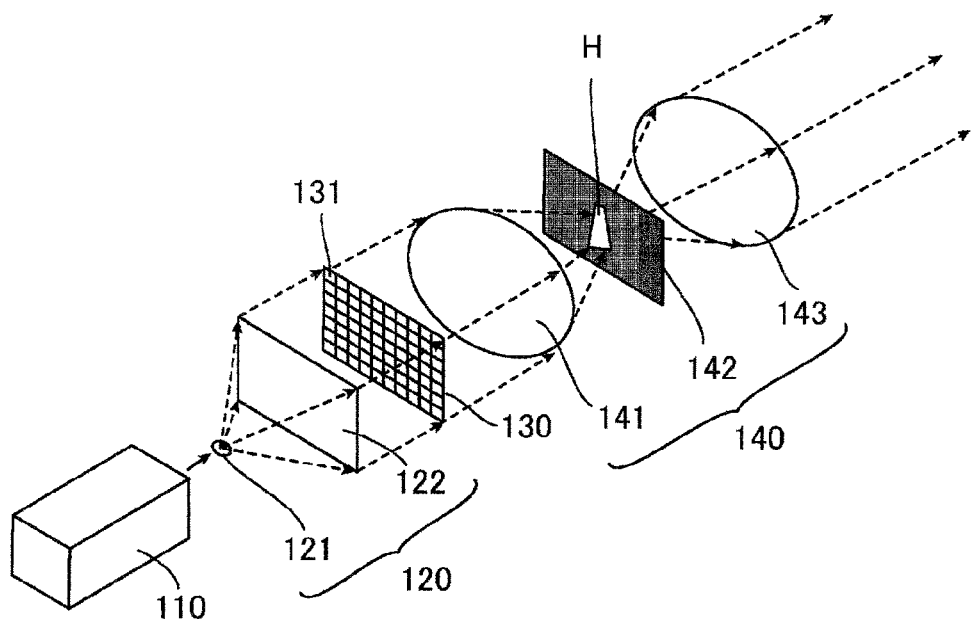
FIG. 17 is a perspective view of an illumination device 100A according to a modification provided with a 4f optical system 140.
Figure 18:
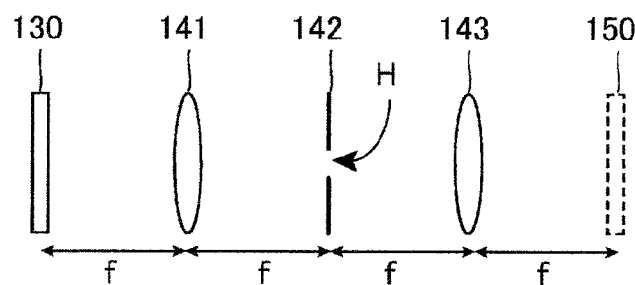
FIG. 18 is a partial side view of the illumination device 100A illustrated in FIG. 17.

FIG. 17 is a perspective view of an illumination device 100A according to a modification provided with a 4f optical system 140, and FIG. 18 is a partial side view of the illumination device 100A illustrated in FIG. 17. The 4f optical system 140 illustrated in FIG. 17 includes a 4f-1 lens 141, a light shielding plate 142, and a 4f-2 lens 143. The diffractive optical element 130 and the light shielding plate 142 are arranged to face a position of a focal length f of the 4f-1 lens 141 with the position of the 4f-1 lens 141 as a reference. Further, a diffracted image 150 formed by the first-order diffracted light from the diffractive optical element 130 and the light shielding plate 142 are arranged to face a position of a focal length f of the 4f-2 lens 143 with a position of the 4f-2 lens 143 as a reference.

The light shielding plate 142 has an opening H for transmitting the first-order diffracted light from the diffractive optical element 130 substantially in the center, and the light shielding plate 142 except the opening H does not transmit the coherent light. zero-order diffracted light and multi-order diffracted light other than first-order diffracted light in the diffracted light from the diffractive optical element 130 cannot be transmitted through the opening H of the light shielding plate 142 because of a different diffraction angle from the diffraction angle of first-order diffracted light. Therefore, the diffracted light other than the first-order diffracted light can be cut with the light shielding plate 142, and the safety of the coherent light for the observer is improved.

Figure 19:
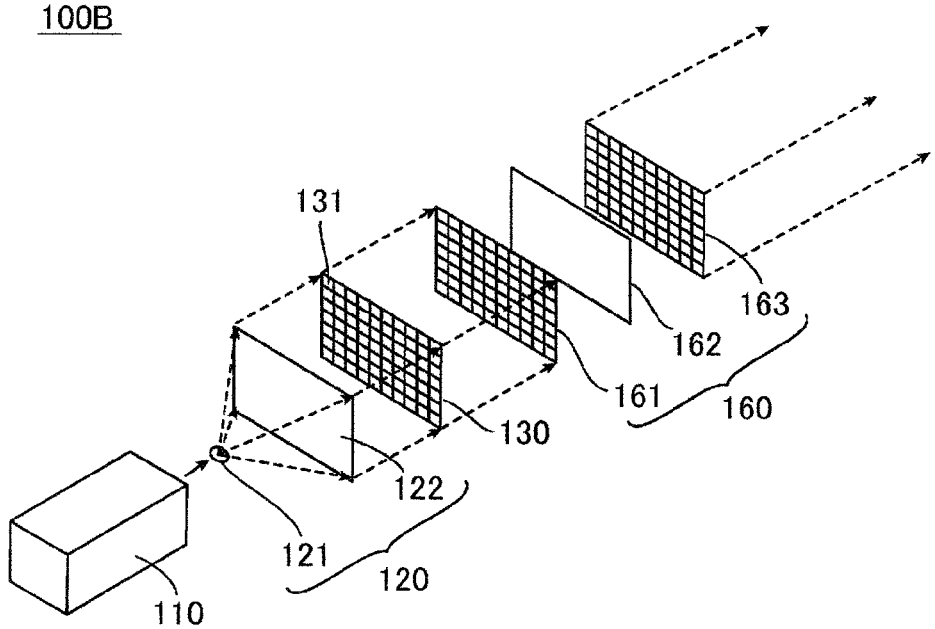
FIG. 19 is a perspective view of an illumination device 100B according to a further modification of the illumination device 100A illustrated in FIG. 17.
Figure 20:
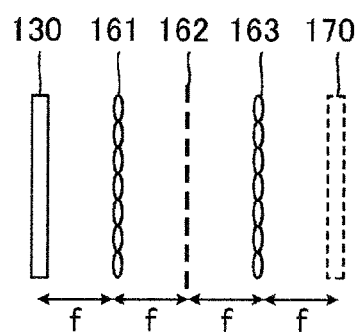
FIG. 20 is a partial side view of the illumination device 100B illustrated in FIG. 19.

FIG. 19 is a perspective view of an illumination device 100B according to a further modification of the illumination device 100A illustrated in FIG. 17, and FIG. 20 is a partial side view of the illumination device 100B illustrated in FIG. 19. A 4f optical system 160 illustrated in FIG. 19 is obtained by replacing the 4f-1 lens 141 and the 4f-2 lens 143 illustrated in FIG. 17 with a 4f-1 lens array 161 and a 4f-2 lens array 163, respectively. The 4f-1 lens array 161 and the 4f-2 lens array 163 are each composed of a large number of lenses, and have a shorter focal length than the 4f-1 lens 141 and the 4f-2 lens 143 illustrated in FIG. 17. Therefore, the illumination device 100B illustrated in FIG. 19 can be smaller in external size than the illumination device 100A illustrated in FIG. 17. Openings (not illustrated in FIG. 19) are provided in a light shielding plate 162 at positions corresponding to the individual lenses constituting the lens arrays.

5.2 Modification of Performing Color Display

Figure 21:
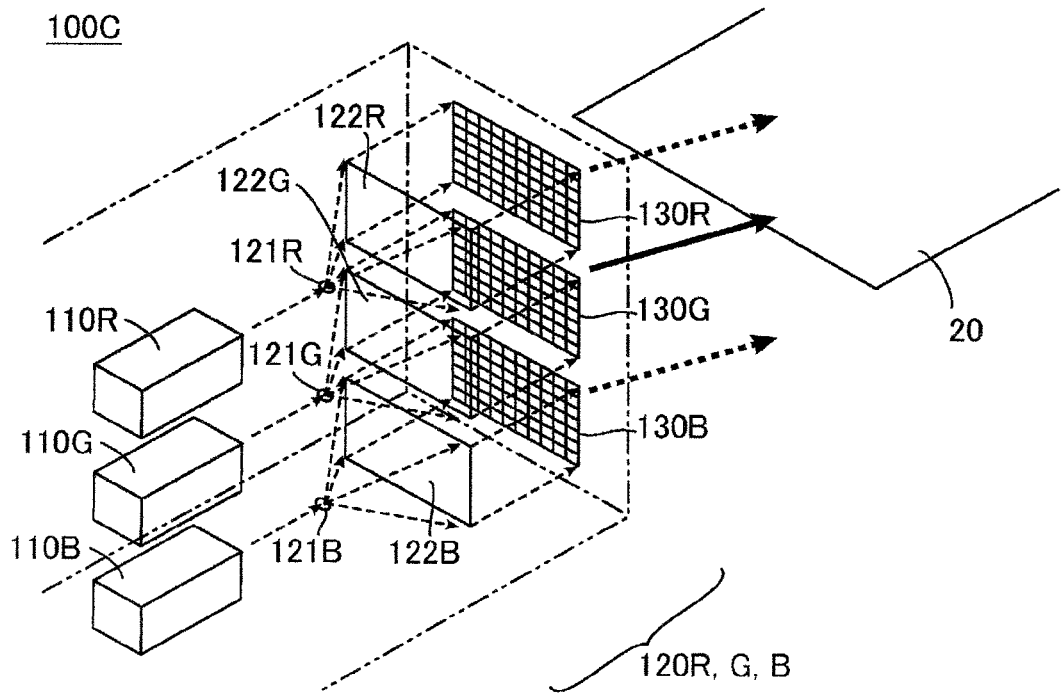
FIG. 21 is a perspective view illustrating a configuration of an illumination device 100C having a color display function.
Figure 22:
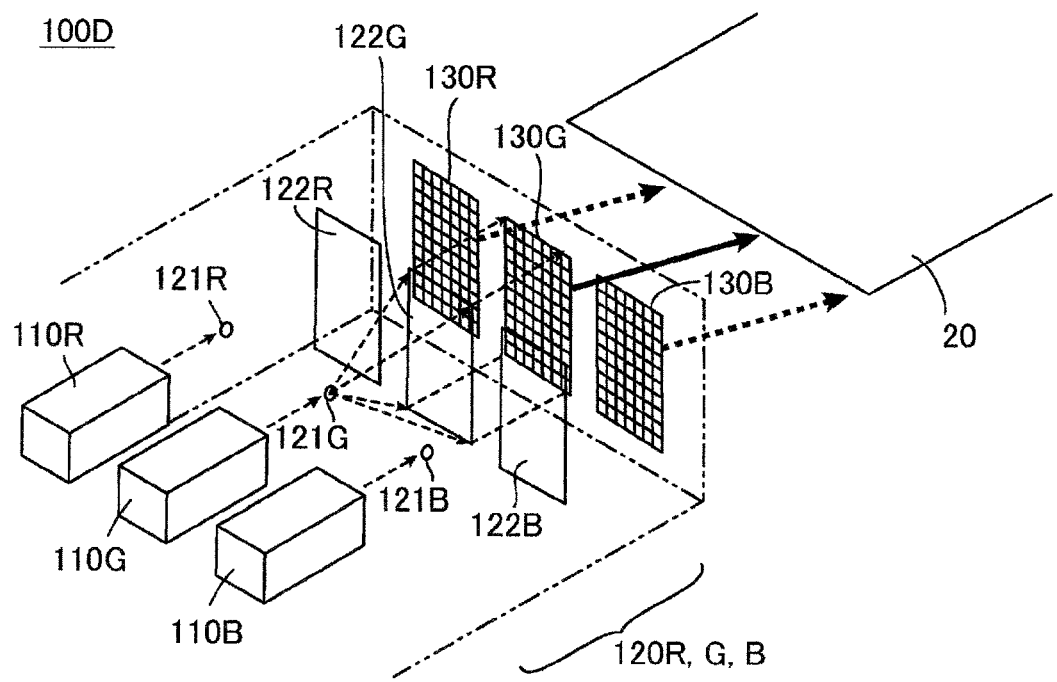
FIG. 22 is a perspective view illustrating a configuration of an illumination device 100D having a color display function.

The illumination device 100 according to the basic embodiment illustrated in FIG. 4 is an example of illuminating the region to be illuminated 20 using coherent light of a single wavelength, but an illumination device according to the present invention can perform color display in the region to be illuminated 20. FIGS. 21 and 22 are perspective views illustrating configurations of illumination devices 100C and 100D having a such a color display function.

The illumination device 100C illustrated in FIG. 21 is a device having a function to illuminate the region to be illuminated 20 using a plurality of coherent lights having different wavelengths from one another, and includes a light source 110R for generating coherent light in a red wavelength band, a light source 110G for generating coherent light in a green wavelength band, and a light source 110B for generating coherent light in a blue wavelength band. Further, three collimating optical systems 120R, 120G, and 120B and three diffractive optical elements 130R, 130G, and 130B are provided respectively corresponding to the three light sources.

Here, the collimating optical system 120R includes a first lens 121R and a second lens 122R, the collimating optical system 120G includes a first lens 121G and a second lens 122G, and the collimating optical system 120B includes a first lens 121B and a second lens 122B. The three light sources 130R, 130G, and 130B, the three collimating optical systems 120R, 120G, and 120B, and the three diffractive optical elements 130R, 130G, and 130B are arranged in a vertical direction, as illustrated.

On the other hand, the illumination device 100D illustrated in FIG. 22 is a device in which the three light sources 130R, 130G, and 130B, the three collimating optical systems 120R, 120G, and 120B, and the three diffractive optical elements 130R, 130G, and 130B in the illumination device 100C illustrated in FIG. 21 are arranged in a horizontal direction, and has a similar configuration to the illumination device 100C.

The illumination devices 100C and 100D generate coherent light in red, green, and blue wavelength bands, and can illuminate the region to be illuminated 20 in various colors by dimming the coherent light in the wavelength bands and can display a color illumination pattern. In the illumination devices 100C and 100D, the three diffractive optical elements 130R, 130G, and 130B are arranged in the vertical direction or in the horizontal direction, as illustrated, so relative positions with respect to the region to be illuminated 20 are different. However, by designing the diffractive characteristic of each diffractive optical element according to the procedure described in § 4, the entire region of the common region to be illuminated 20 can be illuminated by the diffracted lights from the diffractive optical elements 130R, 130B, and 130G.

Therefore, the region to be illuminated 20 is illuminated in a color where the diffracted lights from the three diffractive optical elements 130R, 130G, and 130B overlap one another. For example, in a case where the three light sources 130R, 130G, and 130B emit coherent light having the same radiation intensity, the region to be illuminated 20 is illuminated in white. Further, the illumination color of the region to be illuminated 20 can be changed as needed by turning off one or two of the three light sources 130R, 130G, and 130B or adjusting the radiation intensity of the coherent light emitted from each light source.

Further, the content of the illumination pattern to be formed in the region to be illuminated 20 can be appropriately changed by keeping formation of arbitrary interference fringes ready using a liquid crystal display, a digital mirror device, or an optical element having LCOS as the three diffractive optical elements 130R, 130G, and 130B.

5.3 Variations of Illumination Patterns

In the basic embodiment described so far, the example of displaying the illumination pattern including the arrows 21 to 26 in the region to be illuminated 20 on the road surface 10 has been described as illustrated in FIGS. 1 and 4. However, the illumination pattern to be displayed in the region to be illuminated 20 can be arbitrarily designed by the designer. That is, as illustrated in FIG. 12(*a*), the designer defines the region to be illuminated 20 having desired size and shape at a desired position, and defines an illumination pattern to be displayed in the region to be illuminated 20 as the design illumination intensity distribution D00, thereby designing an illumination device having a function to display a desired pattern at a desired position.

For example, the example illustrated in FIG. 1 is an example of an illumination pattern in which two stages of luminance are set: high luminance inside the arrows 21 to 26 and low luminance inside the region to be illuminated 20 and outside the arrows 21 to 26. The six bright arrows 21 to 26 inside the light elongated region to be illuminated 20 is presented to the observer. In contrast, a design in which only the insides of the arrows 21 to 26 are displayed with high luminance and the other parts are not illuminated at all (the first-order diffracted light is not headed) is also possible. In this case, only the six arrows 21 to 26 are brightly displayed on the dark road surface 10. In other words, only the insides of the individual arrows 21 to 26 are set as the regions to be illuminated.

Figure 23:
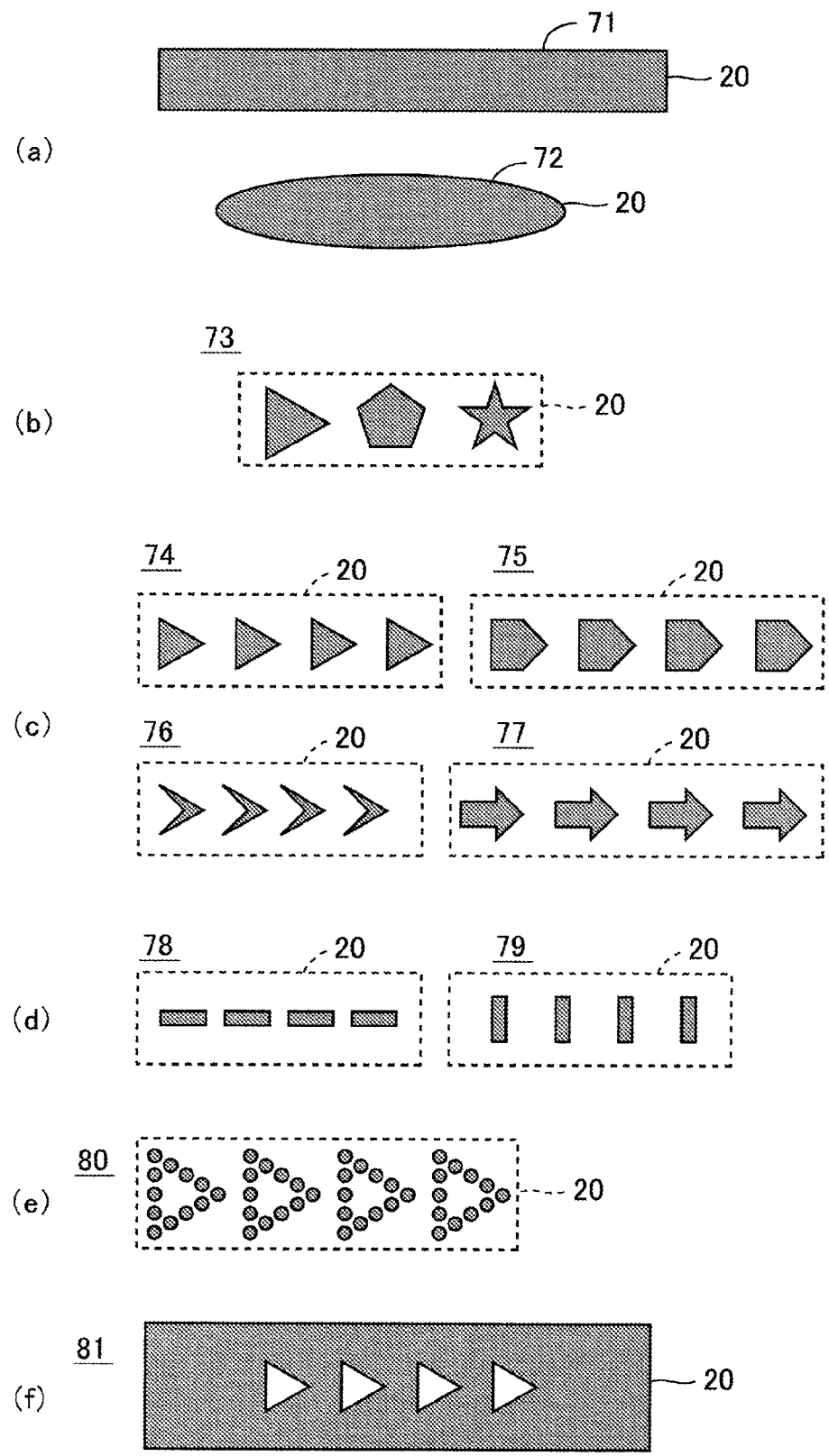
FIG. 23 is diagrams illustrating variations of illumination modes of the region to be illuminated 20 by the illumination device according to the present invention.

FIG. 23 is diagrams illustrating specific variations of illumination modes of the region to be illuminated 20 by the illumination device according to the present invention. In any of cases, a region illustrated in gray in the region to be illuminated 20 is a region displayed with high luminance. The white area in the region to be illuminated 20 may be displayed with low luminance or may not be illuminated at all.

FIG. 23(*a*) illustrates linear illumination patterns 71 and 72. The illumination pattern 71 is a pattern for displaying the entire inside of the elongated rectangular region to be illuminated 20 with uniform luminance, and the illumination pattern 72 is a pattern for displaying the entire inside of the elongated elliptical region to be illuminated 20 with uniform luminance. As illustrated, the outlines of the illumination patterns may be rectangular or elliptical. Such simple illumination patterns are suitable for use in the headlight of a car and can illuminate the road surface with patterns having a sharp outline. FIG. 23(*b*) is an example in which a triangle, a pentagon, and a star are arranged in a rectangular region to be illuminated 20 and spot illumination is performed.

FIG. 23(*c*) is an example in which a plurality of identical figures is arranged at predetermined intervals along a predetermined direction and illuminated. The illumination device according to the present invention is not limited to use as an on-vehicle device and is applicable to use of being installed on a road surface or a building and illuminating a road surface, a floor surface, or a wall surface (a road surface installation-type illumination device will be described in detail in § 5.4). The illumination pattern illustrated in FIG. 23(*c*) is suitable for use as a guide light illumination illuminating a floor surface or wall surface, using an illumination device installed in a building. An illumination pattern 74 is an example in which triangles are arranged, an illumination pattern 75 is an example in which pentagons are arranged, an illumination pattern 76 is an example in which boomerang-like figures are arranged, and an illumination pattern 77 is an example in which arrows are arranged. In any of the examples, tips of the figures are directed to a guiding direction, thereby making the guiding direction easy to understand.

FIG. 23(*d*) illustrates illumination patterns 78 and 79 suitable for applications indicating boundaries. Each of the patterns is a pattern in which a plurality of identical figures is arranged at the same interval, and when arranged along the boundary, the pattern can be used as a mark indicating the boundary. Moreover, since the plurality of figures is arranged at the same interval, the pattern can be applied to distance measurement.

An illumination pattern 80 illustrated in FIG. 23(*e*) is obtained by illuminating outlines of a plurality of triangle-shaped figures arranged at a distance with circular spots. Moreover, an illumination pattern 81 illustrated in FIG. 23(*f*) is a hollow pattern, and a region corresponding to the inside of the region to be illuminated 20 and the outside of a triangle is illuminated. The inside of each triangle is not illuminated, but with each triangle recognized as a shadow, the pattern functions as an indicator showing the right direction. Both the illumination patterns 80 and 81 can be used as the above-described guide light illumination.

Some illumination modes of the region to be illuminated 20 formed by the illumination device according to the present invention have been described using FIG. 23 but these illumination modes are mere examples and illumination can be performed in various illumination modes other than the illustrated examples. For example, illumination may be performed in the illumination mode illustrated in FIG. 23 or another illumination mode in combination with information display such as characters and symbols.

Further, for the illumination patterns including a plurality of figures, all the element diffractive optical portions may illuminate the common inside of the region to be illuminated 20 as in the examples illustrated in FIGS. 23(*b*) to 23(*e*), or the individual element diffractive optical portions may be respectively responsible for specific figures and illuminate only the responsible regions as in the examples illustrated in FIGS. 9 and 10.

5.4 Road Surface Installation-Type Illumination Device

The illumination device according to the present invention can be mounted and used not only on vehicles such as cars and bicycles but also on various vehicles including ships, planes, and trains. Further, the illumination device according to the present invention can be used not only in the applications incorporated in vehicles but also in applications mounted to various structures and presenting various types of information.

For example, the illumination device according to the present invention can also be used for the purpose of guiding or alerting a vehicle, displaying information, and the like. As specific examples, the illumination device can also be used for the purpose of informing a driver or a pilot of the vehicle of the traveling direction and no traffic areas, or for calling attention on traffic. In this case, the illumination device according to the present invention may be mounted on a vehicle or may be installed at a place different from the vehicle, for example, on a traveling route of the vehicle.

Of course, the illumination device according to the present invention is also applicable to a guide light and the like as described in § 5.3. Since the illumination device according to the present invention can illuminate the region to be illuminated 20 clearly and over a long distance in any illumination mode, the illumination device can guide a large number of people to a desired direction without misleading the people in an emergency if applied to an evacuation guide light.

A mounting portion to be mounted to a structure or a building installed on a road surface or near the road surface is provided in the illumination device according to the present invention, the road surface, a vicinity of the road surface, a floor surface, or a wall surface can be illuminated from the structure or the building installed on the road surface or near the road surface, and various types of information can be presented. Here, in particular, an example in which the present invention is used as a road surface installation-type illumination device and various types of information is presented to a driver of a vehicle will be described.

Figure 24:
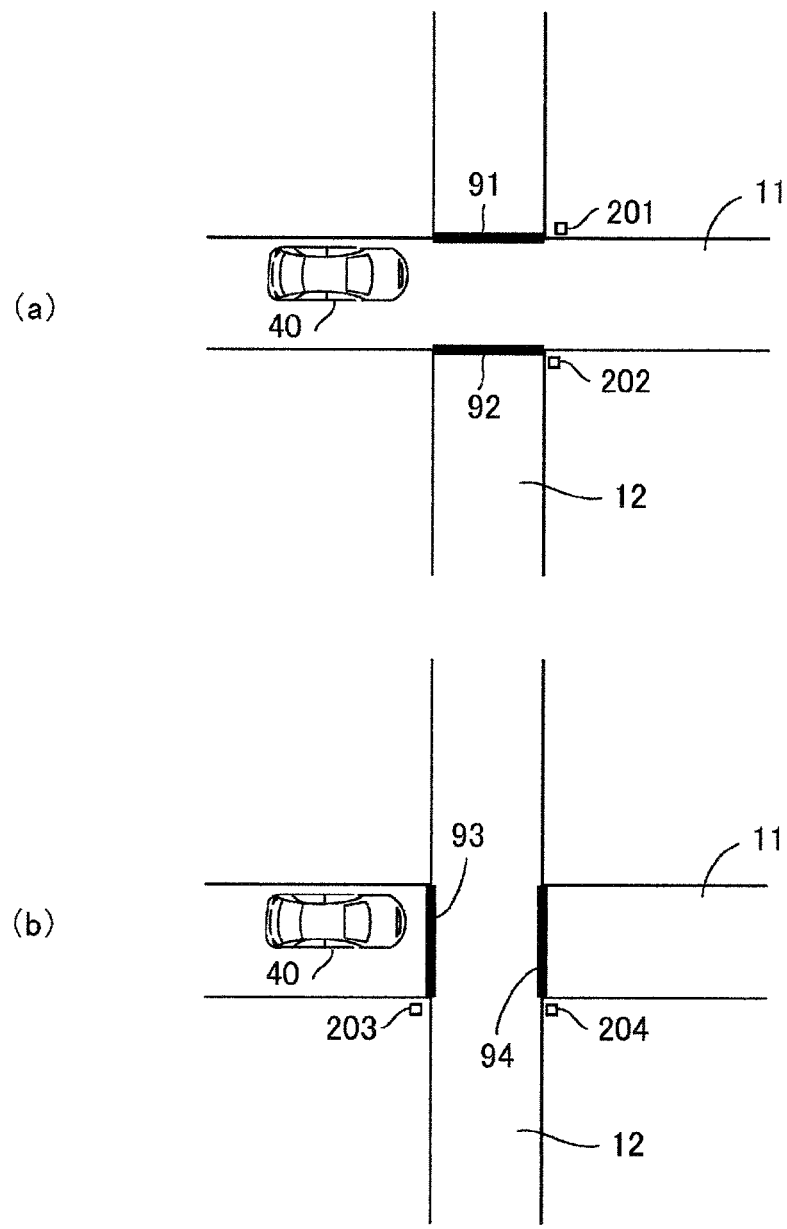
FIG. 24 is plan views illustrating applications in which the illumination device according to the present invention is installed near an intersection, and the road surface is illuminated with a predetermined illumination pattern to present effective information to a driver.

FIG. 24 is plan views illustrating applications in which the illumination device according to the present invention is installed near an intersection and the road surface is illuminated with a predetermined illumination pattern to present effective information to a driver. The example illustrated in FIG. 24(*a*) is an example in which a pair of illumination devices 201 and 202 is installed near an intersection of a road 11 and a road 12. The illumination device 201 has a function to illuminate a road surface with an elongated linear illumination pattern 91 crossing the road 12, as illustrated by the thick line. Similarly, the illumination device 202 has a function to illuminate a road surface with an elongated linear illumination pattern 92 crossing the road 12, as illustrated by the thick line.

Such illumination patterns 91 and 92 serve a function to notify the driver of the vehicle 40 traveling on the road 11 that the intersection prohibits right turn or left turn or that the road 12 prohibits entry. For example, by performing illumination with the illumination pattern 91 or 92 during a time zone of right turn prohibition, left turn prohibition, or entry prohibition, the driver of the vehicle 40 can be prevented from entering the road 12 by mistake. Use of a pattern composed of a red line as the illumination pattern 91 or 92 is effective in alerting the driver.

Meanwhile, the example illustrated in FIG. 24(*b*) is an example in which a pair of illumination devices 203 and 204 is installed near the intersection of the road 11 and the road 12. The illumination device 203 has a function to illuminate the road surface with an elongated linear illumination pattern 93 crossing the road 11, as illustrated by the thick line. Similarly, the illumination device 204 has a function to illuminate the road surface with an elongated linear illumination pattern 94 crossing the road 11, as illustrated by the thick line.

Such illumination patterns 93 and 94 serve a function to notify the driver of the vehicle 40 traveling on the road 11 that the vehicle cannot enter the intersection. For example, in a case of an intersection with a traffic light, a pattern composed of red lines is displayed on the road surface as illumination patterns 93 and 94 when the signal for the vehicle 40 traveling on the road 11 turns red, as illustrated by thick line, thereby alerting the driver.

Alternatively, if a sensor for automatically detecting that the vehicle 40 traveling on the road 11 has approached the intersection is installed, the above-described illumination can be performed only when approach of the vehicle 40 is detected by the sensor.

Note that the illumination devices 201 to 204 can be directly installed on the road surface that constitutes a road shoulder of the road 11 or the road 12 or can be mounted to a structure (for example, a traffic light or a road sign) installed near the road surface.

Figure 25:
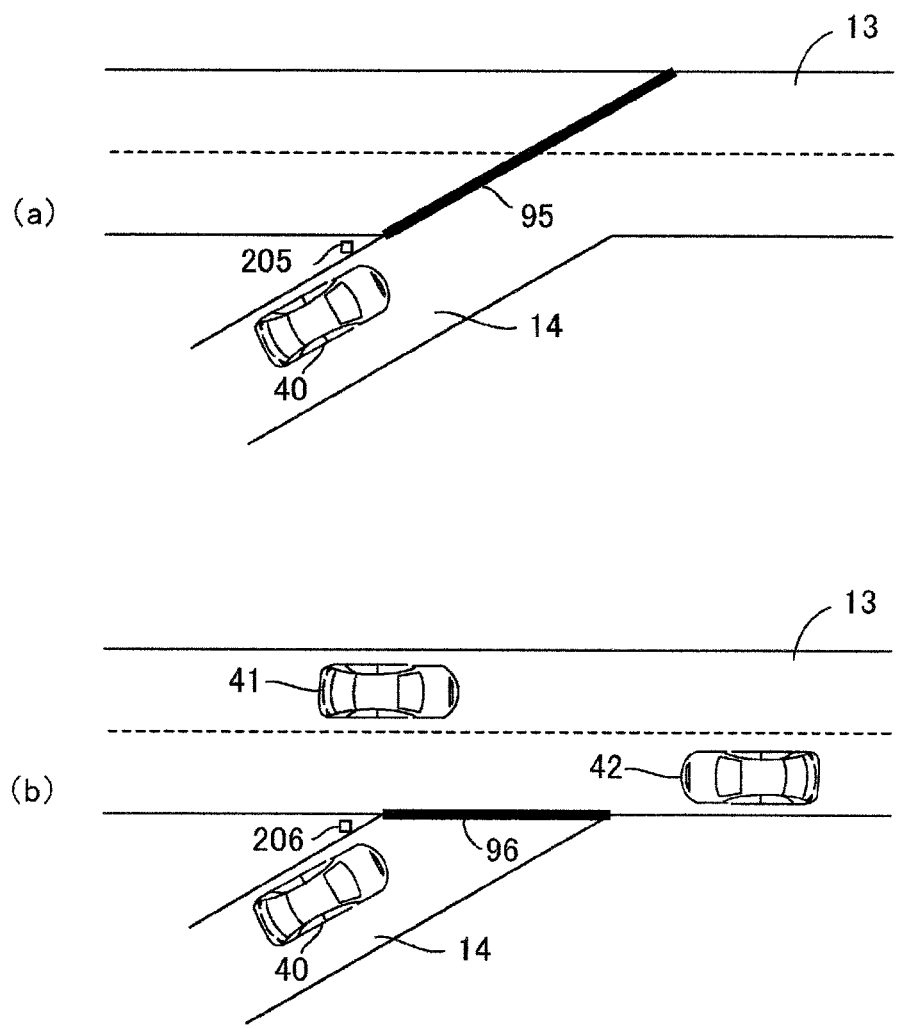
FIG. 25 is plan views illustrating applications in which the illumination device according to the present invention is installed at a junction of a road, and the road surface is illuminated with a predetermined illumination pattern to present effective information to a driver.

FIG. 25 is plan views illustrating applications in which the illumination device according to the present invention is installed at a junction of a road, and the road surface is illuminated with a predetermined illumination pattern to present effective information to a driver. At the junction of a main road 13 and a side road 14 as illustrated, it is desired to illuminate the surface of the main road 13 in some illumination mode to notify the driver of the vehicle 40 that is going to join to the main road 13 from the side road 14 of the traveling direction at the time of joining and to notify a driver of another vehicle traveling on the main road 13 that the vehicle 40 is joining from the side road 14.

The example illustrated in FIG. 25(*a*) is an example in which an illumination device 205 is installed near the junction of the main road 13 and the side road 14. The illumination device 205 has a function to illuminate a road surface with an elongated linear illumination pattern 95 that diagonally crosses the main road 13, as illustrated by the thick line. The illumination pattern 95 is a pattern composed of a red line and serves to notify the driver of the vehicle 40 of the traveling direction at the time of joining, and to notify the driver of another vehicle traveling on the main road 13 that the vehicle 40 is joining from the side road 14.

The illumination device 205 is provided with an entry detection sensor that detects presence of the vehicle 40 that is going to enter the main road 13 from the side road 14. When the presence of the vehicle 40 is detected by the sensor, the illumination device 205 performs linear illumination illustrated as the illumination pattern 95 along the traveling direction of the vehicle 40. Alternatively, another sensor may be provided to detect other vehicles traveling near the side road 14 on the main road 13. In this case, when the sensor determines that no vehicle other than the vehicle 40 is traveling near the junction on the main road 13, the linear illumination illustrated as the illumination pattern 95 may be performed as a blur line, for example. The driver of the vehicle 40 sees the illumination of this blue line and can recognize that there is no other vehicle nearby and he/she can safely join to the main road 13.

Note that the example in FIG. 25(*a*) illustrates an example of performing the linear illumination on only the left side in the traveling direction of the vehicle 40 that is going to join. However, the linear illumination may be performed on the right side. With the illumination, attention can be drawn to other vehicles traveling from the right to the left of the main road 13.

Meanwhile, the example illustrated in FIG. 25(*b*) is an example in which an illumination device 206 is installed near the junction of the main road 13 and the side road 14. The illumination device 206 has a function to illuminate the road surface with an elongated linear illumination pattern 96 that blocks an entry point of the main road 13 from the side road 14, as illustrated by the thick line. The illumination pattern 96 is a pattern composed of a red line, for example, and serves to notify the driver of the vehicle 40 of vehicle entry prohibition, and to notify drivers of other vehicles 41 and 42 traveling on the main road 13 that there is a possibility that the vehicle 40 is joining from the side road 14.

The illumination device 206 is provided with a sensor that detects presence of the vehicles 41 and 42 traveling near the junction of the main road 13. When the presence of the vehicles 41 and 42 is detected by the sensor, the illumination device 206 performs linear illumination illustrated as the illumination pattern 96 near the boundary between the main road 13 and the side road 14. It is desirable that the linear illumination be a noticeable color such as a red line. Alternatively, an entry detection sensor that detects presence of the vehicle 40 that is going to enter the main road 13 from the side road 14 may be further provided to the illumination device 206, and when the presence of the vehicle 40 is detected on the side road 14 and the presence of the vehicles 41 and 42 is detected on the main road 13, the linear illumination illustrated as the illumination pattern 96 may be performed.

The illumination devices 205 to 206 can be directly installed on the road surface near the junction or can be mounted to a structure (for example, a traffic light or a road sign) installed near the road surface. Of course, an illumination device having the functions of both the illumination devices 205 and 206 may be installed.

Figure 26:
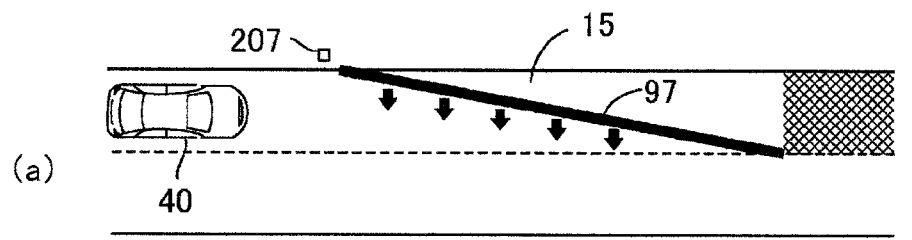
FIG. 26 is plan views illustrating applications in which the illumination device according to the present invention is installed at a construction site of a road or the like, and the road surface is illuminated with a predetermined illumination pattern to present effective information to a driver.
Figure 26:
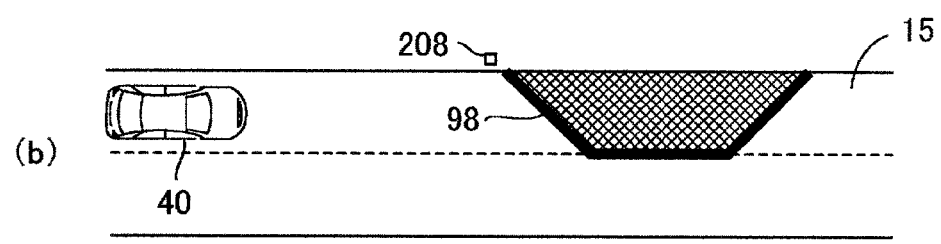

FIG. 26 is plan views illustrating applications in which the illumination device according to the present invention is installed at a construction site of a road or the like, and a road surface is illuminated with a predetermined illumination pattern to present effective information to a driver. In a case where a part of a road 15 is set to a no traffic area (hatched portion with mesh) due to a construction or the like, it is favorable to notify the driver of presence of the no traffic area to guide the driver to move to a right lane before the vehicle 40 traveling on the road 15 reaches the no traffic area.

The example illustrated in FIG. 26(*a*) is an example of installing an illumination device 207 in front of the no traffic area. The illumination device 207 has a function to illuminate the road surface with an illumination pattern 97 composed of an elongated linear bar and a plurality arrows for guiding the vehicle 40 to the right lane, as illustrated by the thick line. The illumination pattern 97 is, for example, a pattern composed of a red line and red arrows, and serves to notify the driver of the vehicle 40 that the vehicle 40 needs to move to the right lane.

Meanwhile, the example illustrated in FIG. 26(*b*) is an example of drawing attention from the driver of the vehicle 40 to bypass the no traffic area in a case where the no traffic area (construction site or the like) hatched with mesh exists. An illustrated illumination device 208 has a function to illuminate the road surface with a linear illumination pattern 98 arranged to surround the no traffic area, along the boundary of the no traffic area. As in this case, the illumination device 208 can urge the driver of the vehicle 40 to avoid the no traffic area.

The illumination devices 207 to 208 can be directly installed on the road surface near the no traffic area or can be mounted to a structure (for example, a traffic light or a road sign) installed near the no traffic area. If a detachable mounting portion is provided in the illumination device, an installation place can be easily changed even in a case where the no traffic area such as a construction site is changed.

Figure 27:
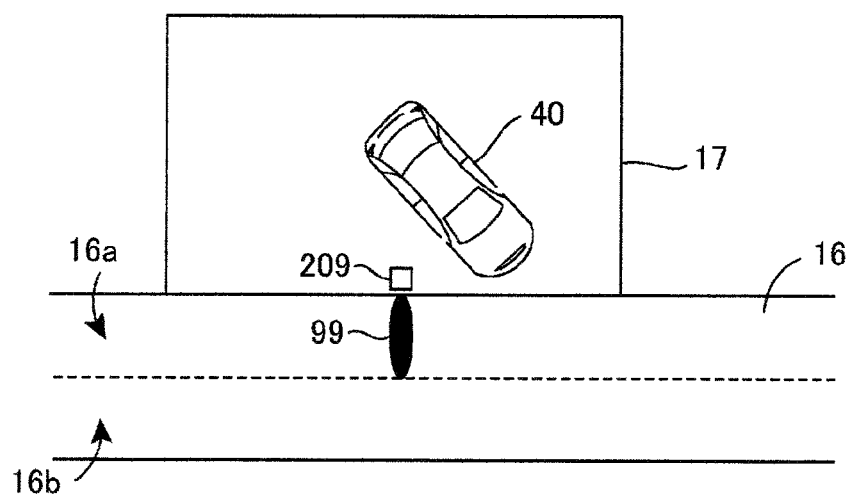
FIG. 27 is a plan view illustrating an application in which the illumination device according to the present invention is installed near an entrance of a site 17 (for example, a parking lot) located outside and beside a road 16, and the road surface is illuminated with a predetermined illumination pattern to present effective information to a driver.

FIG. 27 is a plan view illustrating an application in which the illumination device according to the present invention is installed near an entrance of a site 17 (for example, a parking lot) located outside and beside a road 16, and a road surface is illuminated with a predetermined illumination pattern to present effective information to a driver. In a case where the vehicle 40 is going to enter the road 16 from the site 17 outside the road as illustrated, it is favorable to notify another vehicle traveling on the road 16, in particular, a vehicle traveling toward the right in FIG. 27 on a lane 16*a* in a country adopting left-handed traffic that the vehicle 40 is entering the road from the site 17 outside the road.

Therefore, in the illustrated example, an illumination device 209 is installed near a boundary between the road 16 and the site 17 (near a shoulder of the road 16, for example). The illumination device 209 has a function to illuminate the road surface with an illumination pattern 99 crossing the lane 16*a*, as illustrated by the ellipse in FIG. 27. The illumination pattern 99 is, for example, a red elliptical pattern, and serves to notify a driver of another vehicle traveling on the lane 16*a* that there is a possibility that the vehicle 40 is entering the road from the site 17.

The illumination device 209 is provided with an entry detection sensor that automatically detects the vehicle 40 that is going to enter the road 16, and when the presence of the vehicle 40 is detected by the sensor, the illumination device 209 illuminates at least a part of the road 16 with the illustrated illumination pattern 99 for a predetermined period.

Although the shape and size of the illumination pattern 99 are arbitrary, it is necessary to perform illumination in a mode capable of notifying the driver of another vehicle traveling on the road 16 that the vehicle 40 is going to enter the road 16. In the illustrated example, the elliptical pattern is used as the illumination pattern 99. However, the illumination may be performed with a linear illumination pattern in a noticeable color such as red, or with an illumination pattern that displays information including characters and symbols such as "attention to vehicle entry" in a specific color, other than the elliptical pattern.

The illumination device 209 desirably continues to perform illumination during a period from when the entry detection sensor once detects the presence of the vehicle 40 to when the vehicle 40 becomes undetected. In addition, the illumination color and the illumination intensity may be varied according to a time zone such as morning and evening, and daytime.

Alternatively, the illumination device 209 may have a function to detect blinking of a direction indicator of the vehicle 40 to automatically estimate the traveling direction of the vehicle 40, and illuminate a lane according to the traveling direction of the vehicle 40. For example, when left turn of the vehicle 40 can be estimated, the left turn will disturb the course of another vehicle traveling on the lane 16a in the right direction in FIG. 27 in a country adopting the left-handed traffic. Therefore, illumination with the illumination pattern 99 to block the lane 16a may be performed as illustrated. In contrast, when right turn of the vehicle 40 can be estimated, the right turn will disturb the course of another vehicle traveling on either the lane 16a or a lane 16b in a country adopting the left-handed traffic. Therefore, illumination with an illumination pattern to block the entire road 16 may be performed.

As described above, the illumination modes described with reference to FIGS. 24 to 27 are examples intended for the purpose of guiding or alerting a vehicle, displaying information, and the like, and in practice, various illumination modes other than the above can be considered. According to the illumination device of the present invention, illumination and information display in an arbitrary illumination mode at an arbitrary place can be performed by the design of the diffractive characteristics of the diffractive optical element 130 and the lighting control of the light source 110.

Further, as in the examples illustrated in FIGS. 9 and 10, in the case of adopting the operation that the individual element diffractive optical portions respectively illuminate the specific responsible regions, a part of the element diffractive optical portions may be used for illumination application of the entire region to be illuminated 20 and the remaining element diffractive optical portions may be used for applications of displaying various types of information such as specific pictures, characters, symbols, and patterns in the region to be illuminated 20. With the operation, arbitrary information can be displayed at an arbitrary place in the region to be illuminated 20 illuminated in an arbitrary illumination mode, and the region to be illuminated 20 can be used in various applications such as advertising or information provision.

5.5 Modification of Reducing Calculation Load

In § 4, the procedure of producing the holograms to be formed in the individual element diffractive optical portions by computer calculation has been described with reference to the flowchart illustrated in FIG. 11. In this procedure, independent calculations are separately performed and independent holograms are separately formed for the individual element diffractive optical portions. In other words, the interference fringes having a different diffractive characteristic is formed in each element diffractive optical portion to constitute the independent hologram causing a diffractive phenomenon based on a specific diffractive characteristic. Then, by adopting such a configuration, a clear illumination pattern with suppressed blue can be obtained.

However, if the calculation to form the hologram illustrated in the flowchart in FIG. 11 is independently performed for each of the individual element diffractive optical portions, a high calculation load is undeniable. Therefore, here, a modification of reducing the calculation load will be described.

As illustrated in FIG. 5, in the basic embodiment of the present invention, the diffractive optical element 130 includes the plurality of element diffractive optical portions 131, 132, and the like arranged on the predetermined arrangement plane (XY plane) in a two-dimensional matrix manner, and the element diffractive optical portions have the diffractive characteristics different from one another. That is, each element diffractive optical portion constitutes a different hologram, and different interference fringes are recorded. Specifically, in the illustrated example, the diffractive optical element 130 includes seventy sets of element diffractive optical portions arranged in seven rows by ten columns, and the calculation to form the hologram illustrated in the flowchart in FIG. 11 is performed for each of the seventy sets of element diffractive optical portions.

The modification described here discloses a technique of reducing the load of such calculation. First, a group of element diffractive optical portions arranged adjacent to one another is defined as a diffractive optical group, and the diffractive optical element 130 is configured by an aggregate of a plurality of diffractive optical groups arranged in a two-dimensional matrix manner. For example, nine sets of element diffractive optical portions arranged in three rows by three lines is defined as one diffractive optical group, and the diffractive optical element 130 is configured by an aggregate of the diffractive optical groups.

For example, in a case where the diffractive optical element 130 has 108 sets of element diffractive optical portions arranged in nine rows by twelve columns, if the element diffractive optical portions are divided into three regions in a longitudinal direction and four region in a cross direction to obtain twelve regions in total, the individual divided region constitutes a diffractive optical group including nine sets of element diffractive optical portions arranged three rows by three columns. In other words, this diffractive optical element 130 is constituted by an aggregate of twelve sets of diffractive optical groups arranged in three rows by four columns, and the nine sets of element diffractive optical portions arranged in three rows by three columns are included in the individual diffractive optical group.

Since the example illustrated in FIG. 5 has seventy sets of element diffractive optical portions arranged in seven rows by ten columns, both the number of rows and the number of columns cannot be divided by three. In such a case, the diffractive optical element 130 cannot be configured by only the diffractive optical groups including nine sets of element diffractive optical portions arranged in three rows by three columns, and thus a half diffractive optical group such as a diffractive optical group including three sets of element diffractive optical portions arranged in three rows by one column or a diffractive optical group including three sets of element diffractive optical portions arranged in one row by three columns needs to be arranged in an end portion. However, in any case, the diffractive optical element 130 can be divided into a plurality of diffractive optical groups.

Then, any one of the plurality of element diffractive optical portions included in a certain diffractive optical group is selected as a representative, and the calculation to form a hologram illustrated in the flowchart in FIG. 11 is performed only for the representative element diffractive optical portion, and the hologram obtained in the calculation for the representative is used for the element diffractive optical portions other than the representative. For example, in a case of a diffractive optical group including nine sets of element diffractive optical portions arranged in three rows by three columns, first, for example, one element diffractive optical portion located at the center is selected as the representative, and the calculation to form a hologram is performed for the representative to obtain unique interference fringes, and the interference fringes are recorded. Then, exactly the same interference fringes as the interference fringes formed in the central element diffractive optical portion are recorded for the remaining eight sets of element diffractive optical portions.

In the example illustrated in FIG. 5, when one diffractive grating group is configured by nine sets of element diffractive optical portions belonging to the fourth to sixth rows and the fourth to sixth columns (nine sets of element diffractive optical portions arranged in three rows by three columns), for example, the element diffractive optical portion 132 located in the center is determined as a representative, the calculation to form a hologram is performed to obtain the unique interference fringes for the representatives, and the interference fringes are recorded in the element diffractive optical portion 132. Then, exactly the same interference fringes as the interference fringes in the element diffractive optical portion 132 are recorded in the remaining eight sets of element diffractive optical portions located around the element diffractive optical portion 132.

If such a method is adopted to all the diffractive optical groups, the overall calculation load can be reduced to about ⅑. As a result, the element diffractive optical portions belonging to the same diffractive optical group have the same diffractive characteristic, and the element diffractive optical portions belonging to different diffractive optical groups have different diffractive characteristics. For example, in FIG. 5, the element diffractive optical portion 132 and the eight sets of element diffractive optical portions located around the element diffractive optical portion 132 are the element diffractive optical portions belonging to the same diffractive optical group and thus have the same diffractive characteristics (the same interference fringes are recorded), whereas the element diffractive optical portion 131 and the element diffractive optical portion 132 are the element diffractive optical portions belong to different diffractive optical groups and thus have different diffractive characteristics from each other (different interference fringes are recorded).

Of course, since the element diffractive optical portion 132 and the eight sets of element diffractive optical portions located around the element diffractive optical portion 132 are different in arrangement in the three-dimensional space, the angles to view the region to be illuminated 20 are different. Therefore, if the interference fringes recorded in the element diffractive optical portion 132 are used for and recorded as is in the eight sets of element diffractive optical portions located around the element diffractive optical portion 132, the positions of reproduction images formed on the XZ plane by the diffracted lights from the nine sets of element diffractive optical portions are slightly shifted from one another, which may become a factor of blur.

As a result, adoption of the modification described here has an adverse effect in achieving the object of the present invention of suppressing blur in the reproduction image formed on the region to be illuminated 20 and forming a clear illumination pattern. However, if the present modification is adopted, an advantage of significantly reducing the operation load for the holograms (interference fringes) to be formed on the individual element diffractive optical portions can be obtained. Therefore, it is worthwhile to adopt this modification in a use form that requires high-speed processing even if accepting some blurs.

As described above, since a display device such as a liquid crystal display can be used as the diffractive optical element 130, data of an arbitrary illumination pattern is created, the interference fringes are immediately calculated on the basis of the data, and the interference fringes are formed on the liquid crystal display, whereby the arbitrary illumination pattern can be displayed in real time. In such a real-time display application, high-speed processing is essential, and the present modification will be effective.

As described above, this modification potentially has a factor to cause blur in the illumination pattern, but if the arrangement pitch of the element diffractive optical portions is small, positional deviation between the adjacent element diffractive optical portions is also small and the degree of blur is also small. The same applies to a case where the total number of element diffractive optical portions belonging to the diffractive optical group is decreased. Therefore, there are not a few cases where no difference is recognized in the degree of blur of the illumination pattern even if the present modification is not adopted, depending on the specific use mode. Therefore, for practical use, the present modification is sufficiently useful.

5.6 Modification of Decreasing Cross Sectional Area of Coherent Light

In the basic embodiment illustrated in FIG. 4, a cross section (perpendicular to an optical axis) of the coherent light collimated by the collimating optical system 120 has an area containing an entire surface of the diffractive optical element 130, and all the element diffractive optical portions 131 are irradiated with the coherent light. For example, in a case where the coherent light collimated by the collimating optical system 120 has circular or elliptical cross section, and the diffractive optical element 130 has a rectangular shape, the coherent light having the circular or elliptical cross section entirely contain the diffractive optical element 130 having the rectangular shape, and the diffracted light can be obtained from all the element diffractive optical portions 131. In this case, it is favorable to cut portion of the coherent light running off from the diffractive optical element 130 with an aperture.

However, it is not always necessary to irradiate the entire diffractive optical element 130 with coherent light in implementing the present invention. That is, the cross section of the coherent light collimated by the collimating optical system 120 may have an area containing only a part of the diffractive optical element 130, and only a part of the element diffractive optical portions 131 may be illuminated by the coherent light.

Each element diffractive optical portion 131 has the function to diffract the incident coherent light on the basis of a predetermined diffractive characteristic, but, of course, the element diffractive optical portion 131 cannot emit the diffracted light if there is no incident coherent light. Therefore, for example, in a case where the coherent light is not emitted to an element diffractive optical portion 131 located at an edge of the diffractive optical element 130, this element diffractive optical portion 131 cannot play the original role.

However, making the cross section of the coherent light to enter the diffractive optical element 130 larger becomes a factor to increase blur in the illumination pattern to be formed in the region to be illuminated 20. Therefore, in a use form that requires suppression of the blur as much as possible, the cross section of the coherent light collimated by the collimating optical system 120 is made small, and the region to be illuminated 20 may be illuminated using only part of the element diffractive optical portions 131 of the diffractive optical element 130.

Note that, in the case of making the cross section of the coherent light small, it is favorable that the area of one element diffractive optical portion 131 is minimized, and the area of the element diffractive optical portion 131 is made equal to or smaller than the area of the cross section of the coherent light on a constant basis. In other words, it is favorable that the cross section of the coherent light can entirely cover the one element diffractive optical portion 131. Otherwise, a sufficient illumination pattern cannot be formed by the diffracted light from the one element diffractive optical portion 131, and the energy density of the coherent light becomes too high and the safety measures for protecting the observer's eyes becomes insufficient.

Some modifications of the present invention have been described. However, these modifications are presented as example and are not intended to limit the scope of the invention. The present invention can be implemented in other various forms including these modifications, and various omissions, replacements, and modifications can be made without departing from the scope of the invention. These embodiments and modifications are included in the scope and the gist of the invention, and are included in the invention described in the claims and the equivalents thereof.

§ 6. Technical Information for Reference in Implementing Present Invention

Finally, some technical information helpful in carrying out the present invention will be described.

6.1 Consideration Concerning Amount of Blur Occurring in Region to be Illuminated 20

Figure 28:
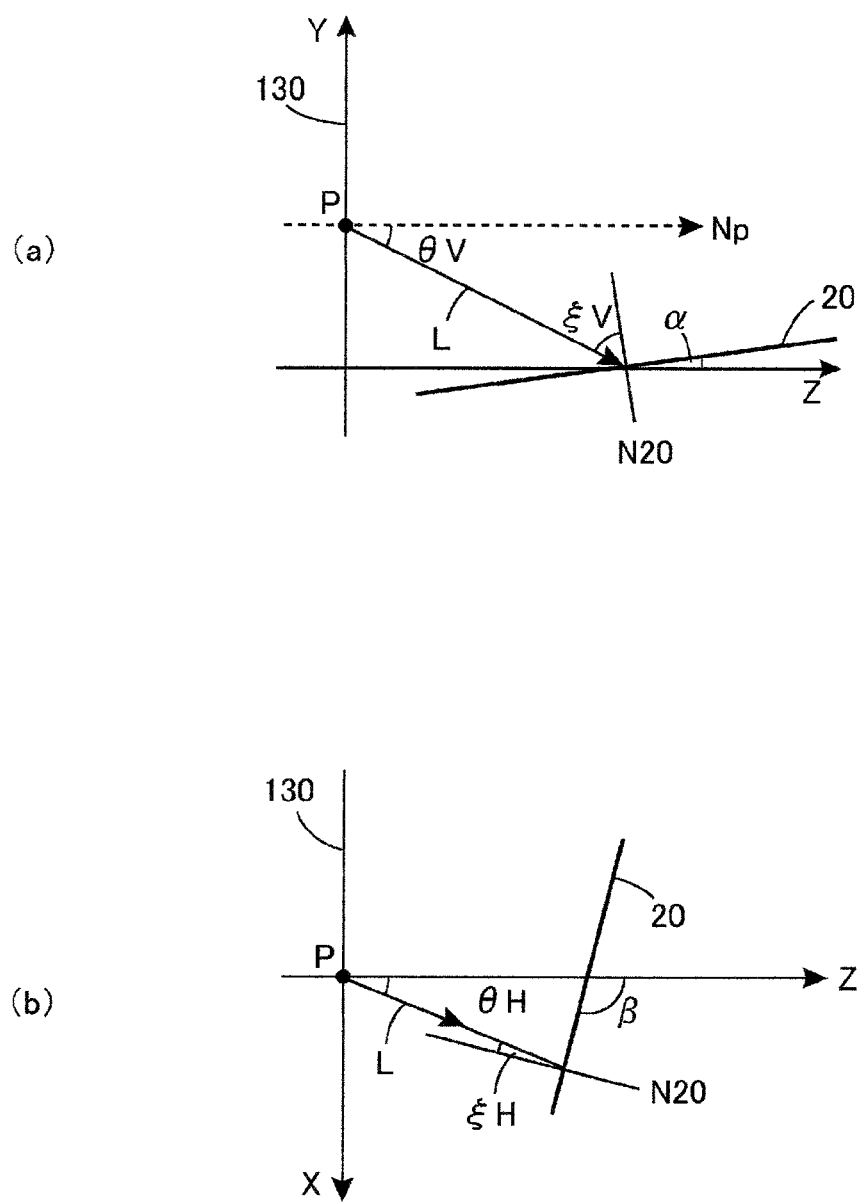
FIG. 28 is diagrams illustrating angles made by a diffracted light L emitted from an arbitrary point P on the diffractive optical element 130 and a normal line N20 in the region to be illuminated 20 defined on a plane.

FIG. 28 is diagrams illustrating angles made by a diffracted light L emitted from an arbitrary point P on the diffractive optical element 130 and a normal line N20 in the region to be illuminated 20 defined on a plane. FIG. 28(a) is a projection onto the YZ plane, and the diffracted light L emitted from the point P travels in the direction of making the vertical-direction displacement angle θV with respect to the normal line Np and reaches the region to be illuminated 20. At this time, the angle made the normal line N20 set to the region to be illuminated 20 and the diffracted light L on the projection is ξV. Meanwhile, FIG. 28(b) is a projection onto the XZ plane and illustrates a case where the point P is on the YZ plane. The diffracted light L emitted from the point P travels in the direction forming the horizontal-direction displacement angle θH with respect to the normal line (Z axis) and reaches the region to be illuminated 20. At this time, the angle made the normal line N20 set to the region to be illuminated 20 and the diffracted light L on the projection is ξH. Here, the angles θV and θH are angles illustrated in the coordinate system θH-θV illustrated in FIG. 7(c).

In FIG. 28(a), the angle made by a plane including the region to be illuminated 20 and the Z axis in a case of projecting the region to be illuminated 20 defined on a plane onto the YZ plane is α. At this time, the angle ξV made by the diffracted light L from the diffractive optical element 130 and the normal line N20 set at the region to be illuminated 20 is expressed by the following expression (1) using degree (°) as a unit.

$$\xi V = 90° - (\alpha + \xi V) \qquad (1)$$

Meanwhile, in FIG. 28(b), the angle made by a plane including the region to be illuminated 20 and the Z axis in a case of projecting the region to be illuminated 20 defined on a plane onto the XZ plane is β. At this time, the angle ξH made by the diffracted light L from the diffractive optical element 130 and the normal line N20 set at the region to be illuminated 20 is expressed by the following expression (2) using degree (°) as a unit.

$$\xi H = 90° - (\beta - \xi H) \qquad (2)$$

Figure 29:
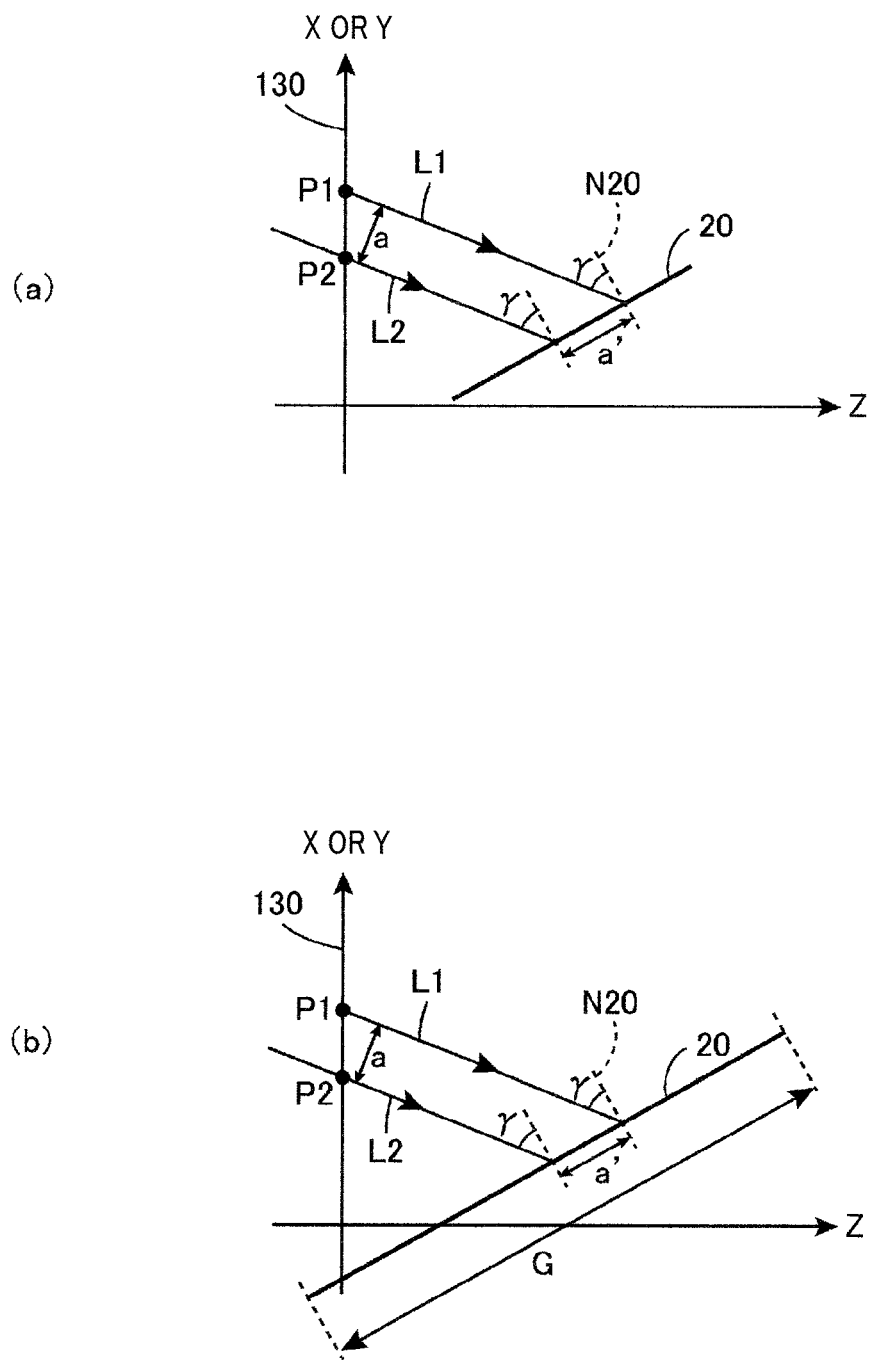
FIG. 29 is diagrams illustrating diffracted lights L1 and L2 from representative points P1 and P2 of two adjacent element diffractive optical portions.

Here, if two adjacent element diffractive optical portions on the diffractive optical element 130 have the same diffractive characteristic, the diffracted lights L from these element diffractive optical portions travel in directions parallel to each other. FIG. 29 is diagrams illustrating diffracted lights L1 and L2 from representative points P1 and P2 of two adjacent element diffractive optical portions. As illustrated in FIG. 29(a), the diffracted lights L1 and L2 travel in parallel directions. When the distance between the two diffracted lights L1 and L2 is a, a distance a' between arrival points of the two diffracted lights L1 and L2 on the region to be illuminated 20 is expressed by the following expression (3), where angles made by the traveling directions of the diffracted lights L1 and L2 and the normal line N20 set at the region to be illuminated 20 are γ. As illustrated in the expression (3), the distance a' is larger than the distance a, which becomes a factor of blur.

$$a' = a/\cos \gamma \qquad (3)$$

FIG. 29(b) is a diagram for describing the amount of blur permitted on the region to be illuminated 20. The amount of blur can be quantified by a'/G where the length in one direction of the region to be illuminated 20 is G. As a permissible amount of blur, a'/G is generally set to ⅓ or less and more desirably set to ¼ or less although depending on illumination application of the illumination device. To set a'/G to an desired value, a' can be adjusted by adjusting the size (the interval between the representative points P1 and P2) of the element diffractive optical portions constituting the diffractive optical element 130, and the length G can be adjusted by adjusting the diffractive characteristics of the diffractive optical element 130. Therefore, by adjusting at least one of a' or G, a'/G can be set to ⅓ or ¼ or less, and the blur in the region to be illuminated 20 can be reduced.

As described above, each of the element diffractive optical portions 131, 132, and the like constituting the diffractive optical element 130 may illuminate the entire region to be illuminated 20 or may illuminate only a part of the region to be illuminated 20. Here, in a case where each element diffractive optical portion illuminates only a partial region in the region to be illuminated 20, the above-described a'/G is set to ⅓ or less or desirably set to ¼ or less even if adjacent two element diffractive optical portions have the same diffractive characteristic, whereby the amount of blur can be reduced within a practically acceptable range.

6.2 Consideration Concerning Diffracted Light from Diffractive Optical Element 130

The diffractive optical element 130 has the diffractive characteristics to diffract the coherent light into a predetermined diffusion angle space in accordance with the position, size, and shape of the region to be illuminated 20. Therefore, even if the normal direction of the emission surface of the diffractive optical element 130 is not parallel to the normal direction of the region to be illuminated 20, the coherent light diffracted by the diffractive optical element 130 can illuminate the entire region to be illuminated 20 and the illumination intensity can be made uniform over the entire region to be illuminated 20.

The illumination intensity of the region to be illuminated 20, that is, an amount of light D1 can be expressed by the following expression (4).

$$D1 = Io - Ao - Dx \quad (4)$$

Here, Io is the amount of coherent light emitted from the light source 110. Ao is the amount of light lost inside the illumination device, which is, for example, the amount of light lost due to reflection, absorption, and shading of the coherent light, the amount of light of reduction by a filter (not illustrated), or the like. Dx is the amount of zero-order light or second or higher multi-order diffracted light that is transmitted without being diffracted by the diffractive optical element 130. Then, D1 is the amount of the first-order diffracted light of the coherent light diffracted by the diffractive optical element 130. Although there may be a case where the zero-order or multi-order light enters the region to be illuminated 20, other than the first-order diffracted light, only the first-order diffracted light is take into consideration in designing the diffractive optical element 130.

Figure 30:
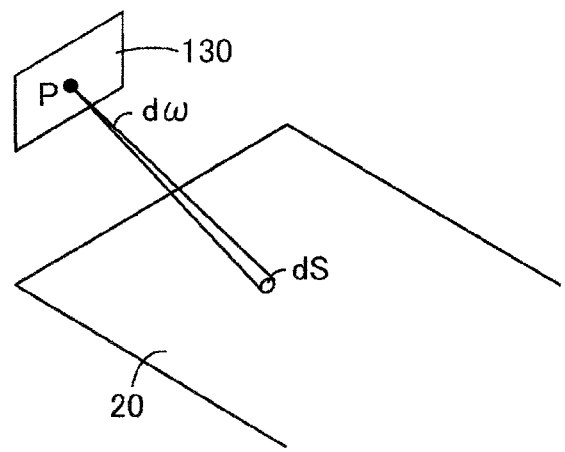
FIG. 30 is a perspective view illustrating a state in which a minute region dS on the region to be illuminated 20 is illuminated by first-order diffracted light from one point P of the diffractive optical element 130.

FIG. 30 is a perspective view illustrating a state in which a minute region dS on the region to be illuminated 20 is illuminated by the first-order diffracted light from one point P of the diffractive optical element 130. The total radiation light amount D1 of the first-order diffracted light from the diffractive optical element 130 is obtained by, as illustrated in FIG. 30, integrating radiation intensity (W/sr) or luminous intensity (cd) of the first-order diffracted light of the coherent light on the diffractive optical element 130 obtained from illuminance or illuminance distribution on the region to be illuminated 20, at a solid angle viewing the region to be illuminated 20 from the diffractive optical element 130, and is expressed by the following expression (5).

$$D1 = \text{integral symbol}_{\omega(S)} I \, d\omega \quad (5)$$

Note that, at the time of designing, the radiation intensity (W/sr) or the luminous intensity (cd) distribution of the first-order diffracted light of the coherent light on the diffractive optical element 130 are calculated as radiation intensity (W/sr) or luminous intensity (cd) in a case where the diffractive optical element 130 is regarded as a point without having an area. Note that I in the expression (5) is the radiation intensity (W/sr) or the luminous intensity (cd) in the diffractive optical element 130.

As described above, the amount of light D1 of the first-order diffracted light in the diffractive optical element 130 can be obtained from the radiation illuminance or illuminance of the coherent light on the region to be illuminated 20 or the radiation intensity or the luminous intensity distribution in the diffractive optical element 130 derived from the radiation luminance or luminance, as illustrated in FIG. 5. In practice, since the diffractive optical element 130 has an area, the radiation intensity or the luminous intensity becomes an average value by the area of the incident light to the diffractive optical element 130, and the radiation luminance (W/sr/m$^2$) or the luminance (cd/m$^2$) at each point on the diffractive optical element 130 can be significantly suppressed as compared with at the time of designing where the area of the diffractive optical element 130 is not considered, and contributes to improvement of the optical safety of when the observer observes the illumination device. As described above, the necessary radiation luminance or luminance on the diffractive optical element 130 to obtain a design amount of light of the region to be illuminated 130 is reduced by further expanding the incident area on the diffractive optical element 130, of the coherent light entering the diffractive optical element 130 from the collimating optical system 120.

As described above, the illumination device 100 according to the basic embodiment of the present invention does not include a lens for image formation on a rear side of the optical axis of the diffractive optical element 130, and directly illuminates the region to be illuminated 20 by the diffracted light from the diffractive optical element 130. The diffracted light at each point on the diffractive optical element 130 illuminates at least part of the region to be illuminated 20. That is, the diffracted light at each point on the diffractive optical element 130 travels within a predetermined diffusion angle range and illuminates the region to be illuminated 20.

As described with reference to FIG. 7, the diffusion angle of the first-order diffracted light traveling from the point P on the diffractive optical element 130 can be illustrated by the angular space distribution using the coordinate system θH-θV. The example illustrated in FIG. 5 is an example in which the diffractive optical element 130 is located on the XY plane and the region to be illuminated 20 is located on the XZ plane. Angle information for viewing the region to be illuminated 20 from the diffractive optical element 130 is expressed in the coordinate system θH-θV illustrated in FIG. 7(c) by the following expressions (6) and (7), where coordinate values of an arbitrary point P on the diffractive optical element 130 is (Ix, Iy, Iz) and coordinate values of an arbitrary point Q on the region to be illuminated 20 is (x, y, z).

$$\tan \theta H = (x - Ix)/(z - Iz) \quad (6)$$

$$\tan \theta V = (y - Iy)/(z - Iz) \quad (7)$$

Here, the above expressions (5), (6), and (7) can be used for calculation in generating the angular space distribution D10 of the first-order diffracted light intensity in step S1 of the flowchart illustrated in FIG. 11.

Figure 31:
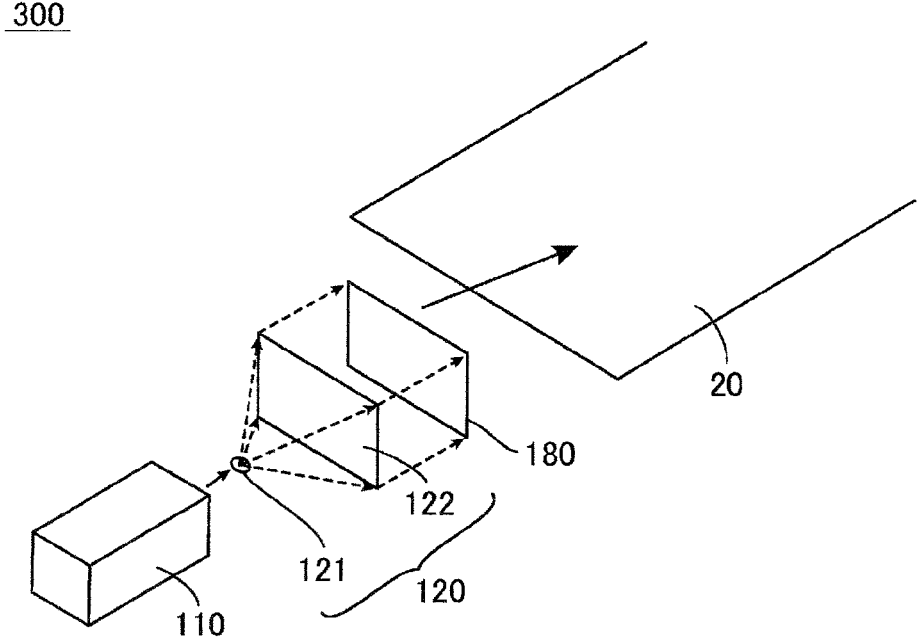
FIG. 31 is a perspective view illustrating an illumination device 300 as a reference example without including element diffractive optical portions.

6.3 Illumination Device Regarding Reference Example without Including Element Diffractive Optical Portions FIG. 31 is a perspective view illustrating an illumination device 300 as a reference example without including element diffractive optical portions. The difference between the illumination device 100 according to the basic embodiment of the present invention illustrated in FIG. 4 and the illumination device 300 according to a reference example illustrated in FIG. 31 is that, in the illumination device 100, the diffractive optical element 130 includes the plurality of element diffractive optical portions 131, and the diffractive characteristics of the holograms constituting the individual element diffractive optical portions 131 are different from one another, and the interference fringes are formed by the independent calculations, whereas in the illumination device 300, a diffractive optical element 180 is configured by a single hologram.

As described above, when the diffractive optical element 130 is configured by an aggregate of a plurality of element diffractive optical portions 131 and interference fringes are formed for each of the individual element diffractive optical portions 131 by independent calculation, the illumination target is illuminated. In the region to be illuminated 20, a clearer illumination pattern can be obtained. Therefore, by use of the illumination device 100 according to the present invention illustrated in FIG. 4, a clearer illumination pattern can be obtained than the case of using the illumination device 300 illustrated in FIG. 31 as a reference example.

INDUSTRIAL APPLICABILITY

The illumination device according to the present invention can be widely used for the applications of illuminating a specific region to be illuminated and displaying a desired illumination pattern in the region to be illuminated, as needed. In particular, the illumination device according to the present invention is suitable for use in the illumination environment where the angle made by the optical axis of the illumination light and the plane to be illuminated is small, such as in the application of illuminating a road surface of a road.

REFERENCE SIGNS LIST

10 Road surface (plane to be illuminated)
11 to 16 Road
16a, 16b Road lane
17 Site outside road such as parking lot
20 Region to be illuminated
20(P1), 20(P2) Partial region to be illuminated
21 to 26 Arrow configuring illumination pattern
30 Pedestrian
40, 41, 42 Vehicle
50 Projector
60 Screen (plane to be illuminated)
71 to 99 Illumination pattern
100 Illumination device
100A, 100B, 100C, 100D Illumination device
110 Light source
110R, 110G, 110B Light source
120 Collimating optical system
120R, 120G, 120B Collimating optical system
121 First lens
121R, 121G, 121B First lens
122 Second lens
122R, 122G, 122B Second lens
130 Diffractive optical element
130R, 130G, 130B Diffractive optical element
131, 132 Element diffractive optical portion
140 4f optical system
141 4f-1 lens
142 Light shielding plate
143 4f-2 lens
150 Diffracted image
160 4f optical system
161 4f-1 lens array
162 Light shielding plate
163 4f-2 lens array
170 Diffracted image
180 Diffractive optical element
201 to 209 Illumination device (road surface installation type)
300 Illumination device (reference example)
A1 to A53 Illumination intensity/amplitude of diffracted light
a Distance between two representative points P1 and P2
a' Distance between two illumination points on region to be illuminated 20
C Optical axis (central axis of illumination light)
D, D1 to D4 Distribution point on angular space distribution
D00 Design illumination intensity distribution
D10 Angular space distribution of intensity of first-order diffracted light
D20 Complex amplitude distribution on diffractive optical element
D30 Complex amplitude distribution on region to be illuminated
D40 Modified complex amplitude distribution on region to be illuminated
D50 Modified complex amplitude distribution on diffractive optical element
D60 Replaced complex amplitude distribution on diffractive optical element
dS Small region
dω Solid angle
f Focal length of lens
G Length of region to be illuminated 20
H Opening of light shielding plate
L0 Collimated parallel illumination light
L, L1 to L4 First-order diffracted light
Np, Np1 Normal line set at representative point of element diffractive optical portion
N20 Normal line set in region to be illuminated 20
O Origin of XYZ three-dimensional orthogonal coordinate system
P, P1, P2 Representative point of element diffractive optical portion
Q, Q1 to Q4 Reference point on plane to be illuminated
S1 to S7 Step of flowchart
X, Y, Z Coordinate axis on three-dimensional orthogonal coordinate system
xp X coordinate value on three-dimensional orthogonal coordinate system
xq, xq1 to xq4 X coordinate value on three-dimensional orthogonal coordinate system
yp Y coordinate value on three-dimensional orthogonal coordinate system
yq, yq1 to yq4 Y coordinate value on three-dimensional orthogonal coordinate system
zp Z coordinate value on three-dimensional orthogonal coordinate system
zq, zq1 to zq4 Z coordinate value on three-dimensional orthogonal coordinate system
α Angle made by region to be illuminated 20 and Z axis in projection image on YZ plane
β Angle made by region to be illuminated 20 and Z axis in projection image on XZ plane
γ Angle made by diffracted light L1 or L2 and normal line N20 set in region to be illuminated 20
θ Radiation angle to plane to be illuminated
θH Horizontal-direction displacement angle
θV Vertical-direction displacement angle
φ1 to φ53 Phase of diffracted light
ξH Angle made by diffracted light L and normal line N20 set in region to be illuminated 20 in projection image to XZ plane
ξV Angle made by diffracted light L and normal line N20 set in region to be illuminated 20 in projection image to YZ plane

The invention claimed is:

1. A method of manufacturing hologram,
wherein the hologram is recorded in individual element diffractive optical portions so as to have unique diffractive characteristics respectively in order to diffract coherent light entering from collimating optical system,
wherein the element diffractive optical portions are provided on a diffractive optical element of an illumination device and illuminate at least a part of a region to be illuminated, and
wherein the illumination device comprises
a light source configured to emit the coherent light,
a collimating optical system configured to enlarge a beam diameter of the coherent light emitted from the light source and collimate the coherent light, and
the diffractive optical element configured to diffract the coherent light collimated by the collimating optical system into a predetermined diffusion angle space, and illuminate the region to be illuminated defined at a predetermined position and having predetermined size and shape, wherein the method comprises:
a first step of generating angular space distribution of intensity of first-order diffracted light emitted from the element diffractive optical portions based on a predetermined design illumination intensity distribution defined in the region to be illuminated;
a second step of combining random phase distribution with the angular space distribution of intensity to generate complex amplitude distribution on the diffractive optical element;
a third step of performing inverse Fourier transform for the complex amplitude distribution on the diffractive optical element to generate complex amplitude distribution on the region to be illuminated;
a fourth step of modifying intensity of the complex amplitude distribution on the region to be illuminated in accordance with the design illumination intensity distribution to generate modified complex amplitude distribution on the region to be illuminated;
a fifth step of performing Fourier transform for the modified complex amplitude distribution on the region to be illuminated to generate a modified complex amplitude distribution on the diffractive optical element;
a sixth step of replacing intensity of the modified complex amplitude distribution on the diffractive optical element with intensity exhibited in the angular space distribution of intensity generated in the first step to generate replaced complex amplitude distribution on the diffractive optical element; and
a seventh step of executing the third step again using the replaced complex amplitude distribution on the diffractive optical element generated in the sixth step instead of the complex amplitude distribution on the diffractive optical element to repeatedly perform the process from the third step to the sixth step by a necessary number of times and setting a finally obtained replaced complex amplitude distribution on the diffractive optical element as finally complex amplitude distribution.

2. The method of manufacturing hologram according to claim 1, wherein
the angular space distribution of intensity is defined by data providing intensity to a plurality distribution points defined on a two-dimensional coordinate system having a vertical-direction displacement angle indicating angular displacement in a vertical direction and a horizontal-direction displacement angle indicating angular displacement in a horizontal direction with respect to a normal line set at a predetermined representative point in the element diffractive optical portions, as coordinate axes, respectively, and
the complex amplitude distribution on the diffractive optical element, the modified complex amplitude distribution on the diffractive optical element, and the replaced complex amplitude distribution on the diffractive optical element are defined by data providing both of intensity and a phase to the plurality distribution points defined on the two-dimensional coordinate system.

3. The method of manufacturing hologram according to claim 1, wherein the first to the seventh steps are executed by a computer.

4. The method of manufacturing hologram according to claim 1, wherein the design illumination intensity distribution is luminance distribution.

5. The method of manufacturing hologram according to claim 1, wherein the design illumination intensity distribution is a table which contains data indicating a coordinate and a design illumination intensity for a reference point located on the region to be illuminated.

6. The method of manufacturing hologram according to claim 1, wherein a phase of the random phase distribution is a random value between 0 and $2\pi$ generated by a computer.

7. The method of manufacturing hologram according to claim 1, wherein the hologram is manufactured using an optical system in which a space of 60 m or more in length is secured.

8. A hologram manufactured by the method according to claim 1.

9. The hologram according to claim 8, wherein the hologram is a hologram having a unique diffractive characteristic from which first-order diffracted light corresponding to the final complex amplitude distribution is emitted.

10. A method of manufacturing an illumination device,
wherein the illumination device comprises
a light source configured to emit coherent light,
a collimating optical system configured to enlarge a beam diameter of the coherent light emitted from the light source and collimate the coherent light, and
a diffractive optical element configured to diffract the coherent light collimated by the collimating optical system into a predetermined diffusion angle space, and illuminate a region to be illuminated defined at a predetermined position and having predetermined size and shape,
wherein the diffractive optical element includes a plurality of element diffractive optical portions, each of the element diffractive optical portions illuminating at least a part of the region to be illuminated in producing the individual element diffractive optical portions included in the diffractive optical element, and
wherein the method performs a process comprising:
a first step of generating angular space distribution of intensity of first-order diffracted light emitted from the element diffractive optical portions based on a predetermined design illumination intensity distribution defined in the region to be illuminated;
a second step of combining random phase distribution with the angular space distribution of intensity to generate complex amplitude distribution on the diffractive optical element;
a third step of performing inverse Fourier transform for the complex amplitude distribution on the diffractive optical element to generate complex amplitude distribution on the region to be illuminated;
a fourth step of modifying intensity of the complex amplitude distribution on the region to be illuminated in accordance with the design illumination intensity distribution to generate modified complex amplitude distribution on the region to be illuminated;
a fifth step of performing Fourier transform for the modified complex amplitude distribution on the region to be illuminated to generate a modified complex amplitude distribution on the diffractive optical element;
a sixth step of replacing intensity of the modified complex amplitude distribution on the diffractive optical element with intensity exhibited in the angular space distribution of intensity generated in the first step to generate replaced complex amplitude distribution on the diffractive optical element;
a seventh step of executing the third step again using the replaced complex amplitude distribution on the diffractive optical element generated in the sixth step instead of the complex amplitude distribution on the diffractive optical element to repeatedly perform the process from the third step to the sixth step by a necessary number of times and setting a finally obtained replaced complex amplitude distribution on the diffractive optical element as finally complex amplitude distribution; and
an eighth step of forming interference fringes constituting a hologram having a unique diffractive characteristic on a predetermined medium so that first-order diffracted light corresponding to the final complex amplitude distribution is emitted based on the coherent light entering from the collimating optical system.

11. The method of manufacturing the illumination device according to claim 10, wherein the angular space distribution of intensity is defined by data providing intensity to a plurality distribution points defined on a two-dimensional coordinate system having a vertical-direction displacement angle indicating angular displacement in a vertical-direction and a horizontal-direction displacement angle indicating angular displacement in a horizontal-direction with respect to a normal line set at a predetermined representative point in the element diffractive optical portions, as coordinate axes, respectively, and
wherein the complex amplitude distribution on the diffractive optical element, the modified complex amplitude distribution on the diffractive optical element, and the replaced complex amplitude distribution on the diffractive optical element are defined by data providing both of intensity and a phase to the plurality distribution points defined on the two-dimensional coordinate system.

12. A non-transitory computer-readable recording medium in which a program is recorded, the program causing a computer to execute the first to seventh steps in the method of manufacturing a illumination device according to claim 10.

* * * * *